US012560784B2

(12) United States Patent
Minefuji et al.

(10) Patent No.: US 12,560,784 B2
(45) Date of Patent: *\*Feb. 24, 2026

(54) PROJECTION SYSTEM AND PROJECTOR

(71) Applicant: SEIKO EPSON CORPORATION,
Tokyo (JP)

(72) Inventors: Nobutaka Minefuji, Omachi (JP);
Hitoshi Hirano, Suwa (JP)

(73) Assignee: SEIKO EPSON CORPORATION,
Tokyo (JP)

( * ) Notice: Subject to any disclaimer, the term of this
patent is extended or adjusted under 35
U.S.C. 154(b) by 512 days.

This patent is subject to a terminal dis-
claimer.

(21) Appl. No.: 18/071,931

(22) Filed: Nov. 30, 2022

(65) Prior Publication Data

US 2023/0168476 A1 Jun. 1, 2023

(30) Foreign Application Priority Data

Dec. 1, 2021 (JP) ................................. 2021-195271

(51) Int. Cl.
*G02B 9/00* (2006.01)
*G02B 13/16* (2006.01)
(Continued)

(52) U.S. Cl.
CPC ............. *G02B 13/16* (2013.01); *G02B 13/22*
(2013.01); *G02B 15/20* (2013.01)

(58) Field of Classification Search
CPC ... G02B 9/00; G02B 9/04; G02B 9/08; G02B
9/12; G02B 9/60; G02B 9/62; G02B
9/64;
(Continued)

(56) References Cited

U.S. PATENT DOCUMENTS

2006/0132723 A1 6/2006 Yamagishi
2018/0113286 A1* 4/2018 Minefuji .................. G02B 7/10
(Continued)

FOREIGN PATENT DOCUMENTS

JP 2012-118243 A 6/2012
JP 2014-190999 A 10/2014
(Continued)

OTHER PUBLICATIONS

Apr. 15, 2025 U.S. Office Action issued in U.S. Appl. No. 18/072,121.
(Continued)

*Primary Examiner* — Thong Q Nguyen
(74) *Attorney, Agent, or Firm* — Oliff PLC

(57) ABSTRACT
A projection system includes first lens group having nega-
tive power and second lens group having positive power
sequentially arranged from enlargement side toward reduc-
tion side. first lens group includes first-a lens group having
negative power, first-b lens group located at reduction side
of first-a lens group and having negative power, and first-c
lens group located at reduction side of first-b lens group and
having positive power. Sum of number of lenses of first-a
lens group and number of lenses of first-b lens group is
smaller than or equal to three. Projection system satisfies
each of Conditional Expressions (1) and (2) below, $$BF/F>5.0 \qquad (1)$$

$$0.3<|F/F1ab|<1.0 \qquad (2)$$

where F represents the focal length of the overall projec-
tion system, BF represents the back focal length in air,
and F1ab represents the combined focal length of the
first-a lens group and the first-b lens group.

9 Claims, 30 Drawing Sheets

(51) Int. Cl.
    *G02B 13/22*        (2006.01)
    *G02B 15/20*        (2006.01)

(58) Field of Classification Search
    CPC .... G02B 13/00; G02B 13/001; G02B 13/015;
                G02B 13/002; G02B 13/003; G02B
           13/0035; G02B 13/004; G02B 13/0045;
           G02B 13/18; G02B 13/16; G02B 13/22
    USPC ................................................ 359/649–651
    See application file for complete search history.

(56)                References Cited

U.S. PATENT DOCUMENTS

2018/0173088 A1*    6/2018    Minefuji ................ G02B 13/16

2020/0088977 A1     3/2020    Shiokawa et al.
2023/0168477 A1*    6/2023    Minefuji ............ G02B 15/1465
                                              353/101

FOREIGN PATENT DOCUMENTS

JP         2017-126036 A      7/2017
JP         2018-194619 A     12/2018

OTHER PUBLICATIONS

Aug. 4, 2025 Notice of Allowance Issued in U.S. Appl. No. 18/072,121.
U.S. Appl. No. 18/072,121, filed Nov. 30, 2022 in the name of Minefuji, et al.

* cited by examiner

PROJECTION SYSTEM AND PROJECTOR

The present application is based on, and claims priority from JP Application Serial Number 2021-195271, filed Dec. 1, 2021, the disclosure of which is hereby incorporated by reference herein in its entirety.

BACKGROUND

1. Technical Field

The present disclosure relates to a projection system and a projector.

2. Related Art

A projection system having a changeable projection distance is described in JP-A-2018-194619. The projection system described in JP-A-2018-194619 includes a first lens group, a second lens group, a third lens group, a fourth lens group, and a fifth lens group sequentially arranged from the enlargement side toward the reduction side. The first lens group includes a first sub-lens group, a second sub-lens group, and a third sub-lens group sequentially arranged from the enlargement side toward the reduction side. The first sub-lens group is formed of a single lens. The second sub-lens group is formed of three lens. The third sub-lens group is formed of a single lens. When the projection distance is changed, the first sub-lens group, the second sub-lens group, and the third sub-lens group are moved in the optical axis direction for focusing.

When the weight of an enlargement-side end portion of the projection system increases, the center of gravity of the projection system shifts toward the enlargement-side end portion. When the projection system is incorporated in the enclosure of the projector, the center of gravity of the projector shifts toward the enlargement-side end portion of the projection system, causing the projector to lose balance in some cases. To avoid or suppress the situation described above, it is desired to suppress the total number of lenses in the first and second sub-lens groups, which are located on the enlargement side, in the lens group located at a position closest to the enlargement side in the projection system.

SUMMARY

To achieve the object described above, a projection system according to an aspect of the present disclosure includes a first lens group having negative power and a second lens group having positive power sequentially arranged from an enlargement side toward a reduction side. The reduction side of the second lens group forms a telecentric system. The first lens group includes a first-a lens group having negative power, a first-b lens group located at the reduction side of the first-a lens group and having negative power, and a first-c lens group located at the reduction side of the first-b lens group and having positive power. The first-a lens group is formed only of a lens having negative power. The first-b lens group is formed only of a lens having negative power. A first lens located at a position closest to the enlargement side in the first-a lens group has aspheric surfaces at opposite sides. A sum of the number of lenses of the first-a lens group and the number of lenses of the first-b lens group is smaller than or equal to three. The first-b lens group and the first-c lens group each move in a direction of an optical axis during focusing. The projection system satisfies each of Conditional Expressions (1) and (2) below, $$BF/F > 5.0 \tag{1}$$

$$0.3 < |F/F1ab| < 1.0 \tag{2}$$

where F represents a focal length of the overall projection system, BF represents a back focal length in air, and F1ab represents a combined focal length of the first-a lens group and the first-b lens group.

A projector according to another aspect of the present disclosure includes a light modulator that modulates light outputted from a light source, and the projection system described above, which projects the light modulated by the light modulator.

DESCRIPTION OF EXEMPLARY EMBODIMENTS

An optical system and a projector according to an embodiment of the present disclosure will be described below with reference to the drawings.

Projector

Figure 1:
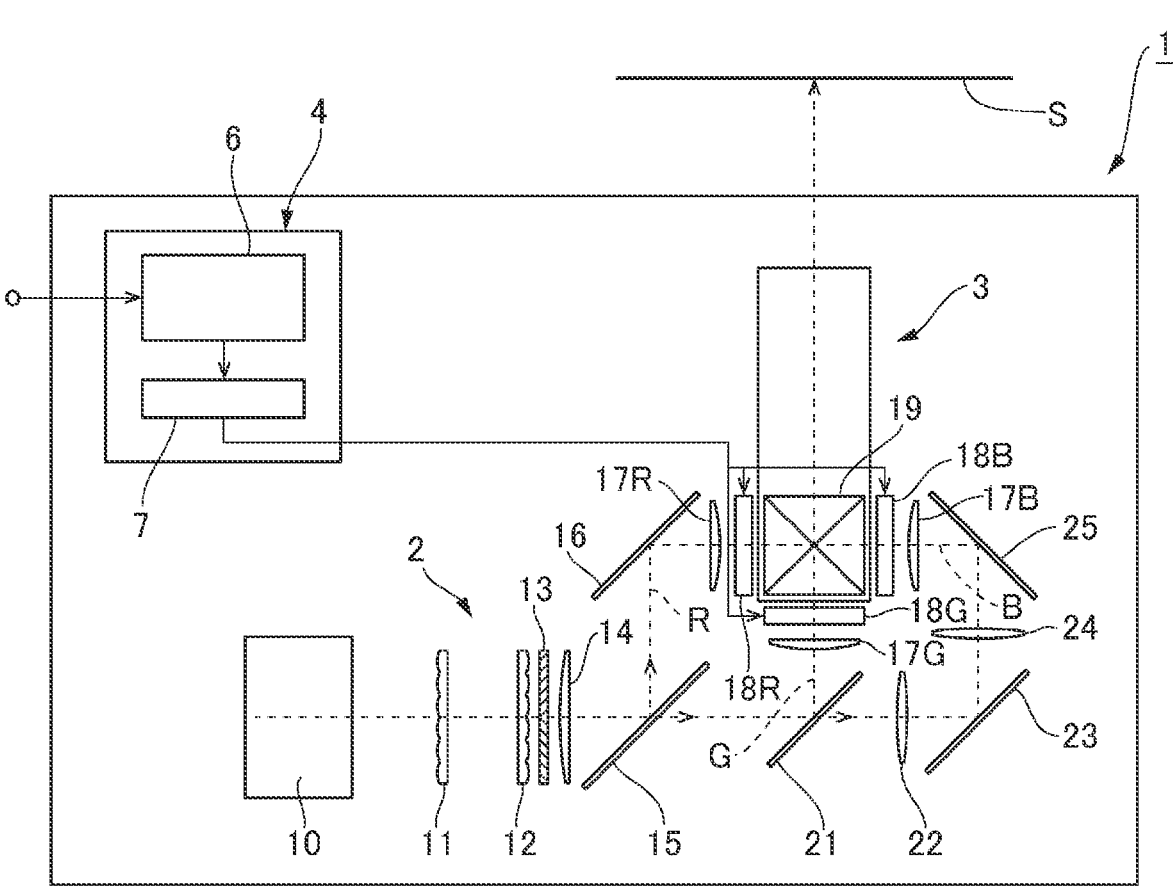
FIG. 1 shows a schematic configuration of a projector including a projection system according to an embodiment of the present disclosure.

FIG. 1 shows a schematic configuration of a projector including a projection system 3 according to the embodiment of the present disclosure. A projector 1 includes an image formation unit 2, which generates a projection image to be projected onto a screen S, the projection system 3, which enlarges the projection image and projects the enlarged image onto the screen S, and a controller 4, which controls the operation of the image formation unit 2, as shown in FIG. 1.

Image Formation Unit and Controller

The image formation unit 2 includes a light source 10, a first optical integration lens 11, a second optical integration lens 12, a polarization converter 13, and a superimposing lens 14. The light source 10 is formed, for example, of an ultrahigh-pressure mercury lamp or a solid-state light source. The first optical integration lens 11 and the second optical integration lens 12 each include a plurality of lens elements arranged in an array. The first optical integration lens 11 divides a luminous flux from the light source 10 into a plurality of luminous fluxes. The lens elements of the first optical integration lens 11 focus the luminous flux from the light source 10 in the vicinity of each of the lens elements of the second optical integration lens 12.

The polarization converter 13 converts the light via the second optical integration lens 12 into predetermined linearly polarized light. The superimposing lens 14 superimposes images of the lens elements of the first optical integration lens 11 on one another in a display region of each of liquid crystal panels 18R, 18G, and 18B, which will be described later, via the second optical integration lens 12.

The image formation unit 2 further includes a first dichroic mirror 15, a reflection mirror 16, a field lens 17R, and the liquid crystal panel 18R. The first dichroic mirror 15 reflects R light, which is part of the beam incident via the superimposing lens 14, and transmits G light and B light, which are part of the beam incident via the superimposing lens 14. The R light reflected off the first dichroic mirror 15 travels via the reflection mirror 16 and the field lens 17R and is incident on the liquid crystal panel 18R. The liquid crystal panel 18R is a light modulator. The liquid crystal panel 18R modulates the R light in accordance with an image signal to form a red projection image.

The image formation unit 2 further includes a second dichroic mirror 21, a field lens 17G, and the liquid crystal panel 18G. The second dichroic mirror 21 reflects the G light, which is part of the beam via the first dichroic mirror 15, and transmits the B light, which is part of the beam via the first dichroic mirror 15. The G light reflected off the second dichroic mirror 21 passes through the field lens 17G and is incident on the liquid crystal panel 18G. The liquid crystal panel 18G is a light modulator. The liquid crystal panel 18G modulates the G light in accordance with an image signal to form a green projection image.

The image formation unit 2 further includes a relay lens 22, a reflection mirror 23, a relay lens 24, a reflection mirror 25, a field lens 17B, the liquid crystal panel 18B, and a cross dichroic prism 19. The B light having passed through the second dichroic mirror 21 travels via the relay lens 22, the reflection mirror 23, the relay lens 24, the reflection mirror 25, and the field lens 17B and is incident on the liquid crystal panel 18B. The liquid crystal panel 18B is a light modulator. The liquid crystal panel 18B modulates the B light in accordance with an image signal to form a blue projection image.

The liquid crystal panels 18R, 18G, and 18B surround the cross dichroic prism 19 in such a way that the liquid crystal panels 18R, 18G, and 18B face three sides of the cross dichroic prism 19. The cross dichroic prism 19, which is a prism for light combination, produces a projection image that is the combination of the light modulated by the liquid crystal panel 18R, the light modulated by the liquid crystal panel 18G, and the light modulated by the liquid crystal panel 18B.

The projection system 3 enlarges and projects the combined projection image from the cross dichroic prism 19 onto the screen S.

The controller 4 includes an image processor 6, to which an external image signal, such as a video signal, is inputted, and a display driver 7, which drives the liquid crystal panels 18R, 18G, and 18B based on image signals outputted from the image processor 6.

The image processor 6 converts an image signal inputted from an external apparatus into image signals each containing grayscales and other factors of the corresponding color. The display driver 7 operates the liquid crystal panels 18R, 18G, and 18B based on the color projection image signals outputted from the image processor 6. The image processor 6 thus causes the liquid crystal panels 18R, 18G, and 18B to display projection images corresponding to the image signals.

Projection System

Figure 2:
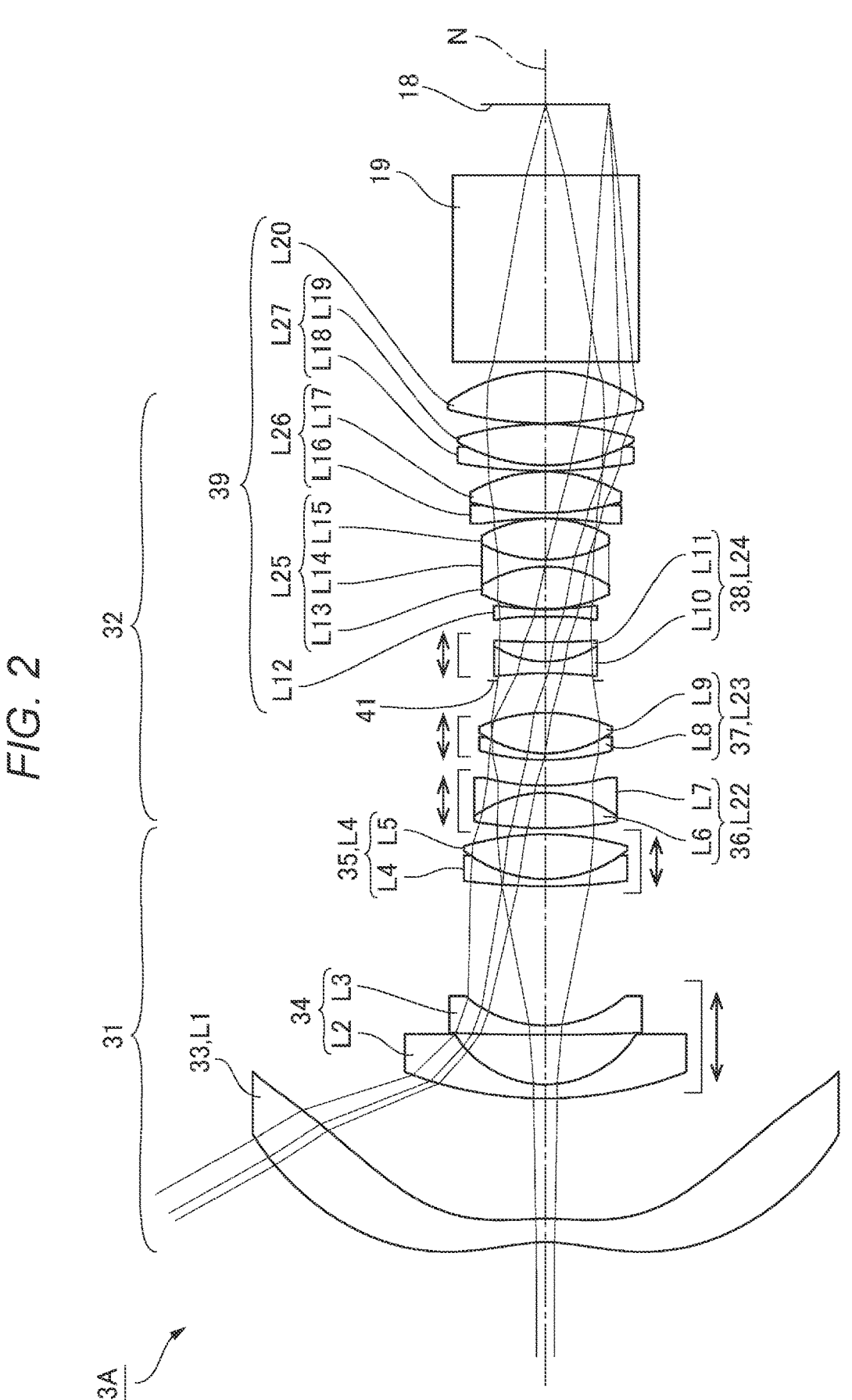
FIG. 2 is a beam diagram showing beams passing through the projection system according to Example 1.

The projection system 3 will next be described. FIG. 2 is a beam diagram showing beams passing through the projection system 3. In FIG. 2, the liquid crystal panels 18R, 18G, and 18B are drawn as a liquid crystal panel 18. The screen S is disposed in the enlargement-side conjugate plane of the projection system 3, as shown in FIG. 1. The liquid crystal panel 18 is disposed in the reduction-side conjugate plane of the projection system 3.

The liquid crystal panel 18 disposed in the reduction-side conjugate plane forms a projection image at one side an optical axis N of the projection system 3, as shown in FIG. 2. An enlarged image projected by the projection system 3 onto the screen S is formed at the other side of the optical axis N.

Examples 1 to 5 will be described below as examples of the configuration of the projection system 3 incorporated in the projector 1.

Example 1

FIG. 2 is a beam diagram showing beams passing through a projection system 3A according to Example 1. The projection system 3A includes a first lens group 31 having negative power and a second lens group 32 having positive power sequentially arranged from the enlargement side toward the reduction side, as shown in FIG. 2. The projection system 3A further includes a stop 41 disposed in the second lens group 32. The stop 41 is disposed in the second lens group 32 at the position where the chief ray having the largest angle of view intersects with the optical axis N.

The first lens group 31 includes a first-a lens group 33 having negative power, a first-b lens group 34 located at the reduction side of the first-a lens group 33 and having negative power, and a first-c lens group 35 located at the reduction side of the first-b lens group 34 and having positive power.

The first-a lens group 33 is formed of a first lens L1. The first lens L1 has negative power in the vicinity of the optical axis N. The enlargement-side surface of the first lens L1 has a concave shape in the vicinity of the optical axis N and a convex shape at the periphery. The reduction-side surface of the first lens L1 has a convex shape in the vicinity of the optical axis N and a concave shape at the periphery. The first lens L1 has aspheric surfaces at opposite sides.

The first-b lens group 34 is formed of a second lens L2 and a third lens L3. The second lens L2 and the third lens L3 are arranged in this order from the enlargement side toward the reduction side. The second lens L2 has negative power. The second lens L2 is a meniscus lens. The second lens L2 has a convex enlargement-side surface and a concave reduction-side surface. The third lens L3 has negative power. The third lens L3 is a meniscus lens. The third lens L3 has a convex enlargement-side surface and a concave reduction-side surface.

The first-c lens group 35 is formed of a fourth lens L4 and a fifth lens L5. The fourth lens L4 and the fifth lens L5 are arranged in this order from the enlargement side toward the reduction side. The fourth lens L4 and the fifth lens L5 are bonded to each other into a cemented doublet L21. The fourth lens L4 has negative power. The fourth lens L4 is a meniscus lens. The fourth lens L4 has a convex enlargement-side surface and a concave reduction-side surface. The fifth lens L5 has positive power. The fifth lens L5 has convex surfaces both at the enlargement and reduction sides.

The second lens group 32 includes a second-a lens group 36 having negative power, a second-b lens group 37 located at the reduction side of the second-a lens group 36 and having positive power, a second-c lens group 38 located at the reduction side of the second-b lens group 37 and having negative power, and a second-d lens group 39 located at the reduction side of the second-c lens group 38. The stop 41 is disposed between the second-b lens group 37 and the second-c lens group 38.

The second-a lens group 36 is formed of a sixth lens L6 and a seventh lens L7. The sixth lens L6 and the seventh lens L7 are arranged in this order from the enlargement side toward the reduction side. The sixth lens L6 and the seventh lens L7 are bonded to each other into a cemented doublet L22. The sixth lens L6 has positive power. The sixth lens L6 has convex surfaces both at the enlargement and reduction sides. The seventh lens L7 has negative power. The seventh lens L7 has concave surfaces both at the enlargement and reduction sides.

The second-b lens group 37 is formed of an eighth lens L8 and a ninth lens L9. The eighth lens L8 and the ninth lens L9 are arranged in this order from the enlargement side toward the reduction side. The eighth lens L8 and the ninth lens L9 are bonded to each other into a cemented doublet L23. The eighth lens L8 has negative power. The eighth lens L8 is a meniscus lens. The eighth lens L8 has a convex enlargement-side surface and a concave reduction-side surface. The ninth lens L9 has positive power. The ninth lens L9 has convex surfaces both at the enlargement and reduction sides.

The second-c lens group 38 is formed of a tenth lens L10 and an eleventh lens L11. The tenth lens L10 and the eleventh lens L11 are arranged in this order from the enlargement side toward the reduction side. The tenth lens L10 and the eleventh lens L11 are bonded to each other into a cemented doublet L24. The tenth lens L10 has negative power. The tenth lens L10 has concave surfaces both at the enlargement and reduction sides. The eleventh lens L11 has positive power. The eleventh lens L11 is a meniscus lens. The eleventh lens L11 has a convex enlargement-side surface and a concave reduction-side surface.

The second-d lens group 39 is formed of nine lenses, a twelfth lens L12 to a twentieth lens L20. The twelfth lens L12 to the twentieth lens L20 are arranged in this order from the enlargement side toward the reduction side. The twelfth lens L12 has negative power. The twelfth lens L12 has concave surfaces both at the enlargement and reduction sides. The twelfth lens L12 has aspheric surfaces at opposite sides.

The thirteenth lens L13 has positive power. The thirteenth lens L13 has convex surfaces both at the enlargement and reduction sides. The fourteenth lens L14 has negative power. The fourteenth lens L14 has concave surfaces both at the enlargement and reduction sides. The fifteenth lens L15 has positive power. The fifteenth lens L15 has convex surfaces both at the enlargement and reduction sides. The thirteenth lens L13, the fourteenth lens L14, and the fifteenth lens L15 are bonded to each other into a cemented triplet L25.

The sixteenth lens L16 has negative power. The sixteenth lens L16 has concave surfaces both at the enlargement and reduction sides. The seventeenth lens L17 has positive power. The seventeenth lens L17 has convex surfaces both at the enlargement and reduction sides. The sixteenth lens L16 and the seventeenth lens L17 are bonded to each other into a cemented doublet L26.

The eighteenth lens L18 has negative power. The eighteenth lens L18 is a meniscus lens. The eighteenth lens L18 has a convex enlargement-side surface and a concave reduction-side surface. The nineteenth lens L19 has positive power. The nineteenth lens L19 has convex surfaces both at the enlargement and reduction sides. The eighteenth lens L18 and the nineteenth lens L19 are bonded to each other into a cemented doublet L27.

The twentieth lens L20 has positive power. The twentieth lens L20 has convex surfaces both at the enlargement and reduction sides.

The first lens L1 is made of resin. The second lens L2 to the twentieth lens L20 are made of glass.

In the projection system 3A, the reduction side of the twentieth lens L20 of the second lens group 32 forms a telecentric system. The term "telecentric" means that the central beam of each luminous flux traveling between the twentieth lens L20 and the liquid crystal panel 18 disposed in the reduction-side conjugate plane is parallel or substantially parallel to the optical axis of the projection system. The term "telecentric" in the present specification means that the angle between the center beam of each of the luminous fluxes and the optical axis N is smaller than or equal to ±5°.

The projection system 3A has a changeable projection distance. To change the projection distance, the first-b lens group 34 and the first-c lens group 35 are each moved in the direction of the optical axis N for focusing.

The projection system 3A can also change the magnification factor in accordance with which an enlarged image is formed. To change the magnification factor in accordance with which an enlarged image is formed, the second-a lens group 36, the second-b lens group 37, and the second-c lens group 38 are each moved in the direction of the optical axis N for zooming. In the present example, the magnification factor in accordance with which an enlarged image is formed is about 1.08.

Data on the projection system 3A are listed in a table below. In the table, FNo represents the f number of the projection system 3A, F represents the focal length of the overall projection system, ω represents half the angle of view, BF represents the back focal length in air, F1b represents the focal length of the first-b lens group 34, F1c represents the focal length of the first-c lens group 35, F1ab represents the combined focal length of the first-a lens group 33 and the first-b lens group 34, F2a represents the focal length of the second-a lens group 36, F2b represents the focal length of the second-b lens group 37, F1 represents the focal length of the first lens group 31, and F2 represents the focal length of the second lens group 32.

| | |
|---|---|
| FNo | 1.9 |
| F (wide-angle end to telescopic end) | 7.540 mm to 8.140 mm |
| ω (wide-angle end to telescopic end) | 60.6° to 58.9° |
| BF | 43.138 mm |
| F1b | −15.481 mm |
| F1c | 60.425 mm |
| F1ab | −10.463 mm |
| F2a | −63.165 mm |
| F2b | 34.515 mm |
| F1 | −79.200 mm |
| F2 | 40.964 mm |

Data on the lenses of the projection system 3A are listed below. The surfaces of the lenses are numbered sequentially from the enlargement side to the reduction side. Reference characters are given to the screen, the lenses, the stop, the dichroic prism, and the liquid crystal panels. Data labeled with a surface number that does not correspond to any of the screen, the lenses, the stop, the dichroic prism, or the liquid crystal panels is dummy data. An aspheric surface has a surface number followed by *. Reference character R represents the radius of curvature. Reference character D represents the axial inter-surface spacing. Reference character nd represents the refractive index at the d line. Reference character vd represents the Abbe number at the d line. Reference characters R and D are expressed in millimeters.

| Reference character | Surface number | R | D | nd | vd |
|---|---|---|---|---|---|
| S | 0 | Infinity | Variable spacing 1 | | |
| L1 | 1* | −31.570 | 5.000 | 1.53116 | 56.04 |
| | 2* | −69.927 | Variable spacing 2 | | |
| L2 | 3 | 81.356 | 3.000 | 1.83481 | 42.72 |
| | 4 | 22.690 | 10.537 | | |
| L3 | 5 | 458.537 | 2.000 | 1.83481 | 42.72 |
| | 6 | 26.354 | Variable spacing 3 | | |
| L4 | 7 | 135.736 | 1.500 | 1.72916 | 54.68 |
| L5 | 8 | 27.825 | 9.500 | 1.71736 | 29.52 |
| | 9 | −60.798 | Variable spacing 4 | | |
| L6 | 10 | 81.675 | 7.500 | 1.80809 | 22.76 |
| L7 | 11 | −25.447 | 1.500 | 1.98612 | 16.48 |
| | 12 | 50.481 | Variable spacing 5 | | |
| L8 | 13 | 51.590 | 1.400 | 1.77250 | 49.60 |
| L9 | 14 | 24.731 | 8.500 | 1.67270 | 32.10 |
| | 15 | −35.296 | Variable spacing 6 | | |
| 41 | 16 | Infinity | 1.531 | | |
| L10 | 17 | −85.133 | 2.500 | 1.85150 | 40.78 |
| L11 | 18 | 19.584 | 4.147 | 1.86966 | 20.02 |
| | 19 | 173.628 | Variable spacing 7 | | |
| L12 | 20* | −356.258 | 1.500 | 1.88202 | 37.22 |
| | 21* | 48.253 | 0.100 | | |
| L13 | 22 | 30.697 | 9.000 | 1.72825 | 28.46 |
| L14 | 23 | −25.000 | 1.500 | 1.90043 | 37.37 |
| L15 | 24 | 29.537 | 8.660 | 1.48749 | 70.24 |
| | 25 | −27.531 | 0.100 | | |
| L16 | 26 | −78.802 | 1.200 | 2.00069 | 25.46 |
| L17 | 27 | 57.829 | 8.600 | 1.48749 | 70.24 |
| | 28 | −32.323 | 0.200 | | |
| L18 | 29 | 106.054 | 1.200 | 2.00100 | 29.13 |
| L19 | 30 | 38.114 | 8.729 | 1.49700 | 81.54 |
| | 31 | −62.282 | 0.200 | | |
| L20 | 32 | 74.967 | 11.000 | 1.49700 | 81.54 |
| | 33 | −35.710 | 2.000 | | |
| 19 | 34 | Infinity | 39.600 | 1.51680 | 64.20 |
| | 35 | Infinity | 15.068 | | |
| 18 | 36 | Infinity | | | |

The projection system 3A according to the present example has a changeable projection distance selected from a standard distance, a short distance shorter than the standard distance, and a long distance longer than the standard distance. To change the projection distance, the first-b lens group 34 and the first-c lens group 35 are each moved in the direction of the optical axis N for focusing. In the projection system 3A according to the present example, the second-a lens group 36, the second-b lens group 37, and the second-c lens group 38 can each be moved in the direction of the optical axis N for zooming. The angle of view is changed between the values at the wide-angle and telescopic ends by performing zooming at each of the projection distances.

The table below shows the variable spacings 1, 2, 3, 4, 5, 6, and 7 at the projection distances where the focusing and zooming are performed. The variable spacing 1 is the projection distance. The variable spacing 2 is the axial inter-surface spacing between the first lens L1 and the second lens L2. The variable spacing 3 is the axial inter-surface spacing between the third lens L3 and the fourth lens L4. The variable spacing 4 is the axial inter-surface spacing between the fifth lens L5 and the sixth lens L6. The variable spacing 5 is the axial inter-surface spacing between the seventh lens L7 and the eighth lens L8. The variable spacing 6 is the axial inter-surface spacing between the ninth lens L9 and the stop 41. The variable spacing 7 is the axial inter-surface spacing between the eleventh lens L11 and the twelfth lens L12.

When the projection distance is the long distance, the variable spacings are listed below.

|  | Wide-angle end | Telescopic end |
| --- | --- | --- |
| Variable spacing 1 | 10900.000 | 10900.000 |
| Variable spacing 2 | 25.079 | 24.082 |
| Variable spacing 3 | 29.441 | 28.082 |
| Variable spacing 4 | 1.734 | 3.099 |
| Variable spacing 5 | 5.512 | 4.791 |
| Variable spacing 6 | 6.804 | 10.582 |
| Variable spacing 7 | 5.399 | 3.333 |

When the projection distance is the standard distance, the variable spacings are listed below.

|  | Wide-angle end | Telescopic end |
| --- | --- | --- |
| Variable spacing 1 | 1450.000 | 1450.000 |
| Variable spacing 2 | 25.436 | 24.453 |
| Variable spacing 3 | 29.510 | 28.154 |
| Variable spacing 4 | 1.308 | 2.656 |
| Variable spacing 5 | 5.512 | 4.791 |
| Variable spacing 6 | 6.804 | 10.582 |
| Variable spacing 7 | 5.399 | 3.333 |

When the projection distance is the short distance, the variable spacings are listed below.

|  | Wide-angle end | Telescopic end |
| --- | --- | --- |
| Variable spacing 1 | 1000.000 | 1000.000 |
| Variable spacing 2 | 25.194 | 24.609 |
| Variable spacing 3 | 29.540 | 28.189 |
| Variable spacing 4 | 1.520 | 2.465 |
| Variable spacing 5 | 5.512 | 4.791 |
| Variable spacing 6 | 6.804 | 10.582 |
| Variable spacing 7 | 5.399 | 3.333 |

The long projection distance of the projection system 3A is 10900.000 mm, and the short projection distance of the projection system 3A is 1000.000 mm. A projection distance ratio of the projection system 3A is therefore greater than or equal to 10. The projection distance ratio is the quotient of the operation of dividing the long projection distance by the short projection distance.

The aspheric coefficients are listed below.

| Surface number | 1 | 2 |
| --- | --- | --- |
| Radius of curvature (R) | −31.570 | −69.927 |
| Conic constant (K) | −10.370 | −100.000 |
| Third-order coefficient (A) | 2.73781E−04 | 1.98290E−04 |
| Fourth-order coefficient (A) | −2.15742E−06 | 8.09194E−06 |
| Fifth-order coefficient (A) | 8.79876E−08 | −6.74624E−08 |

-continued

| Surface number | 1 | 2 |
| --- | --- | --- |
| Sixth-order coefficient (A) | −4.03014E−09 | −2.39594E−09 |
| Seventh-order coefficient (A) | 6.94823E−11 | −7.38272E−11 |
| Eighth-order coefficient (A) | −1.34611E−12 | 4.31123E−12 |
| Ninth-order coefficient (A) | 3.83047E−14 | −1.56689E−13 |
| Tenth-order coefficient (A) | −1.76630E−16 | 4.09197E−15 |
| Eleventh-order coefficient (A) | −1.68383E−17 | −5.09746E−17 |
| Twelfth-order coefficient (A) | 3.88736E−19 | 2.11792E−19 |
| Thirteenth-order coefficient (A) | −3.41429E−21 | 2.37578E−23 |
| Fourteenth-order coefficient (A) | 1.11872E−23 | 3.02995E−24 |

| Surface number | 20 | 21 |
| --- | --- | --- |
| Radius of curvature (R) | −356.258 | 48.253 |
| Conic constant (K) | 0.000 | −11.533 |
| Fourth-order coefficient (A) | −6.19357E−05 | −3.73218E−05 |
| Sixth-order coefficient (A) | 2.03376E−07 | 2.29999E−07 |
| Eighth-order coefficient (A) | −3.62824E−10 | −7.47999E−10 |
| Tenth-order coefficient (A) | −1.28903E−12 | 1.36328E−12 |
| Twelfth-order coefficient (A) | 7.52849E−15 | −2.42971E−16 |
| Fourteenth-order coefficient (A) | 5.08437E−27 | −5.15036E−21 |
| Sixteenth-order coefficient (A) | 1.94873E−30 | 1.88458E−30 |

The projection system 3A according to the present example satisfies each of Conditional Expressions (1) and (2) below, $$BF/F > 5.0 \qquad (1)$$

$$0.3 < |F/F1ab| < 1.0 \qquad (2)$$

where F represents the focal length of the overall projection system, BF represents the back focal length in air, and F1ab represents the combined focal length of the first-a lens group 33 and the first-b lens group 34. The focal length F in this case is the focal length of the entire projection system at the wide-angle end.
In the present example,
F: 7.540 mm
BF: 43.138 mm
are satisfied. BF/F=5.721 is therefore satisfied, and Conditional Expression (1) is satisfied.
In the present example,
F: 7.540 mm
F1ab: −10.463 mm
are satisfied. |F/F1ab|=0.721 is therefore satisfied, and Conditional Expression (2) is satisfied.
The projection system 3A according to the present example further satisfies Conditional Expression (3) below, $$1.0 < |F2a/F2b| < 4.0 \qquad (3)$$

where F2a represents the focal length of the second-a lens group 36, and F2b represents the focal length of the second-b lens group 37.

In the present example,

F2a: −63.165 mm

F2b: 34.515 mm are satisfied. |F2a/F2|=1.830 is therefore satisfied, and Conditional Expression (3) is satisfied.

The projection system 3A according to the present example further satisfies each of Conditional Expressions (5) and (6) below, $$0.2 < |F/F1b| < 0.6 \qquad (5)$$

$$0.0 < F/F1c < 0.14 \qquad (6)$$

where F represents the focal length of the entire projection system, F1b represents the focal length of the first-b lens group 34, and F1c represents the focal length of the first-c lens group 35. The focal length F in this case is the focal length the entire projection system at the wide-angle end.

In the present example,

F: 7.540 mm

F1b: −15.481 mm are satisfied. |F/F1b|=0.487 is therefore satisfied, and Conditional Expression (5) is satisfied.

In the present example,

F: 7.540 mm

F1c: 60.425 mm are satisfied. F/F1c=0.125 is therefore satisfied, and Conditional Expression (6) is satisfied.

Effects and Advantages

The projection system 3A includes the first lens group 31 having negative power and the second lens group 32 having positive power sequentially arranged from the enlargement side toward the reduction side. The lenses at the reduction side of the second lens group 32 form a telecentric system. The first lens group 31 includes the first-a lens group 33 having negative power, the first-b lens group 34 located at the reduction side of the first-a lens group 33 and having negative power, and the first-c lens group 35 located at the reduction side of the first-b lens group 34 and having positive power. The first-a lens group 33 is formed of the single first lens L1. The first lens L1 has negative power in the vicinity of the optical axis N and has aspheric surfaces at opposite sides. The first-a lens group 33 is formed only of a lens having negative power. The first-b lens group 34 is formed only of lenses having negative power. The sum of the number of lenses of the first-a lens group 33 and the number of lenses of the first-b lens group 34 is three. The first-b lens group 34 and the first-c lens group 35 each move in the direction of the optical axis N during focusing.

In the projection system 3A according to the present example, the sum of the number of lenses of the first-a lens group 33 and the number of lenses of the first-b lens group 34 is three. The weight of the enlargement-side end portion of the projection system 3A can therefore be readily suppressed as compared with a case where the sum of the numbers of lenses is four or more.

Furthermore, in the projection system 3A according to the present example, in which the first lens L1 disposed at a position closest to the enlargement side has aspheric surfaces at opposite sides, distortion that occurs in an enlarged image projected on the screen S is readily corrected.

In the present example, the first lens L1 of the first-a lens group 33 is made of resin and can therefore be lighter than in a case where the first lens L1 is made of glass.

Furthermore, the projection system 3A according to the present example satisfies each of Conditional Expressions (1) and (2) below, $$BF/F > 5.0 \qquad (1)$$

$$0.3 < |F/F1ab| < 1.0 \qquad (2)$$

where F represents the focal length of the overall projection system, BF represents the back focal length in air, and F1ab represents the combined focal length of the first-a lens group 33 and the first-b lens group 34.

The projection system 3A, which satisfies Conditional Expression (1), can ensure a sufficient back focal length. That is, when the value of Conditional Expression (1) is smaller than the lower limit, the back focal length is too short, and it is therefore difficult to ensure a space for the light combining prism, compensators for the liquid crystal panels, and other components disposed at the reduction side of the projection system 3A. When the back focal length is too short, the spacing between each of the liquid crystal panels and the light combining prism decreases, so that the temperatures of the liquid crystal panels, the light combining prism, and therearound tend to increase. Furthermore, since the spacing between each of the liquid crystal panels and the light combining prism decreases, it is difficult to ensure the space required to air-cool the liquid crystal panels, the light combining prism, and therearound.

The projection system 3A, which satisfies Conditional Expression (2), can avoid a situation in which the number of lenses that form the first-a lens group 33 and the first-b lens group 34 is greater than three while ensuring a sufficient back focal length.

That is, when the value of Conditional Expression (2) is smaller than the lower limit, the first-a lens group 33 and the first-b lens group 34 have too long a combined focal length F1ab and therefore have small combined negative power. As a result, it is difficult to ensure a sufficiently long back focal length. Furthermore, the projection system 3A has along total length and therefore has a large size. When the value of Conditional Expression (2) is greater than the upper limit, the first-a lens group 33 and the first-b lens group 34 have too short a combined focal length F1ab and therefore have large combined negative power. As a result, the number of lenses needs to be increased to correct aberrations, resulting in an increase in the weight of the front portion of the projection system 3A and an extra cost.

In the present example, the first-a lens group 33 is formed of the first lens L1 made of resin. The first-b lens group 34 is formed of the second lens L2 and the third lens L3, the latter of which is located at the reduction side of the second lens L2. The second lens L2 is a meniscus lens having negative power and a convex enlargement-side surface. The third lens L3 is a meniscus lens having negative power and a concave reduction-side surface. In the configuration in which the first lens L1 is made of resin, the first lens L1 has a larger refractive index-temperature coefficient in accordance with which the refractive index changes with temperature and a larger coefficient of linear expansion than in the case where the first lens L1 is made of glass. Heat therefore tends to cause a change in the refractive index of the first lens L1 and deformation of the shape thereof. An increase in the negative power of the first lens L1 therefore tends to cause the image quality of an enlarged image to be affected by the heat. In contrast, in the present example, the first-b lens group 34 is formed of two negative lenses, and compensates for the insufficient power of the first lens L1. The negative power of the first lens L1 therefore does not need to be increased to excess, whereby the situation in which the image quality of an enlarged image tends to be affected by heat can be suppressed. In the first-b lens group 34, the second lens L2 and the third lens L3 are each a negative meniscus lens, whereby astigmatism and other aberrations produced by focusing can be suppressed.

When zooming is performed by moving a lens group in the direction of the optical axis N at a location where the height of the beam greatly changes, the aberrations produced by the zooming tend to greatly vary. In view of the fact described above, in the present example, the second lens group 32 includes the stop 41 disposed in the second lens group 32 at the position where the chief ray having the largest angle of view intersects with the optical axis N. The second lens group 32 includes the second-a lens group 36 and the second-b lens group 37, which are located at the enlargement side of the stop 41. The second-a lens group 36 is located at the enlargement side of the second-b lens group 37. The second-a lens group 36 and the second-b lens group 37 each move in the direction of the optical axis N during zooming. The aberrations produced during zooming can therefore be suppressed. Note that the stop 41 is placed for convenience of defining the f number and may therefore be an imaginary stop. In the case of a projection system, the stop 41 may be disposed because a luminous flux having an f number determined by the illumination system upstream from the liquid crystal panels 18 enters the projection system, but the fact that only a luminous flux determined by the illumination system passes through the stop 41 eliminates the necessity of the stop 41 in some cases. The stop 41, when disposed, can suppress occurrence of the aberrations as described above. The position of the stop 41 is, however, the location where all luminous fluxes gather in the projection system, so that light having a width wider than the width determined by the f number of the illumination system impinges on the stop, such as light sneaking due, for example, to diffraction resulting, for example, from shrinkage of the size of the pixels of the liquid crystal panels 18, resulting in creation of a heat source, which causes deformation of the shape of a lens surface, variation in the refractive index of a lens, and other problems, leading in some cases to degradation of the performance of the projection system. Placing no stop 41 therefore provides a better result in some cases. In such cases, a fixed stop disposed in association with another lens can suppress unwanted light and occurrence of the aberrations.

In the present example, the projection system 3A satisfies Conditional Expression (3) below, $$1.0<|F2a/F2b|<4.0 \tag{3}$$

where F2a represents the focal length of the second-a lens group 36, and F2b represents the focal length of the second-b lens group 37.

The projection system 3A according to the present example, which satisfies Conditional Expression (3), can suppress occurrence of the aberrations while suppressing an increase in the size of the entire length of the projection system. That is, when the value of Conditional Expression (3) is smaller than the lower limit, the focal length F2a of the second-a lens group 36 is too short. In other words, the second-a lens group 36 has too large negative power. As a result, it is difficult to correct astigmatism at the wide-angle end and the telescopic end in a well-balanced manner. When the value of Conditional Expression (3) is greater than the upper limit, the second-a lens group 36 has too long a focal length, or the second-b lens group 37 has too short a focal length. When the second-a lens group 36 has too long a focal length, the negative power of the second-a lens group 36 decreases, so that the amount of movement of the second-a lens group 36 increases. The total length of the projection system therefore increases. When the second-b lens group 37 has too short a focal length, the second-b lens group 37 has too large positive power, so that spherical aberrations and coma aberration tend to be produced, resulting in a decrease in the contrast of an enlarged image.

The projection distance ratio of the projection system 3A according to the present example is greater than or equal to 10 as described above. In recent years, multi-projection, in which enlarged images projected by a plurality of projectors are linked to each other and projected as a single integrated image, may be used at event venues and other places. Projectors used at such event venues are desired to be capable of flexibly changing the projection distance in accordance with the size and other factors of the event venue. In view of the requirement, the projection distance ratio of the projection system 3A according to the present example is greater than projection distance ratios of about 5 of related-art projection systems. The projection distance can therefore be flexibly changed by using the projector 1 including the projection system 3A.

In the multi-projection, even a slight magnification error produced by each of the projectors causes a discrepancy between adjacent enlarged images, and the integrated image causes an uncomfortable feeling. To address the problem described above, the projection system 3A according to the present example can change the magnification factor in accordance with which an enlarged image is formed through zooming. The projectors can thus readily correct the magnification errors. In addition, the projection system 3A can suppress occurrence of the zooming induced aberrations. The projector 1 including the projection system 3A is therefore suitable for multi-projection-related applications.

The projection system 3A according to the present example satisfies each of Conditional Expressions (5) and (6) below, $$0.2<|F/F1b|<0.6 \tag{5}$$

$$0.0<F/F1c<0.14 \tag{6}$$

where F represents the focal length of the entire projection system, F1b represents the focal length of the first-b lens group 34, and F1c represents the focal length of the first-c lens group 35.

The projection system 3A according to the present example, which satisfies Conditional Expression (5), can suppress occurrence of field curvature even when the projection distance ratio is approximately 10 while maintaining a sufficient back focal length. In addition, focus adjustment during focusing is readily made.

That is, when the value of Conditional Expression (5) is smaller than the lower limit, the first-b lens group 34 has too long a focal length. In other words, the first-b lens group 34 has too small negative power. As a result, the negative power of the entire first lens group 31 becomes small, making it difficult to maintain a sufficient back focal length. When the value of Conditional Expression (5) is greater than the upper limit, the first-b lens group 34 has too short a focal length. That is, the first-b lens group 34 has too large negative power. The first-b lens group 34 thus moves by too small an amount during focusing. As a result, focus adjustment becomes difficult due to an increase in focus adjustment sensitivity, and the amount of field curvature increases when the projection distance is changed.

The projection system 3A according to the present example, which satisfies Conditional Expression (6), can satisfactorily correct the aberrations produced by a change in the projection distance even when the projection distance ratio is approximately 10. That is, when the value of Conditional Expression (6) is smaller than the lower limit, the first-c lens group 35 has too small positive power or negative power. As a result, it is difficult to satisfactorily correct the field curvature caused by variation in the projection distance. When the value of Conditional Expression (6) is greater than the upper limit, the first-c lens group 35 has too large positive power, which makes it difficult to correct astigmatism in a well-balanced manner in a region from the vicinity of the optical axis N to a large image height. The focus shift in the vicinity of the optical axis N also increases, so that the focus position in the vicinity of the optical axis N needs to be adjusted again by the first-b lens group 34. The focusing is therefore complicated.

In the present example, the second lens group 32 includes six cemented doublets and triplets in total. The chromatic aberrations can therefore be corrected well.

Figure 3:
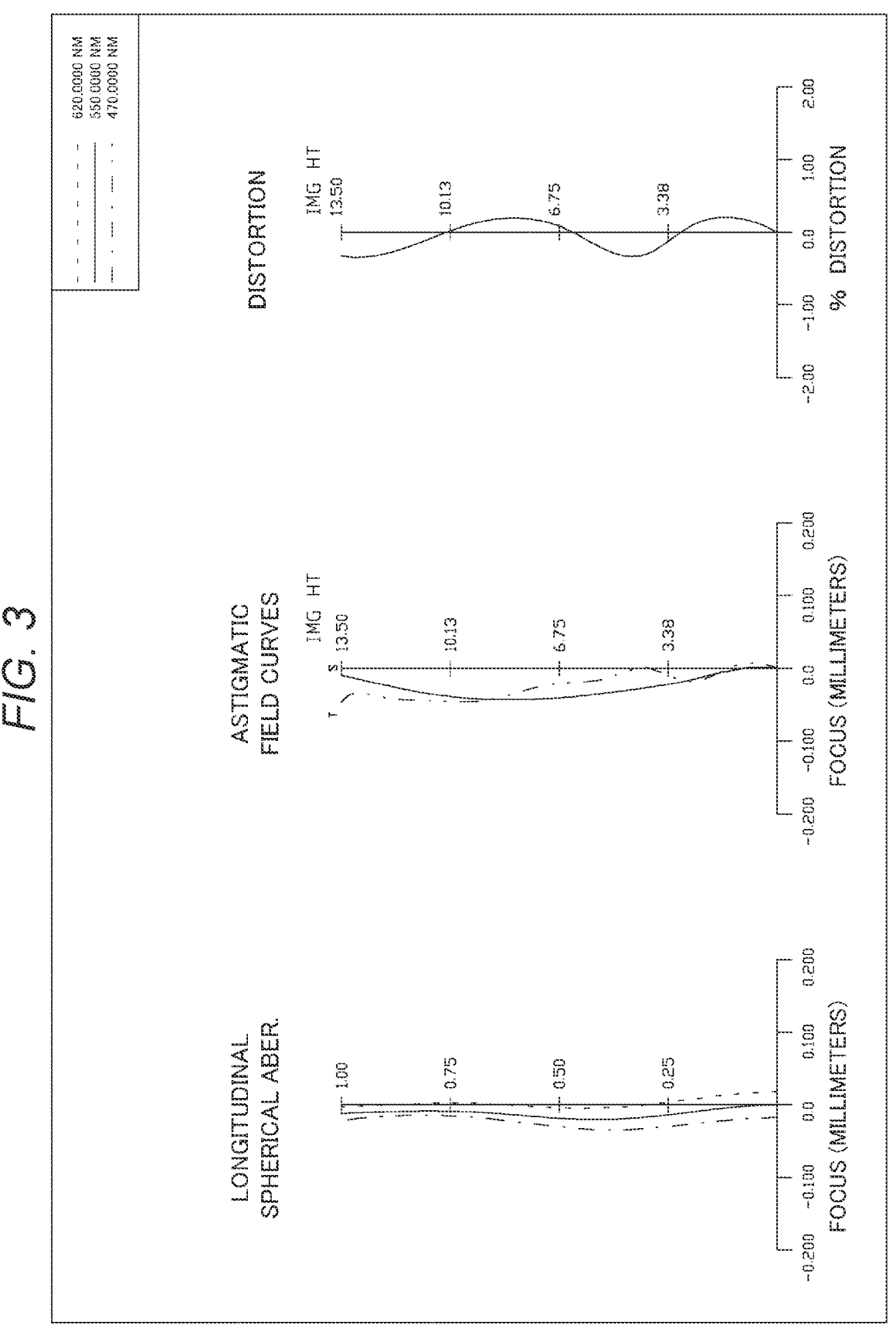
FIG. 3 shows spherical aberration, astigmatism, and distortion produced by the projection system according to Example 1 at the wide-angle end and a standard distance.
Figure 4:
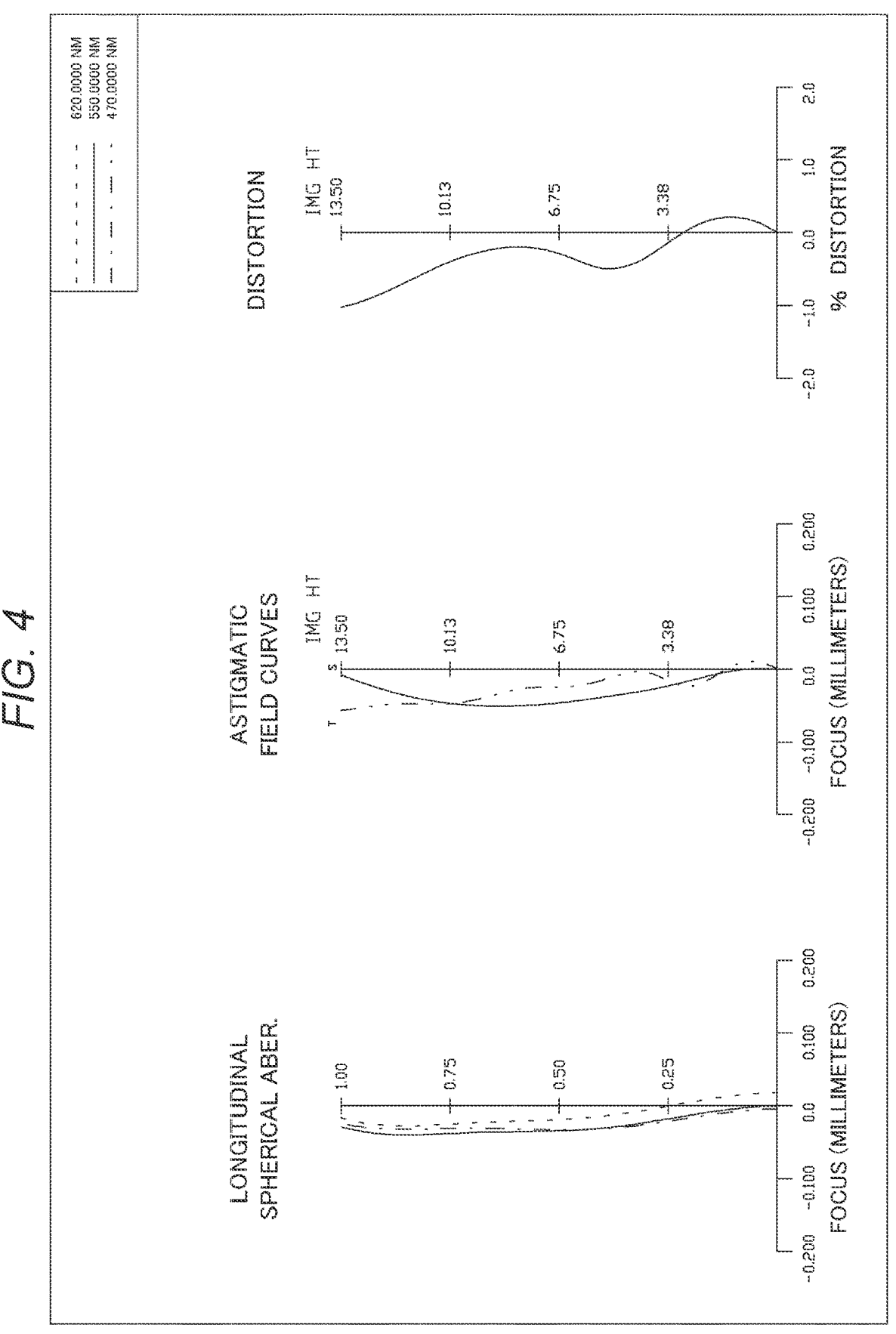
FIG. 4 shows the spherical aberration, astigmatism, and distortion produced by the projection system according to Example 1 at the telescopic end and the standard distance.
Figure 5:
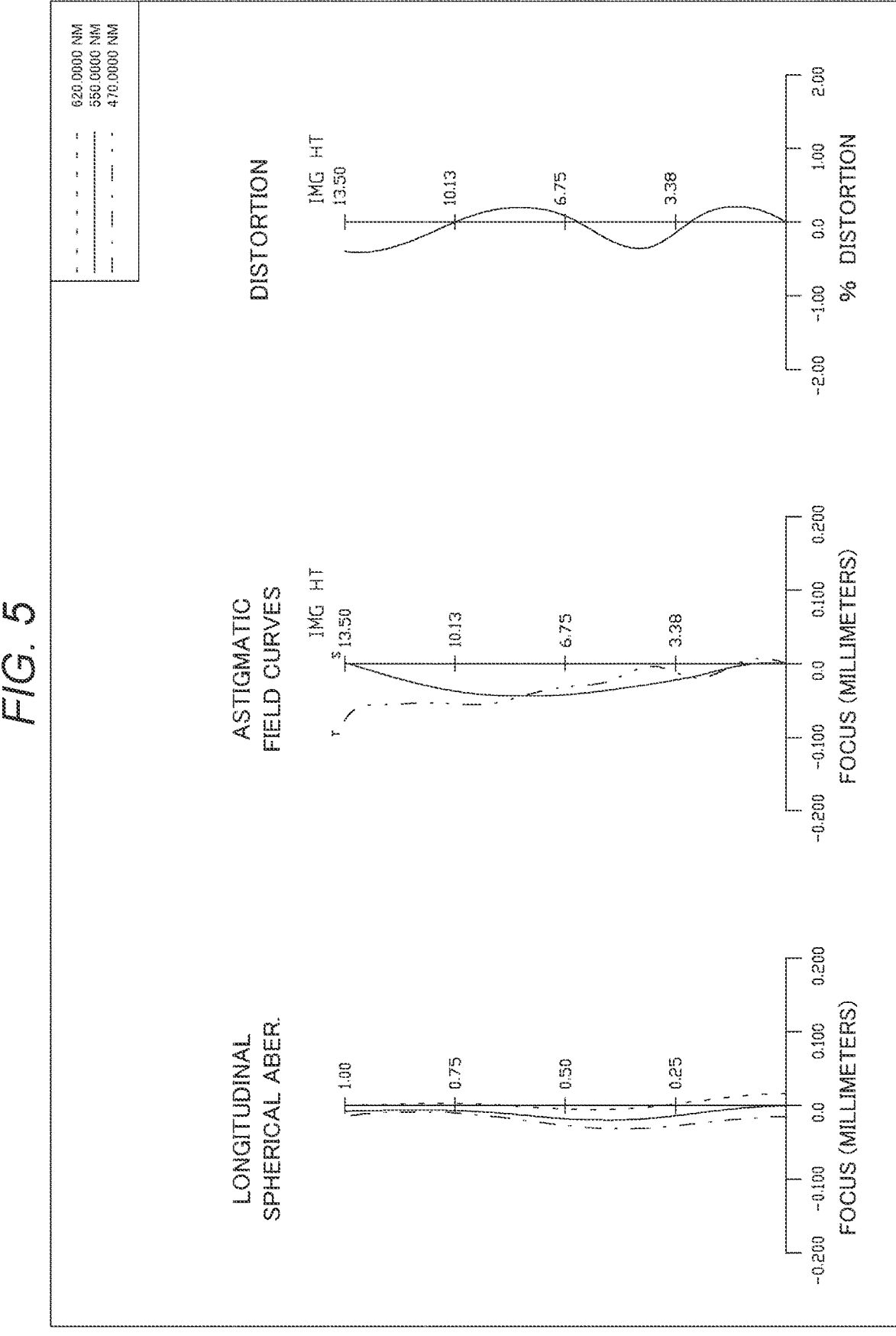
FIG. 5 shows the spherical aberration, astigmatism, and distortion produced by the projection system according to Example 1 at the wide-angle end and a long distance.
Figure 6:
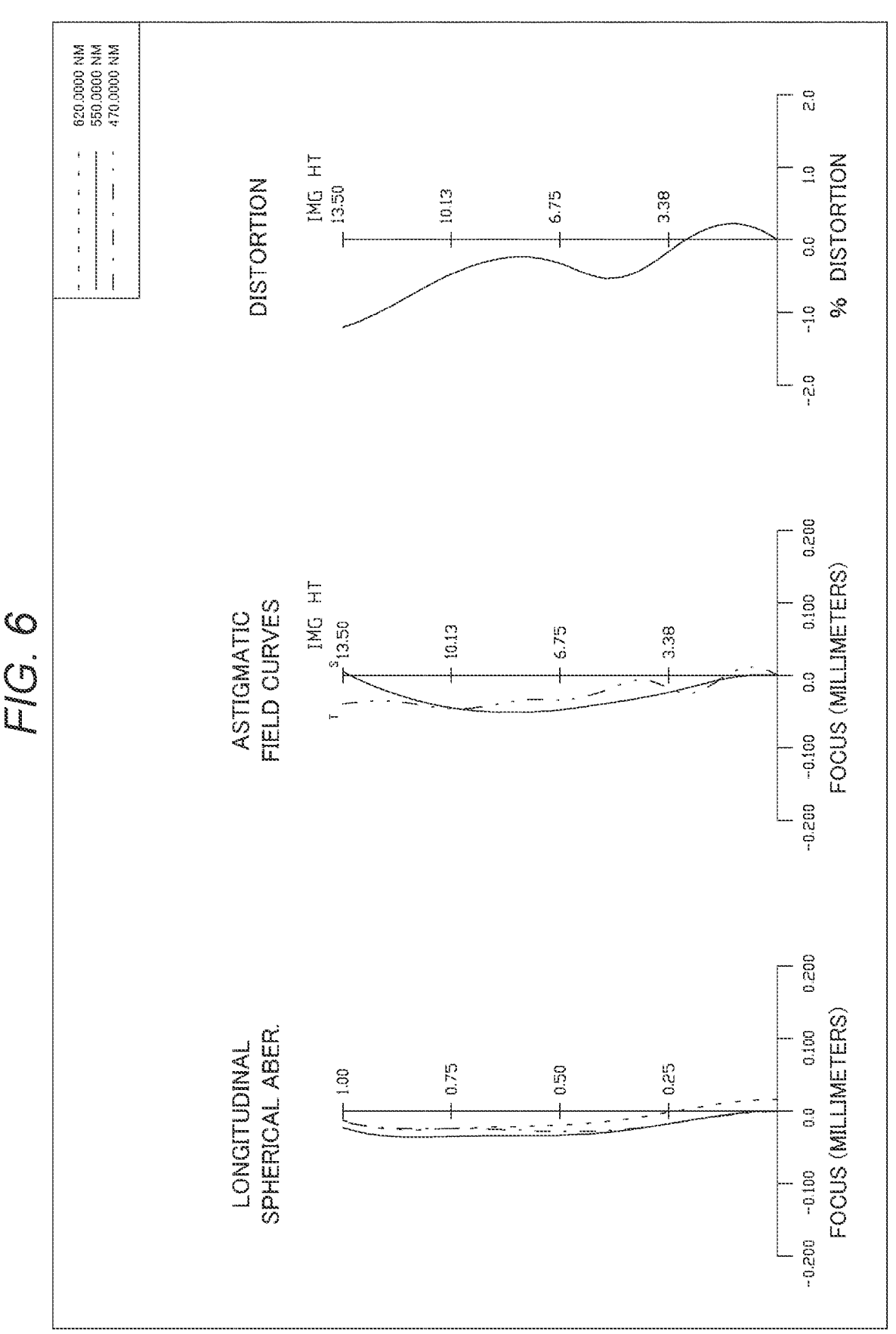
FIG. 6 shows the spherical aberration, astigmatism, and distortion produced by the projection system according to Example 1 at the telescopic end and the long distance.
Figure 7:
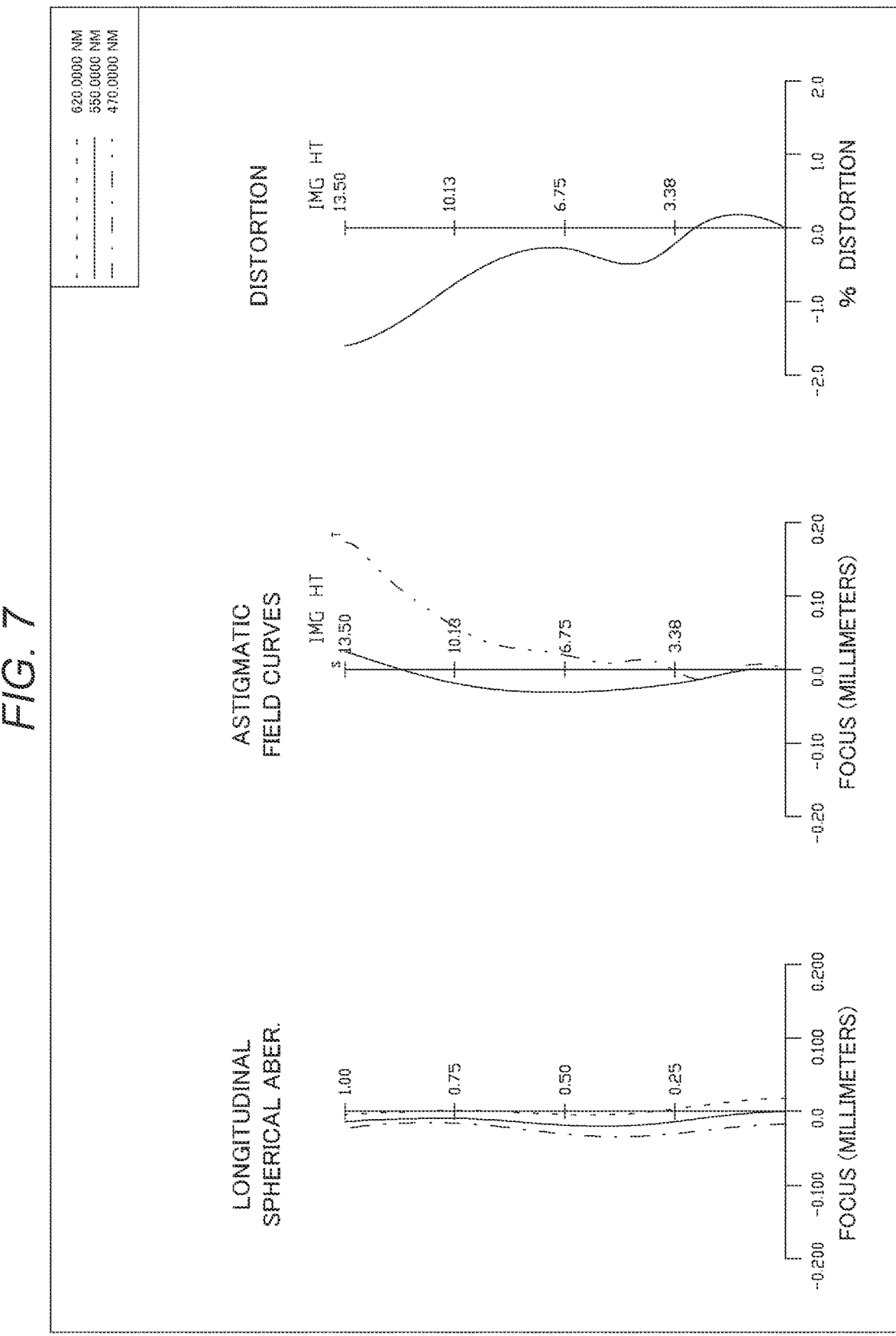
FIG. 7 shows the spherical aberration, astigmatism, and distortion produced by the projection system according to Example 1 at the wide-angle end and a short distance.
Figure 8:
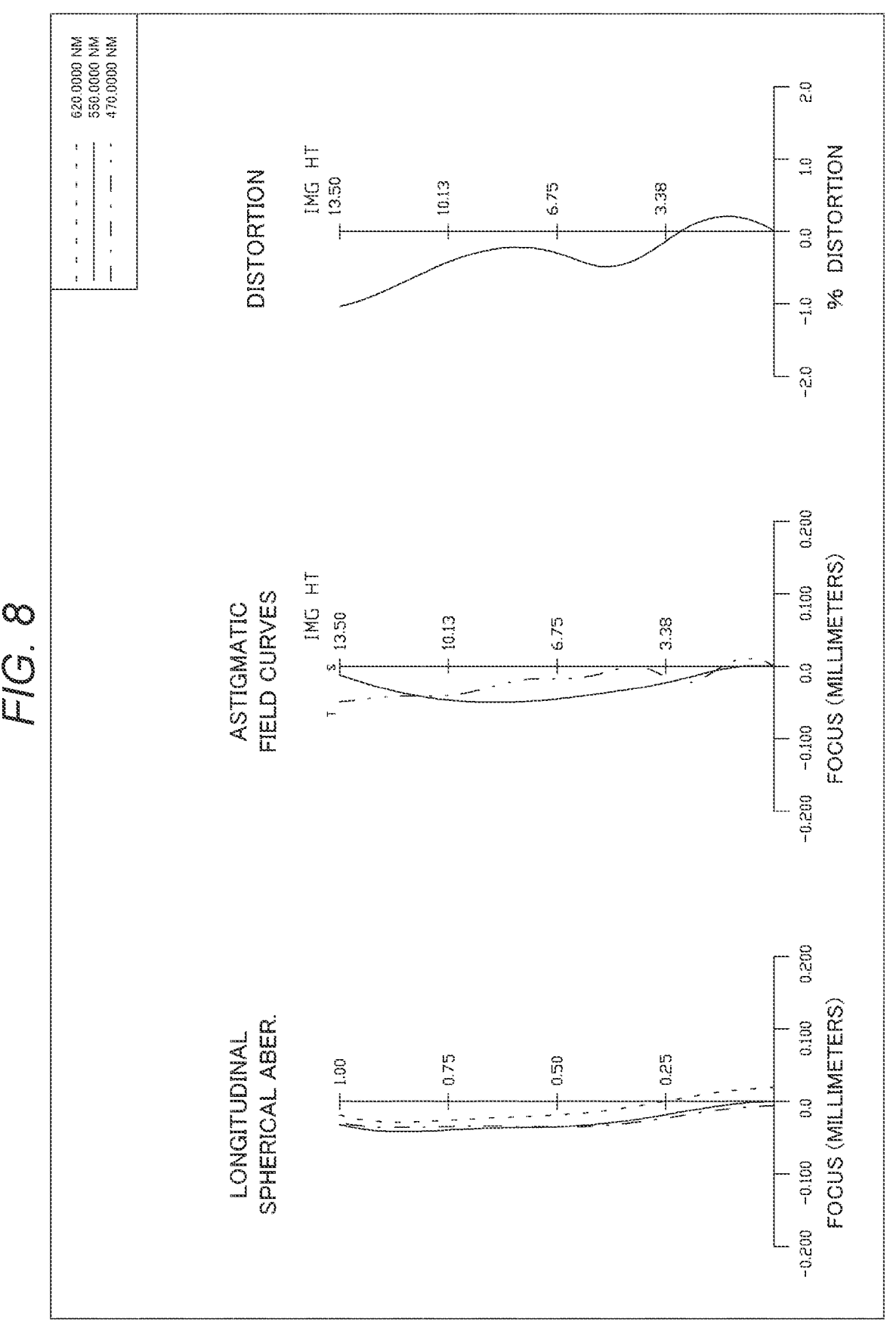
FIG. 8 shows the spherical aberration, astigmatism, and distortion produced by the projection system according to Example 1 at the telescopic end and the short distance.

FIG. 3 shows spherical aberration, astigmatism, and distortion produced by the projection system 3A at the wide-angle end and the standard distance. FIG. 4 shows the spherical aberration, astigmatism, and distortion produced by the projection system 3A at the telescopic end and the standard distance. FIG. 5 shows the spherical aberration, astigmatism, and distortion produced by the projection system 3A at the wide-angle end and the long distance. FIG. 6 shows the spherical aberration, astigmatism, and distortion produced by the projection system 3A at the telescopic end and the long distance. FIG. 7 shows the spherical aberration, astigmatism, and distortion produced by the projection system 3A at the wide-angle end and the short distance. FIG. 8 shows the spherical aberration, astigmatism, and distortion produced by the projection system 3A at the telescopic end and the short distance. The projection system 3A according to the present example allows suppression of the aberrations that degrade an enlarged image, as shown in FIGS. 3 to 8.

Example 2

Figure 9:
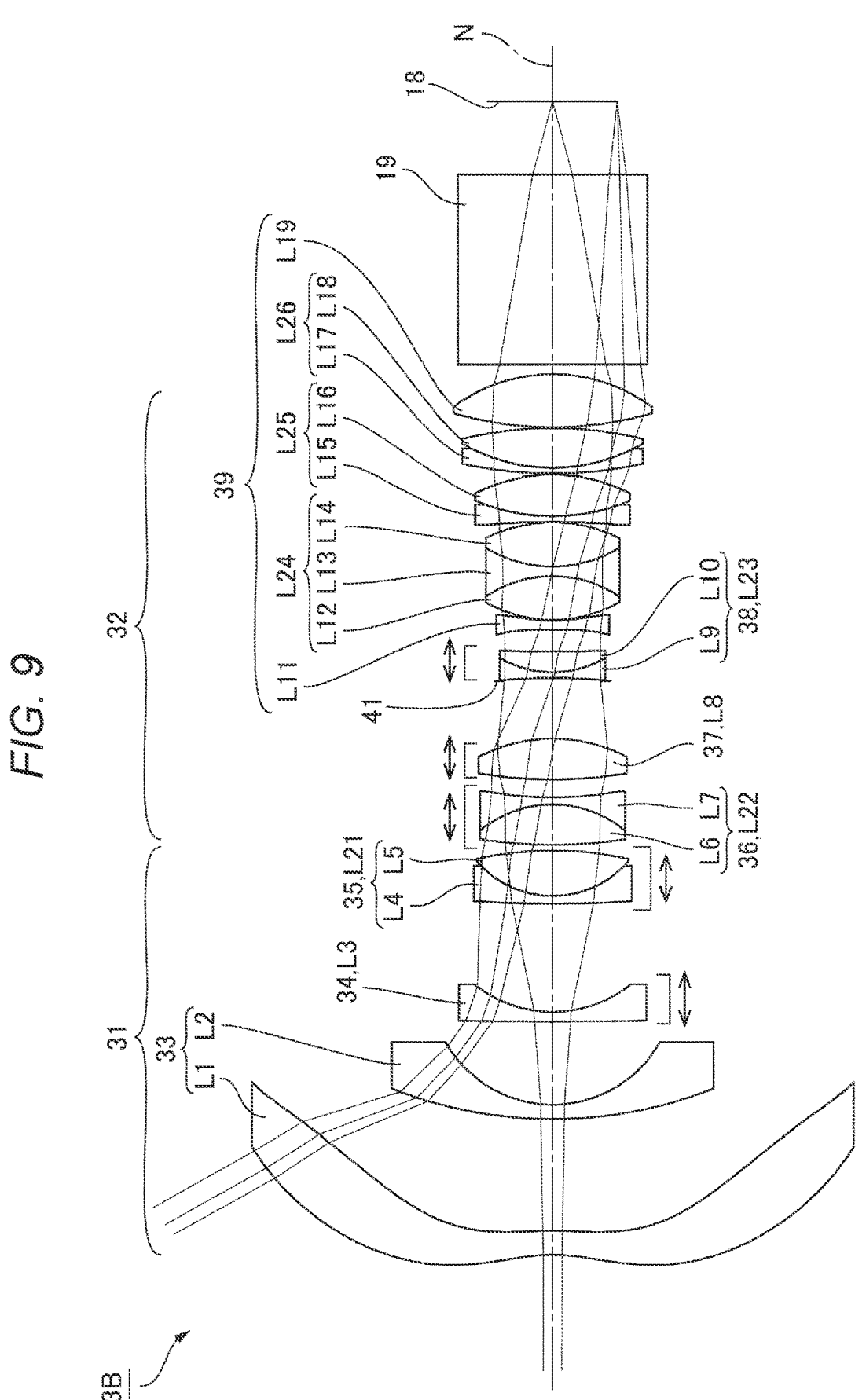
FIG. 9 is a beam diagram showing beams passing through the projection system according to Example 2.

FIG. 9 is a beam diagram showing beams passing through a projection system 3B according to Example 2. The projection system 3B includes a first lens group 31 having negative power and a second lens group 32 having positive power sequentially arranged from the enlargement side toward the reduction side, as shown in FIG. 9. The projection system 3B further includes a stop 41 disposed in the second lens group 32. The stop 41 is disposed in the second lens group 32 at the position where the chief ray having the largest angle of view intersects with the optical axis N.

The first lens group 31 includes a first-a lens group 33 having negative power, a first-b lens group 34 located at the reduction side of the first-a lens group 33 and having negative power, and a first-c lens group 35 located at the reduction side of the first-b lens group 34 and having positive power.

The first-a lens group 33 is formed of a first lens L1 and a second lens L2. The first lens L1 has negative power in the vicinity of the optical axis N. The enlargement-side surface of the first lens L1 has a concave shape in the vicinity of the optical axis N and a convex shape at the periphery. The reduction-side surface of the first lens L1 has a convex shape in the vicinity of the optical axis N and a concave shape at the periphery. The first lens L1 has aspheric surfaces at opposite sides. The second lens L2 has negative power. The second lens L2 is a meniscus lens. The second lens L2 has a convex enlargement-side surface and a concave reduction-side surface.

The first-b lens group 34 is formed of a third lens L3. The third lens L3 has negative power. The third lens L3 is a meniscus lens. The third lens L3 has a convex enlargement-side surface and a concave reduction-side surface. The enlargement-side surface of the third lens L3 has power smaller than that of the reduction-side surface of the third lens L3.

The first-c lens group 35 is formed of a fourth lens L4 and a fifth lens L5. The fourth lens L4 and the fifth lens L5 are arranged in this order from the enlargement side toward the reduction side. The fourth lens L4 and the fifth lens L5 are bonded to each other into a cemented doublet L21. The fourth lens L4 has negative power. The fourth lens L4 is a meniscus lens. The fourth lens L4 has a convex enlargement-side surface and a concave reduction-side surface. The fifth lens L5 has positive power. The fifth lens L5 has convex surfaces both at the enlargement and reduction sides.

The second lens group 32 includes a second-a lens group 36 having negative power, a second-b lens group 37 located at the reduction side of the second-a lens group 36 and having positive power, a second-c lens group 38 located at the reduction side of the second-b lens group 37 and having negative power, and a second-d lens group 39 located at the reduction side of the second-c lens group 38. The stop 41 is disposed between the second-b lens group 37 and the second-c lens group 38.

The second-a lens group 36 is formed of a sixth lens L6 and a seventh lens L7. The sixth lens L6 and the seventh lens L7 are arranged in this order from the enlargement side toward the reduction side. The sixth lens L6 and the seventh lens L7 are bonded to each other into a cemented doublet L22. The sixth lens L6 has positive power. The sixth lens L6 has convex surfaces both at the enlargement and reduction sides. The seventh lens L7 has negative power. The seventh lens L7 has concave surfaces both at the enlargement and reduction sides.

The second-b lens group 37 is formed of an eighth lens L8. The eighth lens L8 has positive power. The eighth lens L8 has convex surfaces both at the enlargement and reduction sides.

The second-c lens group 38 is formed of a ninth lens L9 and a tenth lens L10. The ninth lens L9 and the tenth lens L10 are arranged in this order from the enlargement side toward the reduction side. The ninth lens L9 and the tenth lens L10 are bonded to each other into a cemented doublet L23. The ninth lens L9 has negative power. The ninth lens L9 has concave surfaces both at the enlargement and reduction sides. The tenth lens L10 has positive power. The tenth lens L10 is a meniscus lens. The tenth lens L10 has a convex enlargement-side surface and a concave reduction-side surface.

The second-d lens group 39 is formed of nine lenses, an eleventh lens L11 to a nineteenth lens L19. The eleventh lens L11 to the nineteenth lens L19 are arranged in this order from the enlargement side toward the reduction side. The eleventh lens L11 has negative power. The eleventh lens L11 has concave surfaces both at the enlargement and reduction sides. The eleventh lens L11 has aspheric surfaces at opposite sides.

The twelfth lens L12 has positive power. The twelfth lens L12 has convex surfaces both at the enlargement and reduction sides. The thirteenth lens L13 has negative power. The thirteenth lens L13 has concave surfaces both at the enlargement and reduction sides. The fourteenth lens L14 has positive power. The fourteenth lens L14 has convex surfaces both at the enlargement and reduction sides. The twelfth lens L12, the thirteenth lens L13, and the fourteenth lens L14 are bonded to each other into a cemented triplet L24.

The fifteenth lens L15 has negative power. The fifteenth lens L15 has concave surfaces both at the enlargement and reduction sides. The sixteenth lens L16 has positive power. The sixteenth lens L16 has convex surfaces both at the enlargement and reduction sides. The fifteenth lens L15 and the sixteenth lens L16 are bonded to each other into a cemented doublet L25.

The seventeenth lens L17 has negative power. The seventeenth lens L17 is a meniscus lens. The seventeenth lens L17 has a convex enlargement-side surface and a concave reduction-side surface. The eighteenth lens L18 has positive power. The eighteenth lens L18 has convex surfaces both at the enlargement and reduction sides. The seventeenth lens L17 and the eighteenth lens L18 are bonded to each other into a cemented doublet L26.

The nineteenth lens L19 has positive power. The nineteenth lens L19 has convex surfaces both at the enlargement and reduction sides.

The first lens L1 is made of resin. The second lens L2 to the nineteenth lens L19 are made of glass.

In the projection system 3B, the optical components at the reduction side of the nineteenth lens L19 of the second lens group 32 form a telecentric system.

The projection system 3B has a changeable projection distance. To change the projection distance, the first-b lens group 34 and the first-c lens group 35 are each moved in the direction of the optical axis N for focusing.

The projection system 3B can also change the magnification factor in accordance with which an enlarged image is formed. To change the magnification factor in accordance with which an enlarged image is formed, the second-a lens group 36, the second-b lens group 37, and the second-c lens group 38 are each moved in the direction of the optical axis N for zooming. In the present example, the magnification factor in accordance with which an enlarged image is formed through zooming is about 1.1.

Data on the projection system 3B are listed in a table below. In the table, FNo represents the f number of the projection system 3B, F represents the focal length of the overall projection system, ω represents half the angle of view, BF represents the back focal length in air, F1b represents the focal length of the first-b lens group 34, F1c represents the focal length of the first-c lens group 35, F1ab represents the combined focal length of the first-a lens group 33 and the first-b lens group 34, F2a represents the focal length of the second-a lens group 36, F2b represents the focal length of the second-b lens group 37, F1 represents the focal length of the first lens group 31, and F2 represents the focal length of the second lens group 32.

| FNo | 1.9 |
|---|---|
| F (wide-angle end to telescopic end) | 7.540 mm to 8.290 mm |
| ω (wide-angle end to telescopic end) | 60.7° to 58.4° |
| BF | 43.091 mm |
| F1b | −32.013 mm |
| F1c | 84.863 mm |
| F1ab | −10.015 mm |
| F2a | −86.522 mm |
| F2b | 37.299 mm |
| F1 | −22.634 mm |
| F2 | 47.802 mm |

Data on the lenses of the projection system 3B are listed below. The surfaces of the lenses are numbered sequentially from the enlargement side to the reduction side. Reference characters are given to the screen, the lenses, the stop, the dichroic prism, and the liquid crystal panels. Data labeled with a surface number that does not correspond to any of the screen, the lenses, the stop, the dichroic prism, or the liquid crystal panels is dummy data. An aspheric surface has a surface number followed by *. Reference character R represents the radius of curvature. Reference character D represents the axial inter-surface spacing. Reference character nd represents the refractive index at the d line. Reference character vd represents the Abbe number at the d line. Reference characters R and D are expressed in millimeters.

| Reference character | Surface number | R | D | nd | vd |
|---|---|---|---|---|---|
| S | 0 | Infinity | Variable spacing 1 | | |
| L1 | 1* | −31.575 | 5.000 | 1.53116 | 56.04 |
| | 2* | −71.341 | 23.233 | | |
| L2 | 3 | 91.093 | 3.000 | 1.83481 | 42.72 |
| | 4 | 25.642 | Variable spacing 2 | | |
| L3 | 5 | 864.103 | 2.000 | 1.83481 | 42.72 |
| | 6 | 26.021 | Variable spacing 3 | | |
| L4 | 7 | 270.672 | 1.600 | 1.75500 | 52.32 |
| L5 | 8 | 20.860 | 9.500 | 1.72825 | 28.46 |
| | 9 | −71.441 | Variable spacing 4 | | |
| L6 | 10 | 100.984 | 8.400 | 1.80809 | 22.76 |
| L7 | 11 | −23.648 | 1.500 | 1.98612 | 16.48 |
| | 12 | 78.872 | Variable spacing 5 | | |
| L8 | 13 | 90.148 | 8.500 | 1.67270 | 32.10 |
| | 14 | −33.750 | Variable spacing 6 | | |
| 41 | 15 | Infinity | 0.629 | | |
| L9 | 16 | −117.596 | 1.200 | 1.90043 | 37.37 |
| L10 | 17 | 21.441 | 4.313 | 1.86966 | 20.02 |
| | 18 | 310.198 | Variable spacing 7 | | |
| L11 | 19* | Infinity | 2.000 | 1.58913 | 61.15 |
| | 20* | 33.580 | 0.100 | | |
| L12 | 21 | 28.329 | 9.109 | 1.72825 | 28.46 |
| L13 | 22 | −25.000 | 2.000 | 1.90043 | 37.37 |
| L14 | 23 | 26.544 | 9.231 | 1.48749 | 70.24 |
| | 24 | −31.269 | 0.100 | | |
| L15 | 25 | −152.343 | 1.200 | 2.00069 | 25.46 |
| L16 | 26 | 41.801 | 8.600 | 1.48749 | 70.24 |
| | 27 | −36.006 | 0.200 | | |
| L17 | 28 | 87.217 | 1.200 | 2.00100 | 29.13 |
| L18 | 29 | 37.711 | 8.261 | 1.49700 | 81.54 |
| | 30 | −80.531 | 0.200 | | |
| L19 | 31 | 74.700 | 11.000 | 1.49700 | 81.54 |
| | 32 | −34.857 | 2.000 | | |
| 19 | 33 | Infinity | 39.600 | 1.51680 | 64.20 |
| | 34 | Infinity | 15.412 | | |
| 18 | 35 | Infinity | | | |

The projection system 3B according to the present example has a changeable projection distance selected from the standard distance, the short distance shorter than the standard distance, and the long distance longer than the standard distance. To change the projection distance, the first-b lens group 34 and the first-c lens group 35 are each moved in the direction of the optical axis N for focusing. In the projection system 3B according to the present example, the second-a lens group 36, the second-b lens group 37, and the second-c lens group 38 can each be moved in the direction of the optical axis N for zooming. The angle of view is changed between the values at the wide-angle and telescopic ends by performing zooming at each of the projection distances.

The table below shows the variable spacings 1, 2, 3, 4, 5, 6, and 7 at the projection distances where the focusing and zooming are performed. The variable spacing 1 is the projection distance. The variable spacing 2 is the axial inter-surface spacing between the second lens L2 and the third lens L3. The variable spacing 3 is the axial inter-surface spacing between the third lens L3 and the fourth lens L4. The variable spacing 4 is the axial inter-surface spacing between the fifth lens L5 and the sixth lens L6. The variable spacing 5 is the axial inter-surface spacing between the seventh lens L7 and the eighth lens L8. The variable spacing 6 is the axial inter-surface spacing between the eighth lens L8 and the stop 41. The variable spacing 7 is the axial inter-surface spacing between the tenth lens L10 and the eleventh lens 11.

When the projection distance is the long distance, the variable spacings are listed below.

|  | Wide-angle end | Telescopic end |
|---|---|---|
| Variable spacing 1 | 10900.000 | 10900.000 |
| Variable spacing 2 | 17.061 | 14.000 |
| Variable spacing 3 | 22.218 | 22.351 |
| Variable spacing 4 | 1.811 | 2.483 |
| Variable spacing 5 | 3.716 | 3.068 |
| Variable spacing 6 | 12.000 | 16.983 |
| Variable spacing 7 | 4.529 | 2.450 |

When the projection distance is the standard distance, the variable spacings are listed below.

|  | Wide-angle end | Telescopic end |
|---|---|---|
| Variable spacing 1 | 1450.000 | 1450.000 |
| Variable spacing 2 | 17.394 | 14.648 |
| Variable spacing 3 | 22.491 | 22.459 |
| Variable spacing 4 | 1.205 | 1.727 |
| Variable spacing 5 | 3.716 | 3.068 |
| Variable spacing 6 | 12.000 | 16.983 |
| Variable spacing 7 | 4.529 | 2.450 |

When the projection distance is the short distance, the variable spacings are listed below.

|  | Wide-angle end | Telescopic end |
|---|---|---|
| Variable spacing 1 | 1000.000 | 1000.000 |
| Variable spacing 2 | 17.608 | 14.950 |
| Variable spacing 3 | 22.540 | 22.512 |
| Variable spacing 4 | 0.942 | 1.372 |
| Variable spacing 5 | 3.716 | 3.068 |
| Variable spacing 6 | 12.000 | 16.983 |
| Variable spacing 7 | 4.529 | 2.450 |

The long projection distance of the projection system 3B according to the present example is 10900.000 mm, and the short projection distance of the projection system 3B is 1000.000 mm. The projection distance ratio of the projection system 3B is therefore greater than or equal to 10.

The aspheric coefficients are listed below.

| Surface number | 1 | 2 |
|---|---|---|
| Radius of curvature (R) | −31.575 | −71.341 |
| Conic constant (K) | −10.576 | −100.000 |

-continued

| Surface number | 1 | 2 |
|---|---|---|
| Third-order coefficient (A) | 2.62422E−04 | 2.03518E−04 |
| Fourth-order coefficient (A) | −2.02997E−06 | 7.52369E−06 |
| Fifth-order coefficient (A) | 9.01284E−08 | −5.92772E−08 |
| Sixth-order coefficient (A) | −4.06408E−09 | −2.39437E−09 |
| Seventh-order coefficient (A) | 6.82185E−11 | −7.40732E−11 |
| Eighth-order coefficient (A) | −1.31834E−12 | 4.30787E−12 |
| Ninth-order coefficient (A) | 3.81371E−14 | −1.56730E−13 |
| Tenth-order coefficient (A) | −1.74852E−16 | 4.09200E−15 |
| Eleventh-order coefficient (A) | −1.68475E−17 | −5.09492E−17 |
| Twelfth-order coefficient (A) | 3.88227E−19 | 2.11899E−19 |
| Thirteenth-order coefficient (A) | −3.41524E−21 | 2.93682E−23 |
| Fourteenth-order coefficient (A) | 1.12637E−23 | 2.88167E−24 |

| Surface number | 19 | 20 |
|---|---|---|
| Radius of curvature (R) | Infinity | 33.580 |
| Conic constant (K) | 0.000 | −12.934 |
| Fourth-order coefficient (A) | −8.91805E−05 | −3.83441E−05 |
| Sixth-order coefficient (A) | 3.87821E−07 | 2.88935E−07 |
| Eighth-order coefficient (A) | −1.13227E−09 | −1.06878E−09 |
| Tenth-order coefficient (A) | 1.07229E−13 | 2.08521E−12 |
| Twelfth-order coefficient (A) | 7.40469E−15 | −1.03343E−15 |
| Fourteenth-order coefficient (A) | 5.04824E−27 | −5.15036E−21 |
| Sixteenth-order coefficient (A) | 1.95009E−30 | 1.89620E−30 |

The projection system 3B according to the present example satisfies each of Conditional Expressions (1) and (2) below, $$BF/F > 5.0 \tag{1}$$

$$0.3 < |F/F1ab| < 1.0 \tag{2}$$

where F represents the focal length of the overall projection system, BF represents the back focal length in air, and F1ab represents the combined focal length of the first-a lens group 33 and the first-b lens group 34. The focal length F in this case is the focal length of the entire projection system at the wide-angle end.

In the present example,

F: 7.540 mm

BF: 43.091 mm are satisfied. BF/F=5.715 is therefore satisfied, and Conditional Expression (1) is satisfied.

In the present example,

F: 7.540 mm

F1ab: −10.015 mm are satisfied. |F/F1ab|=0.753 is therefore satisfied, and Conditional Expression (2) is satisfied.

The projection system 3B according to the present example satisfies Conditional Expression (3) below, $$1.0<|F2a/F2b|<4.0 \qquad (3)$$

where F2a represents the focal length of the second-a lens group 36, and F2b represents the focal length of the second-b lens group 37.

In the present example,

F2a: −86.522 mm

F2b: 37.299 mm are satisfied. |F2a/F2b|=2.320 is therefore satisfied, and Conditional Expression (3) is satisfied.

The projection system 3B according to the present example satisfies each of Conditional Expressions (5) and (6) below, $$0.2<|F/F1b|<0.6 \qquad (5)$$

$$0.0<F/F1c<0.14 \qquad (6)$$

where F represents the focal length of the entire projection system, F1b represents the focal length of the first-b lens group 34, and F1c represents the focal length of the first-c lens group 35. The focal length F in this case is the focal length of the entire projection system at the wide-angle end.

In the present example,

F: 7.540 mm

F1b: −32.013 mm are satisfied. |F/F1b|=0.236 is therefore satisfied, and Conditional Expression (5) is satisfied.

In the present example,

F: 7.540 mm

F1c: 84.863 mm are satisfied. F/F1c=0.089 is therefore satisfied, and Conditional Expression (6) is satisfied.

Effects and Advantages

In the projection system 3B according to the present example, the first-a lens group 33 is formed of the first lens L1 made of resin and the second lens L2, which is located at the reduction side of the first lens L1. The second lens L2 is a meniscus lens having negative power and a convex enlargement-side surface. The first-b lens group 34 is formed of the third lens L3. The third lens L3 has negative power and having a concave reduction-side surface. More specifically, the third lens L3 is a meniscus lens having negative power and having a concave reduction-side surface. The enlargement-side surface of the third lens L3 has power smaller than that of the reduction-side surface of the third lens L3.

In the projection system 3B according to the present example, the sum of the number of lenses of the first-a lens group 33 and the number of lenses of the first-b lens group 34 is three. The weight of the enlargement-side end portion of the projection system 3B can therefore be readily suppressed.

In the present example, the first lens L1 of the first-a lens group 33 is made of resin and can therefore be lighter than in a case where the first lens L1 is made of glass. In the configuration in which the first lens L1 is made of resin, the first lens L1 has a larger refractive index-temperature coefficient in accordance with which the refractive index changes with temperature and a larger coefficient of linear expansion than in the case where the first lens L1 is made of glass. Heat therefore tends to cause a change in the refractive index of the first lens L1 and deformation of the shape thereof. An increase in the negative power of the first lens L1 therefore tends to cause the image quality of an enlarged image to be affected by the heat. In contrast, in the present example, the first-a lens group 33 is formed of two lenses, the first lens L1 and the second lens L2. The two lenses, the first lens L1 and the second lens L2, can therefore be responsible for the power of the first-a lens group 33. The negative power of the first-a lens group 33 can therefore be increased with an increase in the negative power of the first lens L1 suppressed, whereby the situation in which heat tends to affect the image quality of an enlarged image can be suppressed.

Since the negative power of the first-a lens group 33 can be increased, the first-b lens group 34 can be formed of a single lens. The first-b lens group 34 is therefore lighter and more readily moved during focusing. The enlargement-side surface of the third lens L3 has power smaller than that of the reduction-side surface of the third lens L3. The third lens L3 can therefore suppress aberrations that occur at the enlargement-side surface. As a result, astigmatism and other aberrations produced during focusing can be suppressed.

In the present example, the second lens group 32 includes five cemented doublets and triplets in total. The chromatic aberrations can therefore be corrected well.

Figure 10:
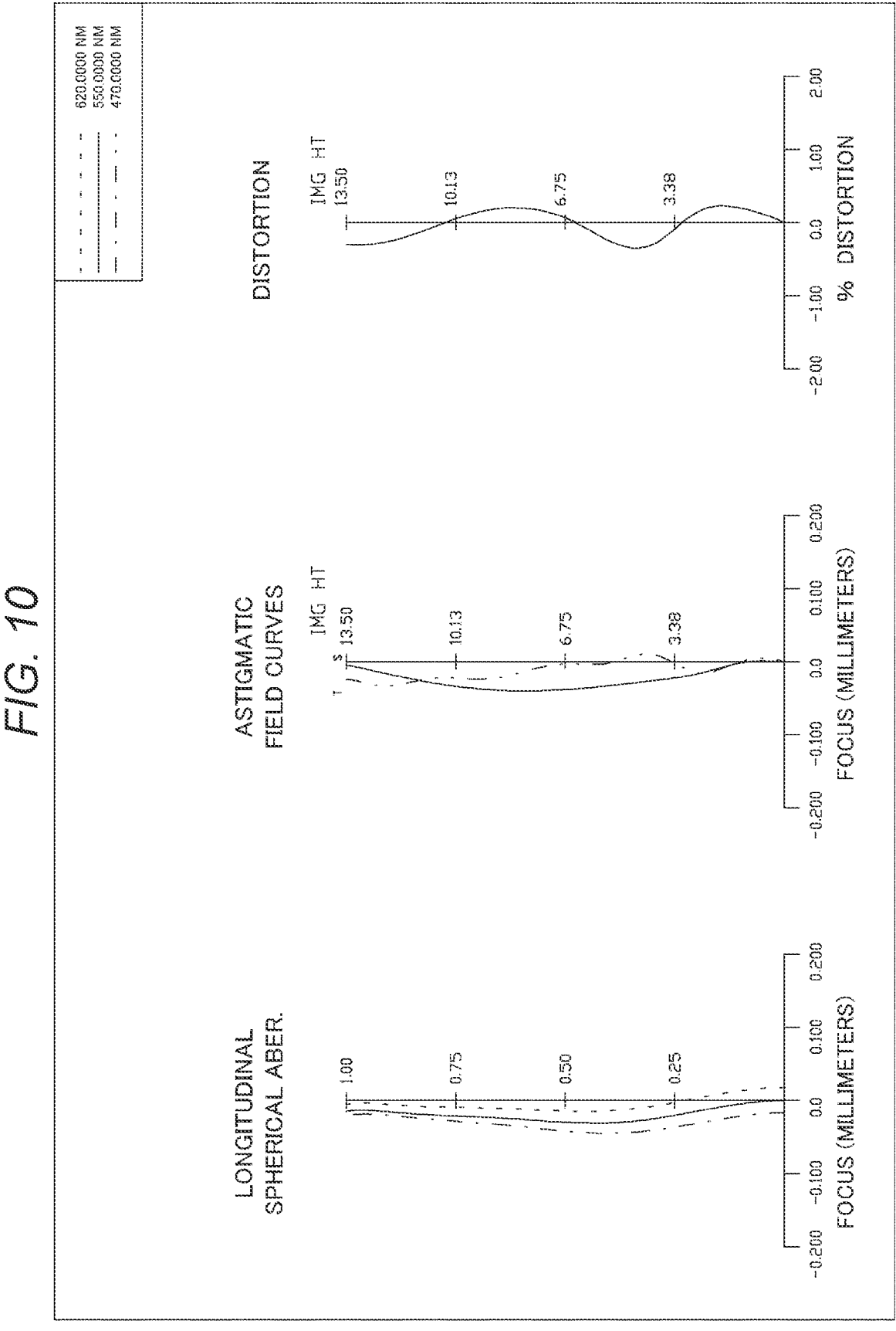
FIG. 10 shows the spherical aberration, astigmatism, and distortion produced by the projection system according to Example 2 at the wide-angle end and the standard distance.
Figure 11:
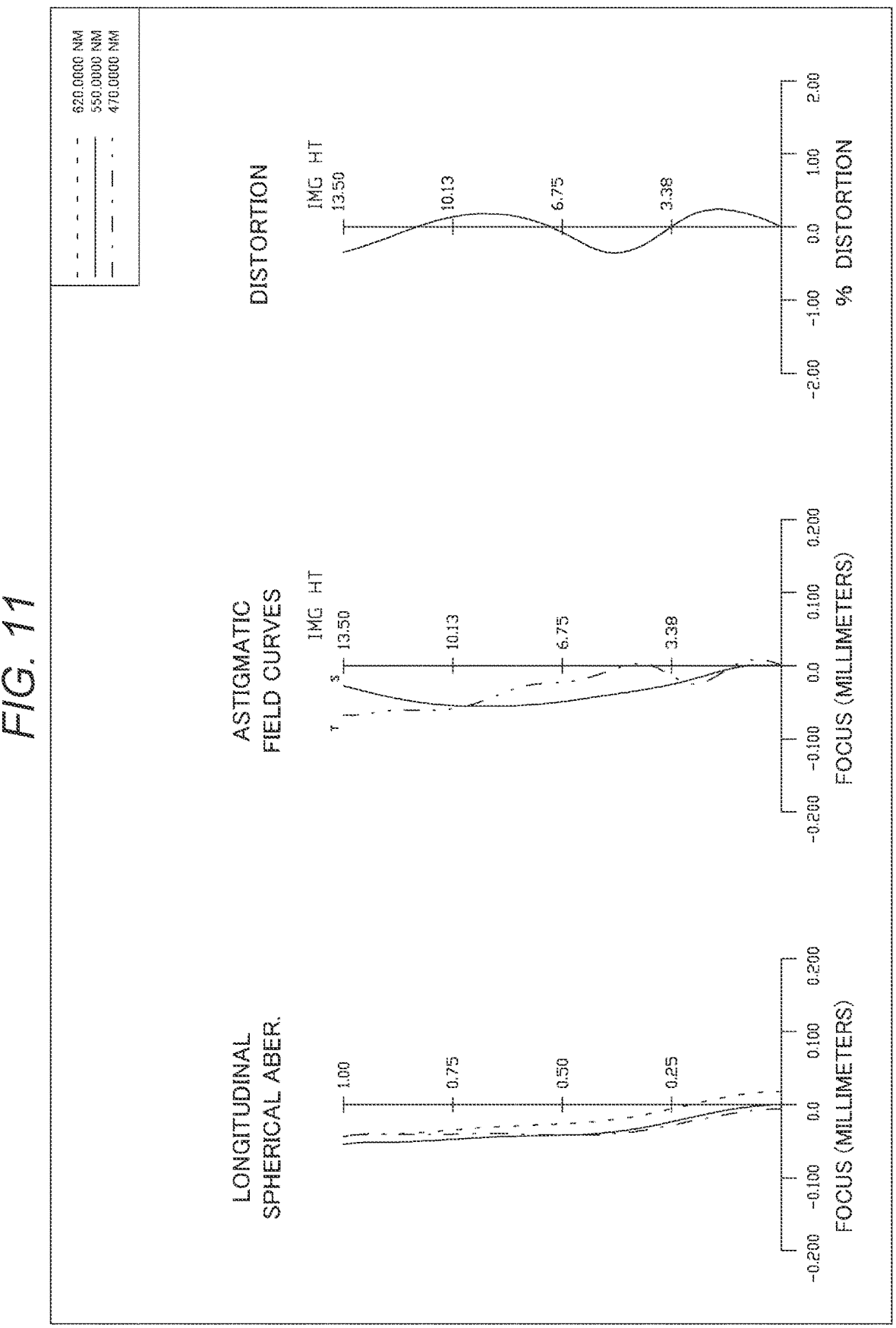
FIG. 11 shows the spherical aberration, astigmatism, and distortion produced by the projection system according to Example 2 at the telescopic end and the standard distance.
Figure 12:
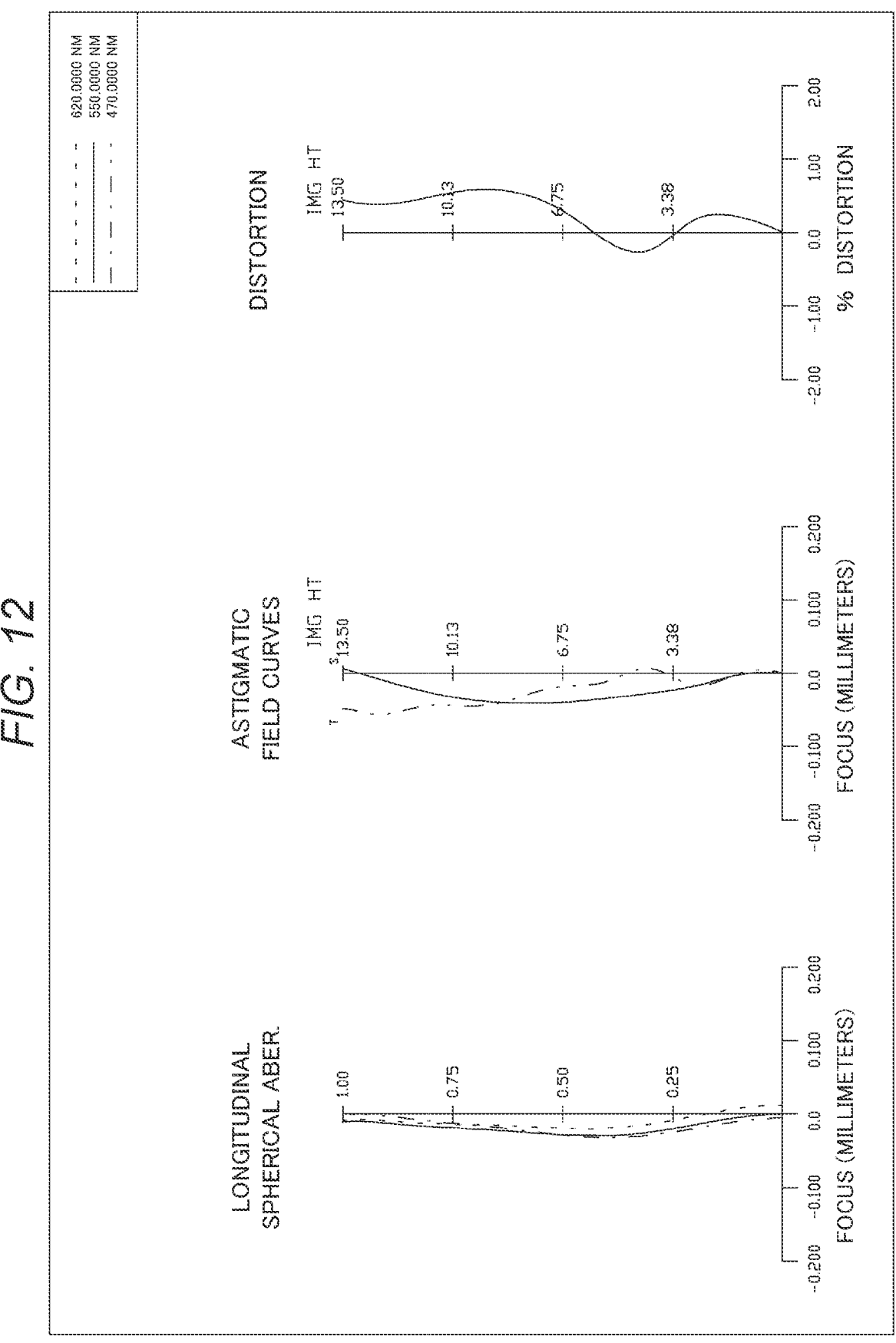
FIG. 12 shows the spherical aberration, astigmatism, and distortion produced by the projection system according to Example 2 at the wide-angle end and the long distance.
Figure 13:
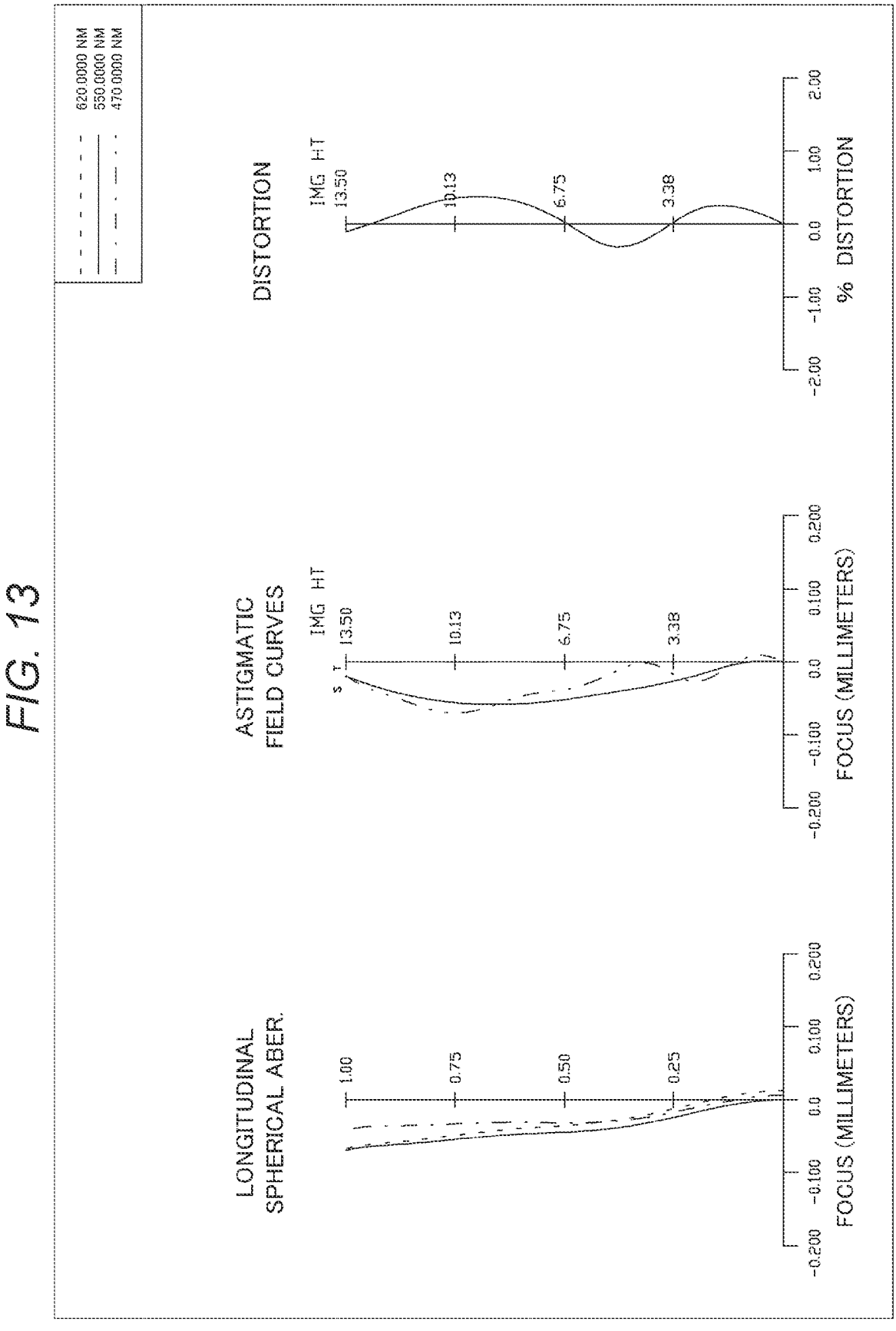
FIG. 13 shows the spherical aberration, astigmatism, and distortion produced by the projection system according to Example 2 at the telescopic end and the long distance.
Figure 14:
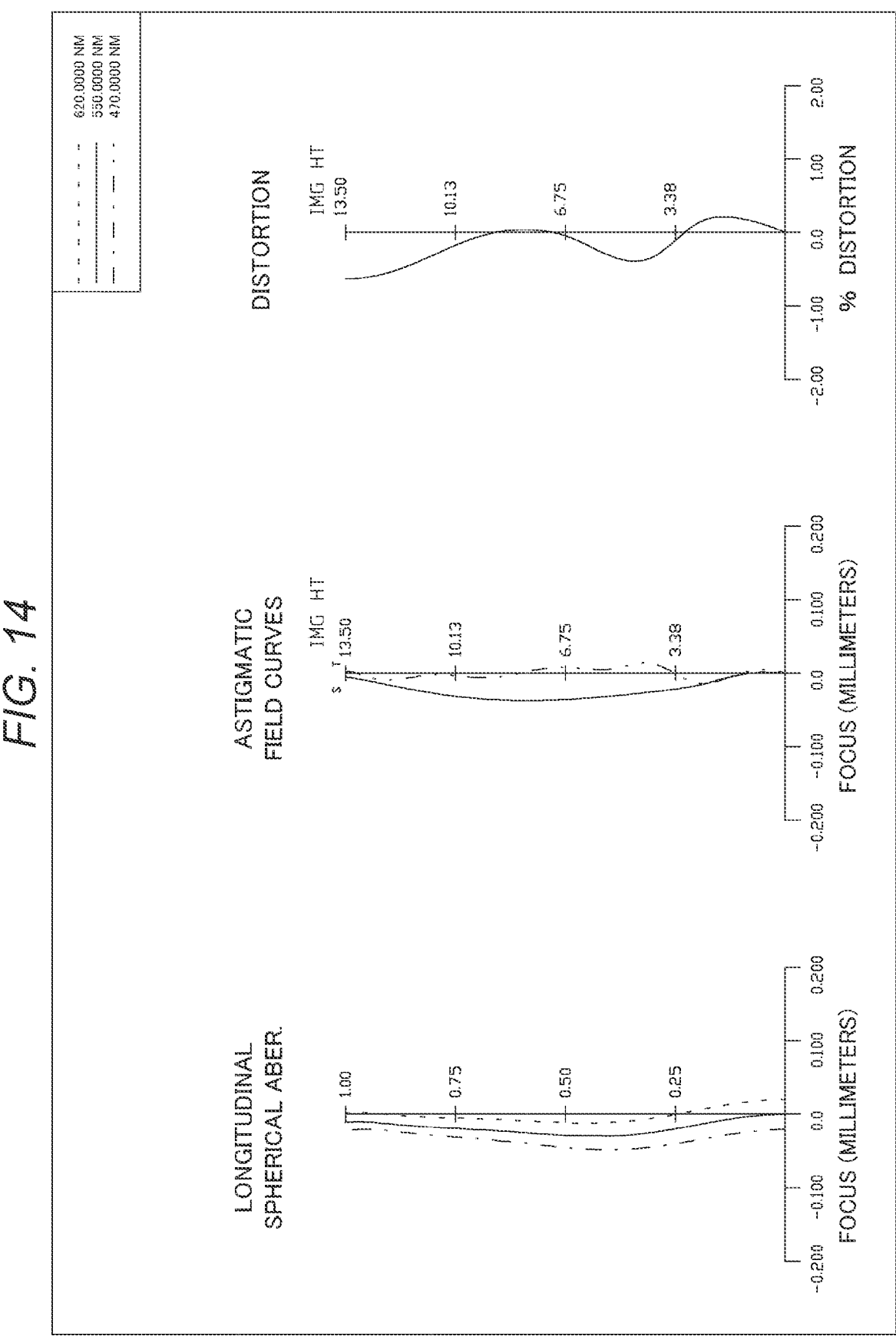
FIG. 14 shows the spherical aberration, astigmatism, and distortion produced by the projection system according to Example 2 at the wide-angle end and the short distance.
Figure 15:
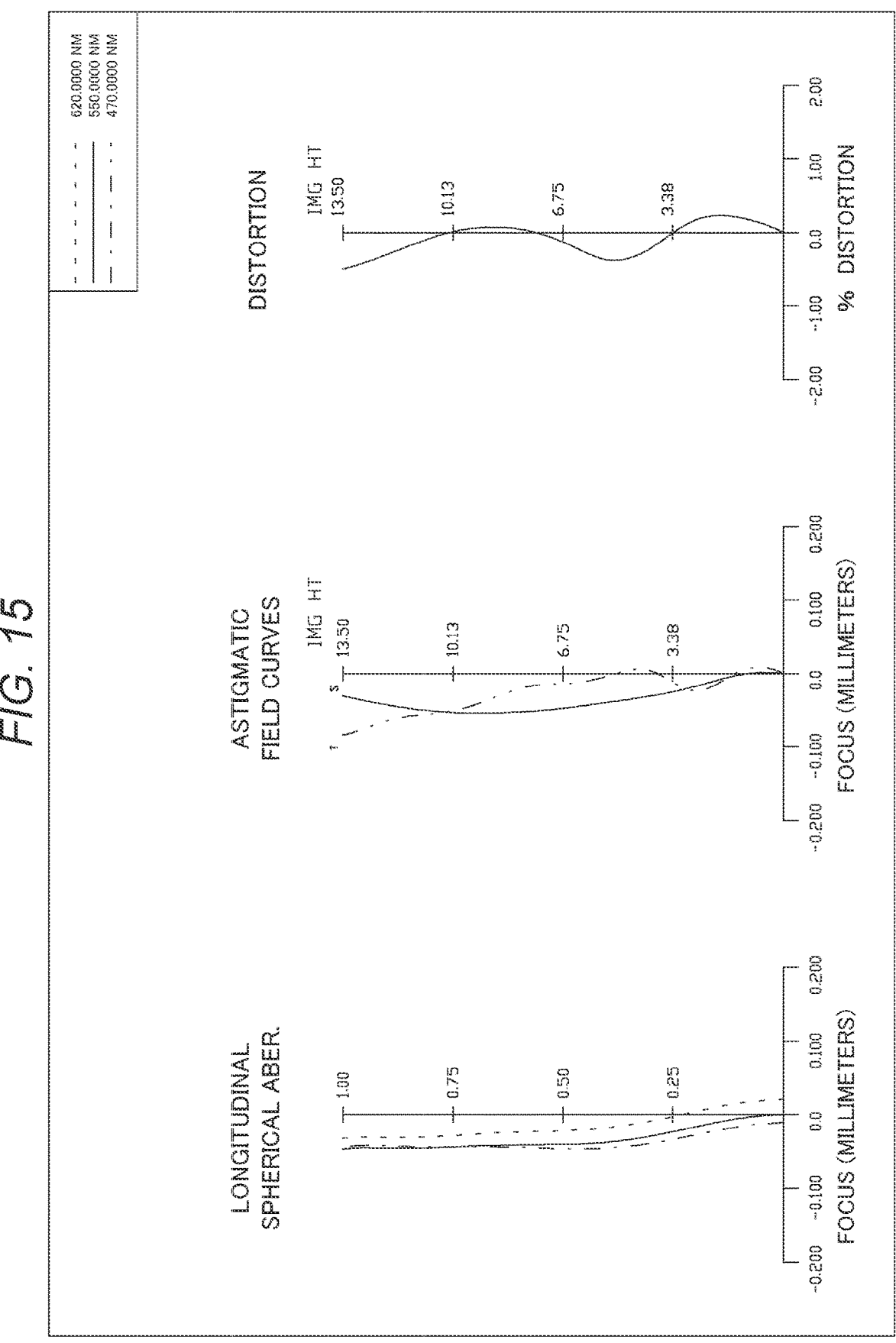
FIG. 15 shows the spherical aberration, astigmatism, and distortion produced by the projection system according to Example 2 at the telescopic end and the short distance.

The projection system 3B according to the present example, which satisfies Conditional Expressions (1) to (3), (5), and (6), can provide the same effects and advantages as those provided by the projection system 3A according to Example 1. FIG. 10 shows the spherical aberration, astigmatism, and distortion produced by the projection system 3B at the wide-angle end and the standard distance. FIG. 11 shows the spherical aberration, astigmatism, and distortion produced by the projection system 3B at the telescopic end and the standard distance. FIG. 12 shows the spherical aberration, astigmatism, and distortion produced by the projection system 3B at the wide-angle end and the long distance. FIG. 13 shows the spherical aberration, astigmatism, and distortion produced by the projection system 3B at the telescopic end and the long distance. FIG. 14 shows the spherical aberration, astigmatism, and distortion produced by the projection system 3B at the wide-angle end and the short distance. FIG. 15 shows the spherical aberration, astigmatism, and distortion produced by the projection system 3B at the telescopic end and the short distance. The projection system 3B according to the present example allows suppression of the aberrations that degrade an enlarged image, as shown in FIGS. 10 to 15.

Example 3

Figure 16:
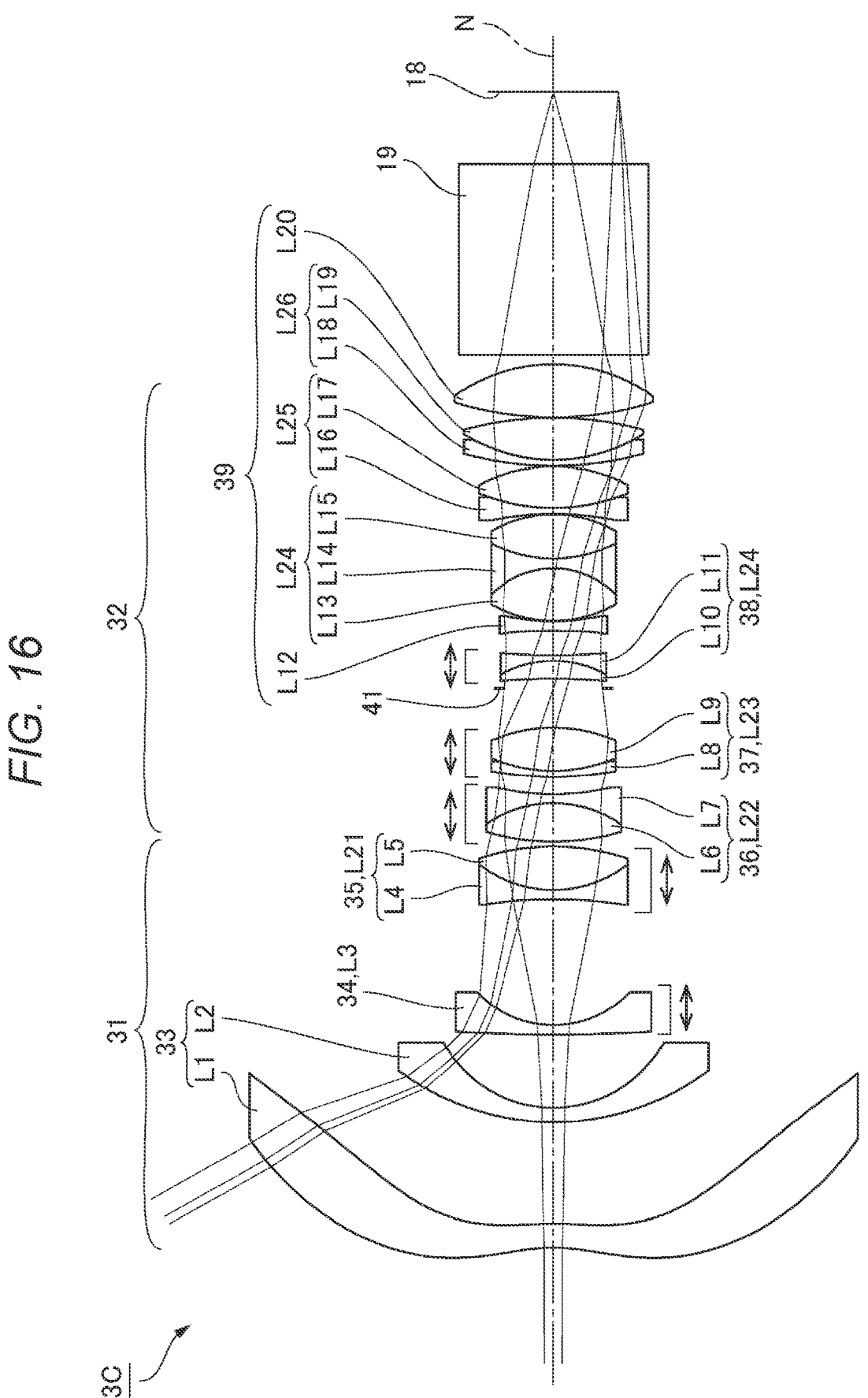
FIG. 16 is a beam diagram showing beams passing through the projection system according to Example 3.

FIG. 16 is a beam diagram showing beams passing through a projection system 3C according to Example 3. The projection system 3C includes a first lens group 31 having negative power and a second lens group 32 having positive power sequentially arranged from the enlargement side toward the reduction side, as shown in FIG. 16. The projection system 3C further includes a stop 41 disposed in the second lens group 32. The stop 41 is disposed in the second lens group 32 at the position where the chief ray having the largest angle of view intersects with the optical axis N.

The first lens group 31 includes a first-a lens group 33 having negative power, a first-b lens group 34 located at the reduction side of the first-a lens group 33 and having negative power, and a first-c lens group 35 located at the reduction side of the first-b lens group 34 and having positive power.

23

24

The first-a lens group 33 is formed of a first lens L1 and a second lens L2. The first lens L1 has negative power in the vicinity of the optical axis N. The enlargement-side surface of the first lens L1 has a concave shape in the vicinity of the optical axis N and a convex shape at the periphery. The reduction-side surface of the first lens L1 has a convex shape in the vicinity of the optical axis N and a concave shape at the periphery. The first lens L1 has aspheric surfaces at opposite sides. The second lens L2 has negative power. The second lens L2 is a meniscus lens. The second lens L2 has a convex enlargement-side surface and a concave reduction-side surface.

The first-b lens group 34 is formed of a third lens L3. The third lens L3 has negative power. The third lens L3 is a meniscus lens. The third lens L3 has a convex enlargement-side surface and a concave reduction-side surface. The enlargement-side surface of the third lens L3 has power smaller than that of the reduction-side surface of the third lens L3.

The first-c lens group 35 is formed of a fourth lens L4 and a fifth lens L5. The fourth lens L4 and the fifth lens L5 are arranged in this order from the enlargement side toward the reduction side. The fourth lens L4 and the fifth lens L5 are bonded to each other into a cemented doublet L21. The fourth lens L4 has negative power. The fourth lens L4 has concave surfaces both at the enlargement and reduction sides. The fifth lens L5 has positive power. The fifth lens L5 has convex surfaces both at the enlargement and reduction sides.

The second lens group 32 includes a second-a lens group 36 having negative power, a second-b lens group 37 located at the reduction side of the second-a lens group 36 and having positive power, a second-c lens group 38 located at the reduction side of the second-b lens group 37 and having negative power, and a second-d lens group 39 located at the reduction side of the second-c lens group 38. The stop 41 is disposed between the second-b lens group 37 and the second-c lens group 38.

The second-a lens group 36 is formed of a sixth lens L6 and a seventh lens L7. The sixth lens L6 and the seventh lens L7 are arranged in this order from the enlargement side toward the reduction side. The sixth lens L6 and the seventh lens L7 are bonded to each other into a cemented doublet L22. The sixth lens L6 has positive power. The sixth lens L6 has convex surfaces both at the enlargement and reduction sides. The seventh lens L7 has negative power. The seventh lens L7 has concave surfaces both at the enlargement and reduction sides.

The second-b lens group 37 is formed of an eighth lens L8 and a ninth lens L9. The eighth lens L8 and the ninth lens L9 are arranged in this order from the enlargement side toward the reduction side. The eighth lens L8 and the ninth lens L9 are bonded to each other into a cemented doublet L23. The eighth lens L8 has negative power. The eighth lens L8 is a meniscus lens. The eighth lens L8 has a convex enlargement-side surface and a concave reduction-side surface. The ninth lens L9 has positive power. The ninth lens L9 has convex surfaces both at the enlargement and reduction sides.

The second-c lens group 38 is formed of a tenth lens L10 and an eleventh lens L11. The tenth lens L10 and the eleventh lens L11 are arranged in this order from the enlargement side toward the reduction side. The tenth lens L10 and the eleventh lens L11 are bonded to each other into a cemented doublet L24. The tenth lens L10 has positive power. The tenth lens L10 is a meniscus lens. The tenth lens L10 has a concave enlargement-side surface and a convex reduction-side surface. The eleventh lens L11 has negative power. The eleventh lens L11 has concave surfaces both at the enlargement and reduction sides.

The second-d lens group 39 is formed of nine lenses, a twelfth lens L12 to a twentieth lens L20. The twelfth lens L12 to the twentieth lens L20 are arranged in this order from the enlargement side toward the reduction side. The twelfth lens L12 has negative power. The twelfth lens L12 has concave surfaces both at the enlargement and reduction sides. The twelfth lens L12 has aspheric surfaces at opposite sides.

The thirteenth lens L13 has positive power. The thirteenth lens L13 has convex surfaces both at the enlargement and reduction sides. The fourteenth lens L14 has negative power. The fourteenth lens L14 has concave surfaces both at the enlargement and reduction sides. The fifteenth lens L15 has positive power. The fifteenth lens L15 has convex surfaces both at the enlargement and reduction sides. The thirteenth lens L13, the fourteenth lens L14, and the fifteenth lens L15 are bonded to each other into a cemented triplet L25.

The sixteenth lens L16 has negative power. The sixteenth lens L16 has concave surfaces both at the enlargement and reduction sides. The seventeenth lens L17 has positive power. The seventeenth lens L17 has convex surfaces both at the enlargement and reduction sides. The sixteenth lens L16 and the seventeenth lens L17 are bonded to each other into a cemented doublet L26.

The eighteenth lens L18 has negative power. The eighteenth lens L18 is a meniscus lens. The eighteenth lens L18 has a convex enlargement-side surface and a concave reduction-side surface. The nineteenth lens L19 has positive power. The nineteenth lens L19 has convex surfaces both at the enlargement and reduction sides. The eighteenth lens L18 and the nineteenth lens L19 are bonded to each other into a cemented doublet L27.

The twentieth lens L20 has positive power. The twentieth lens L20 has convex surfaces both at the enlargement and reduction sides.

The first lens L1 is made of resin. The second lens L2 to the twentieth lens L20 are made of glass.

In the projection system 3C, the optical components at the reduction side of the twentieth lens L20 of the second lens group 32 form a telecentric system.

The projection system 3C has a changeable projection distance. To change the projection distance, the first-b lens group 34 and the first-c lens group 35 are each moved in the direction of the optical axis N for focusing.

Data on the projection system 3C are listed in a table below. In the table, FNo represents the f number of the projection system 3C, F represents the focal length of the overall projection system, ω represents half the angle of view, BF represents the back focal length in air, F1b represents the focal length of the first-b lens group 34, F1c represents the focal length of the first-c lens group 35, F1ab represents the combined focal length of the first-a lens group 33 and the first-b lens group 34, F2a represents the focal length of the second-a lens group 36, F2b represents the focal length of the second-b lens group 37, F1 represents the focal length of the first lens group 31, and F2 represents the focal length of the second lens group 32.

| | |
|---|---|
| FNo | 1.9 |
| F (wide-angle end to telescopic end) | 7.540 mm to 7.920 mm |
| ω (wide-angle end to telescopic end) | 60.7° to 59.6° |
| BF | 43.138 mm |
| F1b | −26.039 mm |
| F1c | 104.187 mm |

-continued

| | |
|---|---|
| F1ab | −14.785 mm |
| F2a | −86.000 mm |
| F2b | 34.141 mm |
| F1 | −21.864 mm |
| F2 | 50.259 mm |

Data on the lenses of the projection system 3C are listed below. The surfaces of the lenses are numbered sequentially from the enlargement side to the reduction side. Reference characters are given to the screen, the lenses, the stop, the dichroic prism, and the liquid crystal panels. Data labeled with a surface number that does not correspond to any of the screen, the lenses, the stop, the dichroic prism, or the liquid crystal panels is dummy data. An aspheric surface has a surface number followed by *. Reference character R represents the radius of curvature. Reference character D represents the axial inter-surface spacing. Reference character nd represents the refractive index at the d line. Reference character vd represents the Abbe number at the d line. Reference characters R and D are expressed in millimeters.

| Reference character | Surface number | R | D | nd | vd |
|---|---|---|---|---|---|
| S | 0 | Infinity | Variable spacing 1 | | |
| L1 | 1* | −31.925 | 5.000 | 1.53116 | 56.04 |
| | 2* | −69.616 | 20.969 | | |
| L2 | 3 | 53.658 | 3.000 | 1.90043 | 37.37 |
| | 4 | 26.168 | Variable spacing 2 | | |
| L3 | 5 | 333.950 | 2.000 | 1.90043 | 37.37 |
| | 6 | 21.961 | Variable spacing 3 | | |
| L4 | 7 | −91.514 | 2.000 | 1.72916 | 54.68 |
| L5 | 8 | 25.283 | 9.000 | 1.76182 | 26.52 |
| | 9 | −49.528 | Variable spacing 4 | | |
| L6 | 10 | 49.923 | 8.000 | 1.76182 | 26.52 |
| L7 | 11 | −24.583 | 1.837 | 1.98612 | 16.48 |
| | 12 | 50.502 | Variable spacing 5 | | |
| L8 | 13 | 78.023 | 1.200 | 1.73400 | 51.47 |
| L9 | 14 | 33.567 | 9.000 | 1.69895 | 30.13 |
| | 15 | −32.065 | Variable spacing 6 | | |
| 41 | 16 | Infinity | 2.000 | | |
| L10 | 17 | −145.677 | 3.736 | 1.86966 | 20.02 |
| L11 | 18 | −22.645 | 1.200 | 1.90043 | 37.37 |
| | 19 | 124.744 | Variable spacing 7 | | |
| L12 | 20* | Infinity | 2.000 | 1.58913 | 61.15 |
| | 21* | 36.202 | 0.100 | | |
| L13 | 22 | 26.378 | 10.904 | 1.74077 | 27.79 |
| L14 | 23 | −17.927 | 2.000 | 1.90043 | 37.37 |
| L15 | 24 | 28.086 | 9.258 | 1.48749 | 70.24 |
| | 25 | −25.601 | 0.100 | | |
| L16 | 26 | −63.030 | 1.200 | 2.00069 | 25.46 |
| L17 | 27 | 40.834 | 8.600 | 1.48749 | 70.24 |
| | 28 | −33.235 | 0.100 | | |
| L18 | 29 | 71.777 | 1.200 | 2.00100 | 29.13 |
| L19 | 30 | 35.238 | 8.789 | 1.49700 | 81.54 |
| | 31 | −71.773 | 0.100 | | |
| L20 | 32 | 69.781 | 11.000 | 1.49700 | 81.54 |
| | 33 | −35.788 | 2.000 | | |
| 19 | 34 | Infinity | 39.600 | 1.51680 | 64.20 |
| | 35 | Infinity | 15.065 | | |
| 18 | 36 | Infinity | | | |

The projection system 3C according to the present example has a changeable projection distance selected from the standard distance, the short distance shorter than the standard distance, and the long distance longer than the standard distance. To change the projection distance, the first-b lens group 34 and the first-c lens group 35 are each moved in the direction of the optical axis N for focusing. In the projection system 3C according to the present example, the second-a lens group 36, the second-b lens group 37, and the second-c lens group 38 can each be moved in the optical axis N for zooming. The angle of view is changed between the values at the wide-angle and telescopic ends by performing zooming at each of the projection distances.

The table below shows the variable spacings 1, 2, 3, 4, 5, 6, and 7 at the projection distances where the focusing and zooming are performed. The variable spacing 1 is the projection distance. The variable spacing 2 is the axial inter-surface spacing between the second lens L2 and the third lens L3. The variable spacing 3 is the axial inter-surface spacing between the third lens L3 and the fourth lens L4. The variable spacing 4 is the axial inter-surface spacing between the fifth lens L5 and the sixth lens L6. The variable spacing 5 is the axial inter-surface spacing between the seventh lens L7 and the eighth lens L8. The variable spacing 6 is the axial inter-surface spacing between the ninth lens L9 and the stop 41. The variable spacing 7 is the axial inter-surface spacing between the eleventh lens L11 and the twelfth lens L12.

When the projection distance is the long distance, the variable spacings are listed below.

| | Wide-angle end | Telescopic end |
|---|---|---|
| Variable spacing 1 | 10900.000 | 10900.000 |
| Variable spacing 2 | 14.722 | 14.000 |
| Variable spacing 3 | 25.883 | 25.166 |
| Variable spacing 4 | 1.676 | 2.476 |
| Variable spacing 5 | 3.695 | 3.481 |
| Variable spacing 6 | 8.039 | 10.604 |
| Variable spacing 7 | 5.068 | 3.356 |

When the projection distance is the standard distance, the variable spacings are listed below.

| | Wide-angle end | Telescopic end |
|---|---|---|
| Variable spacing 1 | 1450.000 | 1450.000 |
| Variable spacing 2 | 15.209 | 14.452 |
| Variable spacing 3 | 26.054 | 25.335 |
| Variable spacing 4 | 1.018 | 1.855 |
| Variable spacing 5 | 3.695 | 3.481 |
| Variable spacing 6 | 8.039 | 10.604 |
| Variable spacing 7 | 5.068 | 3.356 |

When the projection distance is the short distance, the variable spacings are listed below.

| | Wide-angle end | Telescopic end |
|---|---|---|
| Variable spacing 1 | 1000.000 | 1000.000 |
| Variable spacing 2 | 15.473 | 14.738 |
| Variable spacing 3 | 26.138 | 25.427 |
| Variable spacing 4 | 0.670 | 1.477 |
| Variable spacing 5 | 3.695 | 3.481 |
| Variable spacing 6 | 8.039 | 10.604 |
| Variable spacing 7 | 5.068 | 3.356 |

The long projection distance of the projection system 3C according to the present example is 10900.000 mm, and the short projection distance of the projection system 3C is 1000.000 mm. The projection distance ratio of the projection system 3C is therefore greater than or equal to 10.

The aspheric coefficients are listed below.

| Surface number | 1 | 2 |
|---|---|---|
| Radius of curvature (R) | −31.925 | −69.616 |
| Conic constant (K) | −10.280 | −100.000 |
| Third-order coefficient (A) | 2.56214E−04 | 1.72672E−04 |
| Fourth-order coefficient (A) | −1.65047E−06 | 8.07117E−06 |
| Fifth-order coefficient (A) | 8.61548E−08 | −4.31471E−08 |
| Sixth-order coefficient (A) | −3.95031E−09 | −2.54588E−09 |
| Seventh-order coefficient (A) | 6.48932E−11 | −7.82864E−11 |
| Eighth-order coefficient (A) | −1.34188E−12 | 4.27445E−12 |
| Ninth-order coefficient (A) | 3.90508E−14 | −1.56545E−13 |
| Tenth-order coefficient (A) | −1.69162E−16 | 4.10349E−15 |
| Eleventh-order coefficient (A) | −1.69107E−17 | −5.07510E−17 |
| Twelfth-order coefficient (A) | 3.86354E−19 | 2.14054E−19 |
| Thirteenth-order coefficient (A) | −3.42934E−21 | 2.32114E−23 |
| Fourteenth-order coefficient (A) | 1.16276E−23 | 1.82729E−24 |

| Surface number | 20 | 21 |
|---|---|---|
| Radius of curvature (R) | Infinity | 36.202 |
| Conic constant (K) | 0.000 | −11.142 |
| Fourth-order coefficient (A) | −6.39966E−05 | −2.44004E−05 |
| Sixth-order coefficient (A) | 1.96912E−07 | 1.74843E−07 |
| Eighth-order coefficient (A) | −8.43534E−12 | −4.82077E−10 |
| Tenth-order coefficient (A) | −2.66355E−12 | 1.36551E−12 |
| Twelfth-order coefficient (A) | 6.77398E−15 | −6.43950E−15 |
| Fourteenth-order coefficient (A) | 5.00647E−27 | 3.55555E−27 |
| Sixteenth-order coefficient (A) | 1.95468E−30 | 1.91126E−30 |

The projection system 3C according to the present example satisfies each of Conditional Expressions (1) and (2) below, $$BF/F > 5.0 \qquad (1)$$

$$0.3 < |F/F1ab| < 1.0 \qquad (2)$$

where F represents the focal length of the overall projection system, BF represents the back focal length in air, and F1ab represents the combined focal length of the first-a lens group 33 and the first-b lens group 34. The focal length F in this case is the focal length of the entire projection system at the wide-angle end.

In the present example,
F: 7.540 mm
BF: 43.138 mm
are satisfied. BF/F=5.721 is therefore satisfied, and Conditional Expression (1) is satisfied.

In the present example,
F: 7.540 mm
F1ab: −14.785 mm
are satisfied. |F/F1ab|=0.510 is therefore satisfied, and Conditional Expression (2) is satisfied.

The projection system 3C according to the present example satisfies Conditional Expression (3) below, $$1.0 < |F2a/F2b| < 4.0 \qquad (3)$$

where F2a represents the focal length of the second-a lens group 36, and F2b represents the focal length of the second-b lens group 37.

In the present example,
F2a: −86.000 mm
F2b: 34.141 mm
are satisfied. |F2a/F2b|=2.519 is therefore satisfied, and Conditional Expression (3) is satisfied.

The projection system 3C according to the present example satisfies each of Conditional Expressions (5) and (6) below, $$0.2 < |F/F1b| < 0.6 \qquad (5)$$

$$0.0 < F/F1c < 0.14 \qquad (6)$$

where F represents the focal length of the entire projection system, F1b represents the focal length of the first-b lens group 34, and F1c represents the focal length of the first-c lens group 35. The focal length F in this case is the focal length of the entire projection system at the wide-angle end.

In the present example,
F: 7.540 mm
F1b: −26.039 mm
are satisfied. |F/F1b=0.290 is therefore satisfied, and Conditional Expression (5) is satisfied.

In the present example,
F: 7.540 mm
F1c: 104.187 mm
are satisfied. F/F1c=0.072 is therefore satisfied, and Conditional Expression (6) is satisfied.

Effects and Advantages

In the projection system 3C according to the present example, the sum of the number of lenses of the first-a lens group 33 and the number of lenses of the first-b lens group 34 is three. The weight of the enlargement-side end portion of the projection system 3C can therefore be readily suppressed.

In the projection system 3C according to the present example, the first lens L1 of the first-a lens group 33 is made of resin and can therefore be lighter than in a case where the first lens L1 is made of glass. In the configuration in which the first lens L1 is made of resin, the first lens L1 has a larger refractive index-temperature coefficient in accordance with which the refractive index changes with temperature and a larger coefficient of linear expansion than in the case where the first lens L1 is made of glass. Heat therefore tends to cause a change in the refractive index of the first lens L1 and deformation of the shape thereof. An increase in the negative power of the first lens L1 therefore tends to cause the image quality of an enlarged image to be affected by the heat. In contrast, in the present example, the first-a lens group 33 is formed of two lenses, the first lens L1 and the second lens L2. The two lenses, the first lens L1 and the second lens L2, can therefore be responsible for the power of the first-a lens group 33. The negative power of the first-a lens group 33 can therefore be increased with an increase in the negative power of the first lens L1 suppressed, whereby the situation in which heat tends to affect the image quality of an enlarged image can be suppressed.

Since the negative power of the first-a lens group 33 can be increased, the first-b lens group 34 can be formed of a single lens. The first-b lens group 34 is therefore lighter and more readily moved during focusing. The enlargement-side surface of the third lens L3 has power smaller than that of the reduction-side surface of the third lens L3. The third lens L3 can therefore suppress aberrations that occur at the enlargement-side surface. As a result, astigmatism and other aberrations produced during focusing can be suppressed.

The projection system 3C according to the present example, which satisfies Conditional Expressions (1) to (3), (5), and (6), can provide the same effects and advantages as those provided by the projection system 3A according to Example 1. In the present example, the second lens group 32 includes six cemented doublets and triplets in total. The chromatic aberrations can therefore be corrected well.

Figure 17:
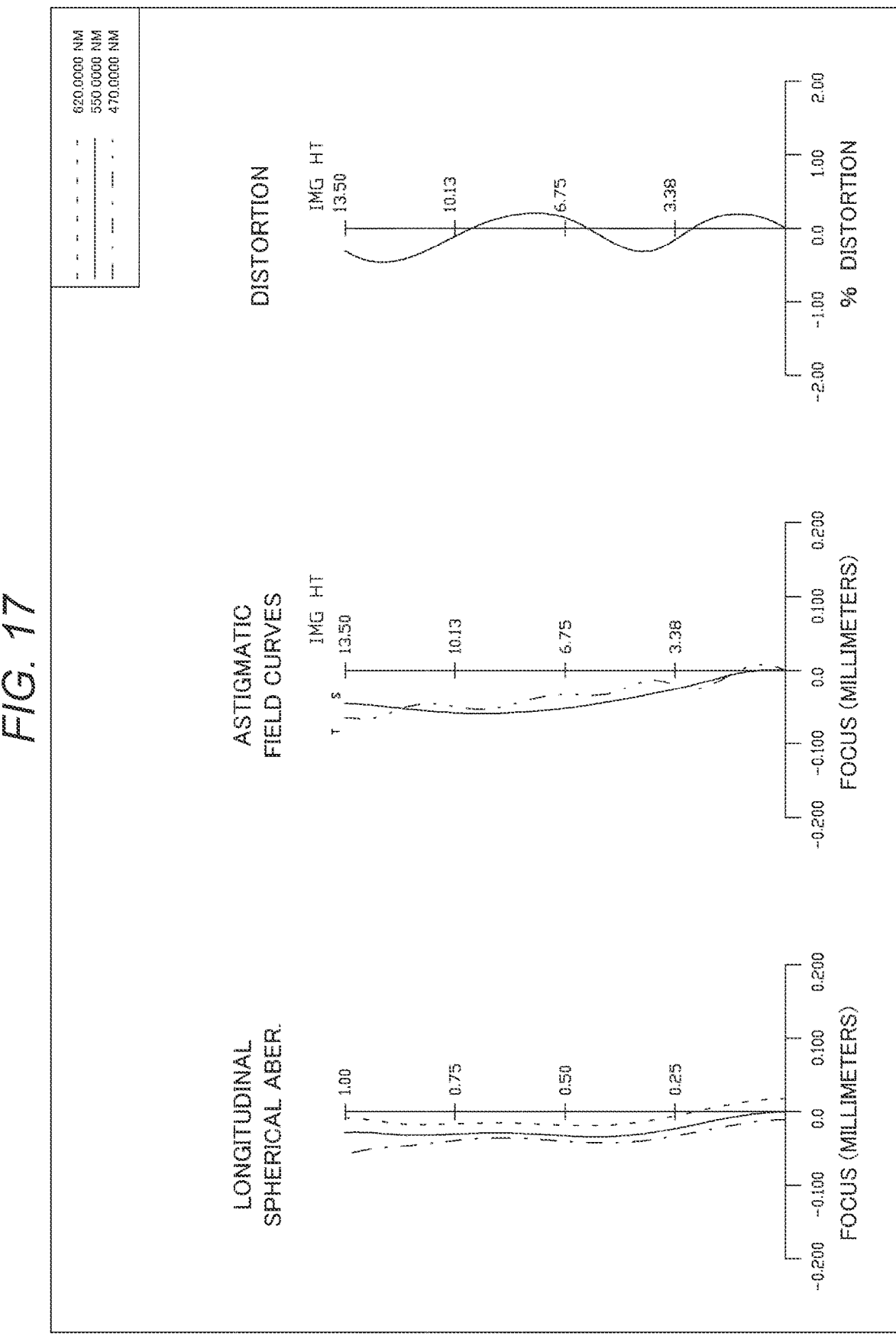
FIG. 17 shows the spherical aberration, astigmatism, and distortion produced by the projection system according to Example 3 at the wide-angle end and the standard distance.
Figure 18:
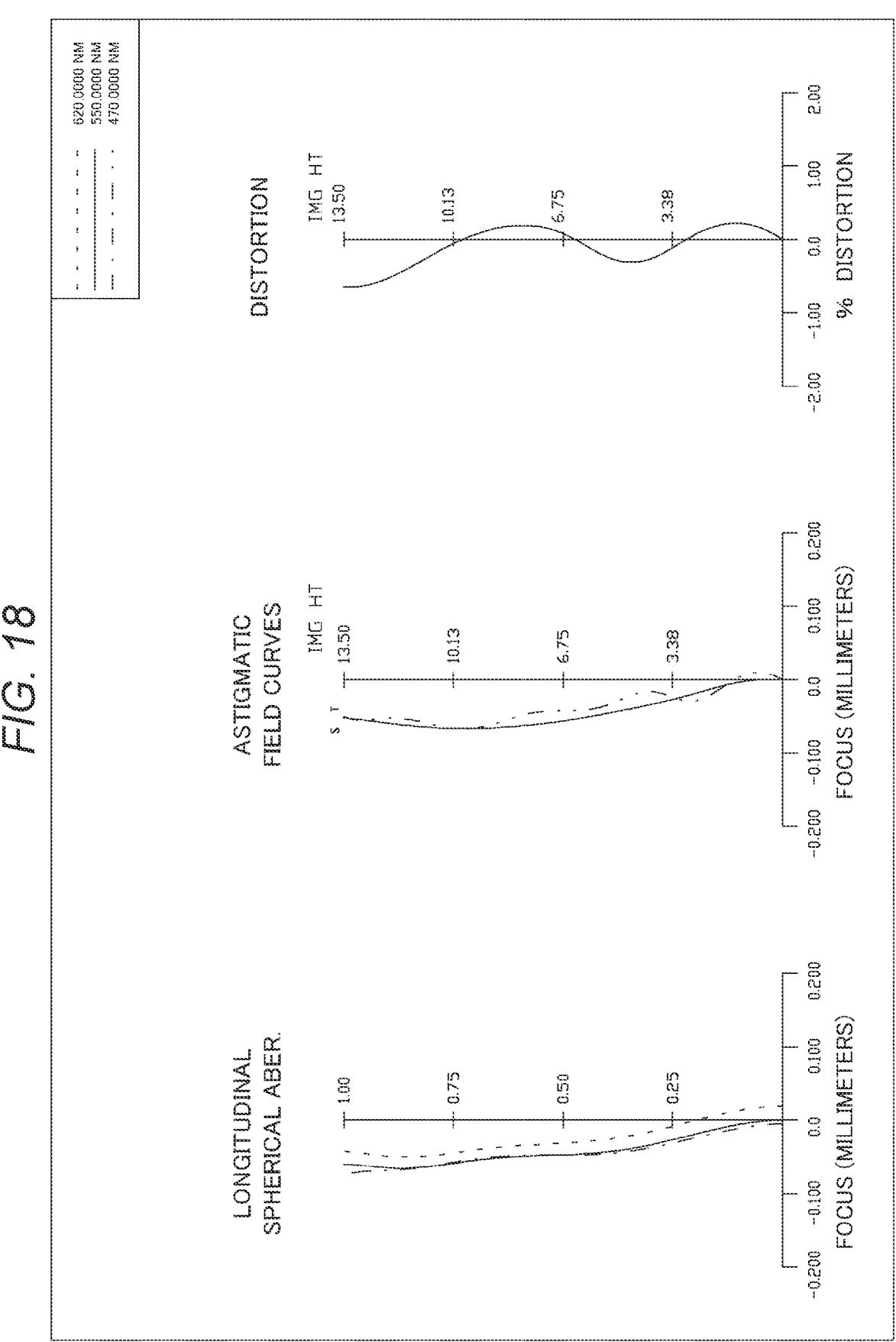
FIG. 18 shows the spherical aberration, astigmatism, and distortion produced by the projection system according to Example 3 at the telescopic end and the standard distance.
Figure 19:
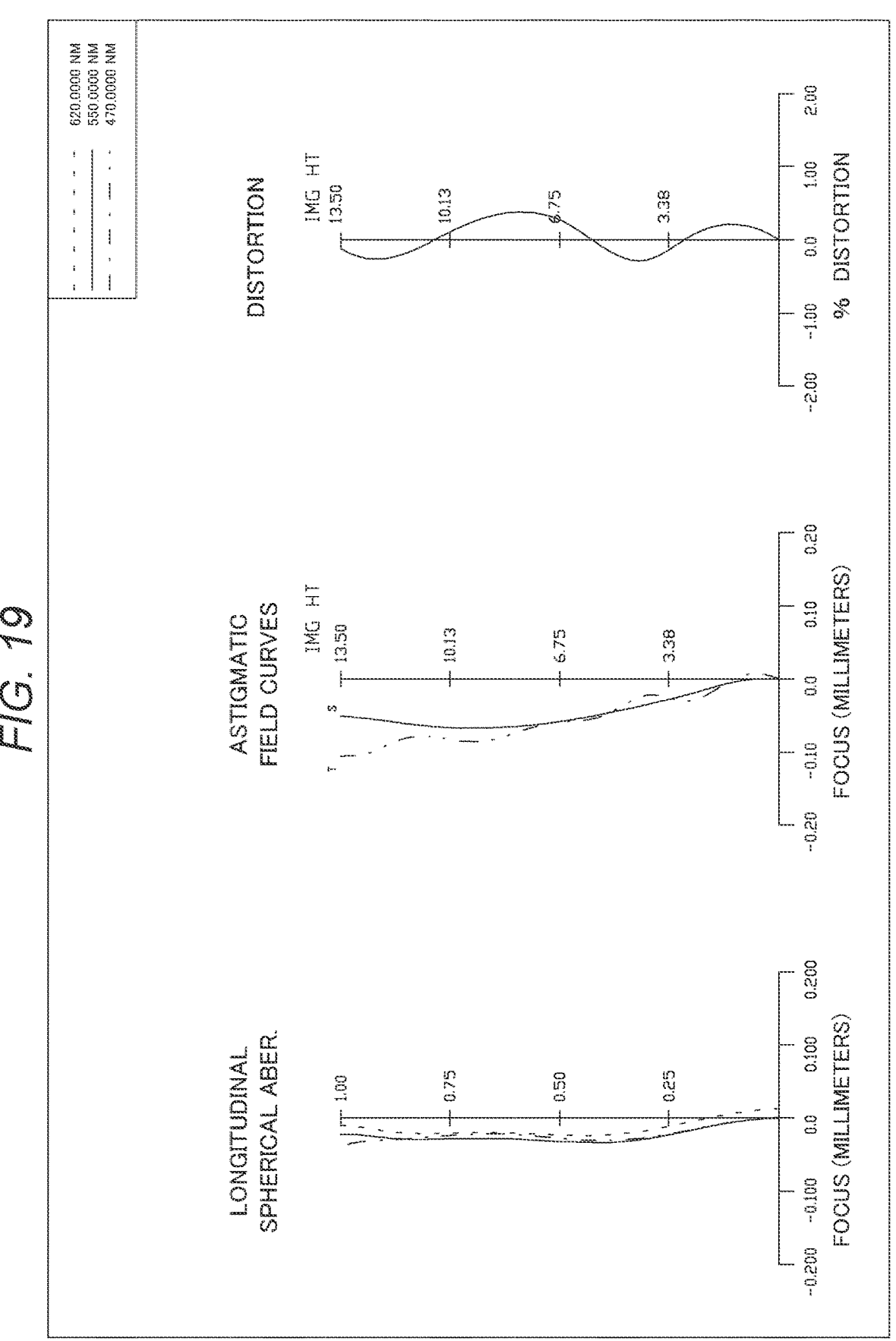
FIG. 19 shows the spherical aberration, astigmatism, and distortion produced by the projection system according to Example 3 at the wide-angle end and the long distance.
Figure 20:
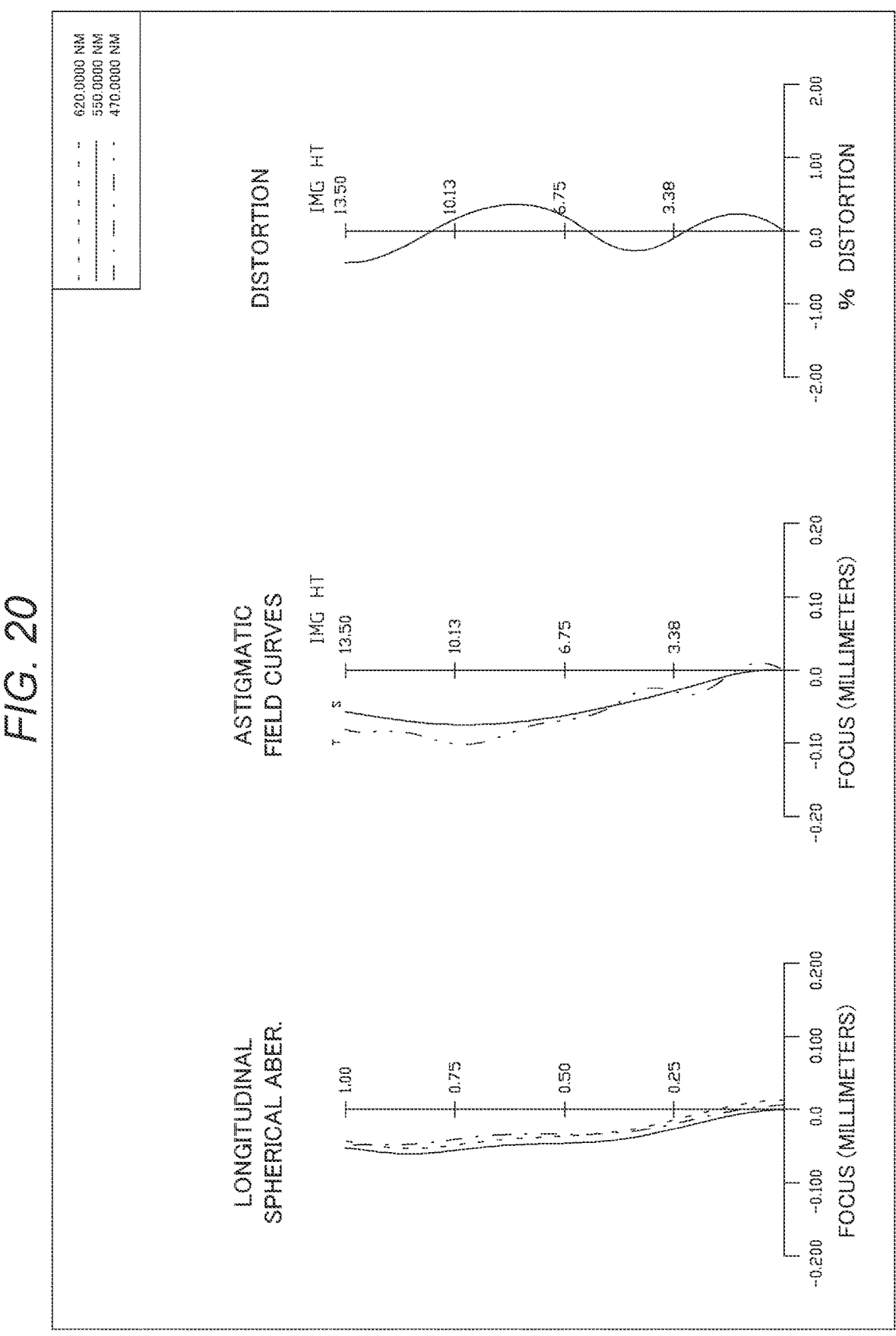
FIG. 20 shows the spherical aberration, astigmatism, and distortion produced by the projection system according to Example 3 at the telescopic end and the long distance.
Figure 21:
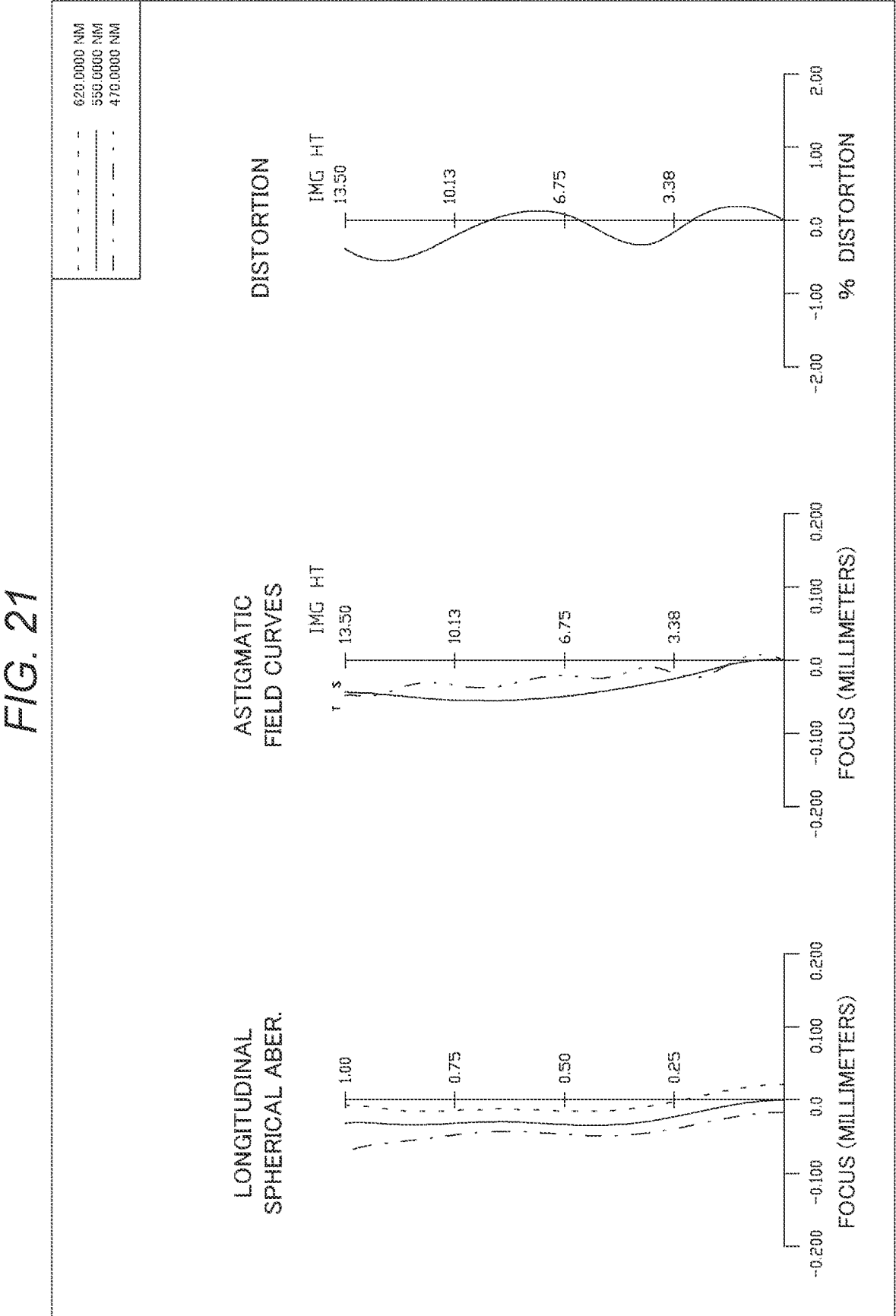
FIG. 21 shows the spherical aberration, astigmatism, and distortion produced by the projection system according to Example 3 at the wide-angle end and the short distance.
Figure 22:
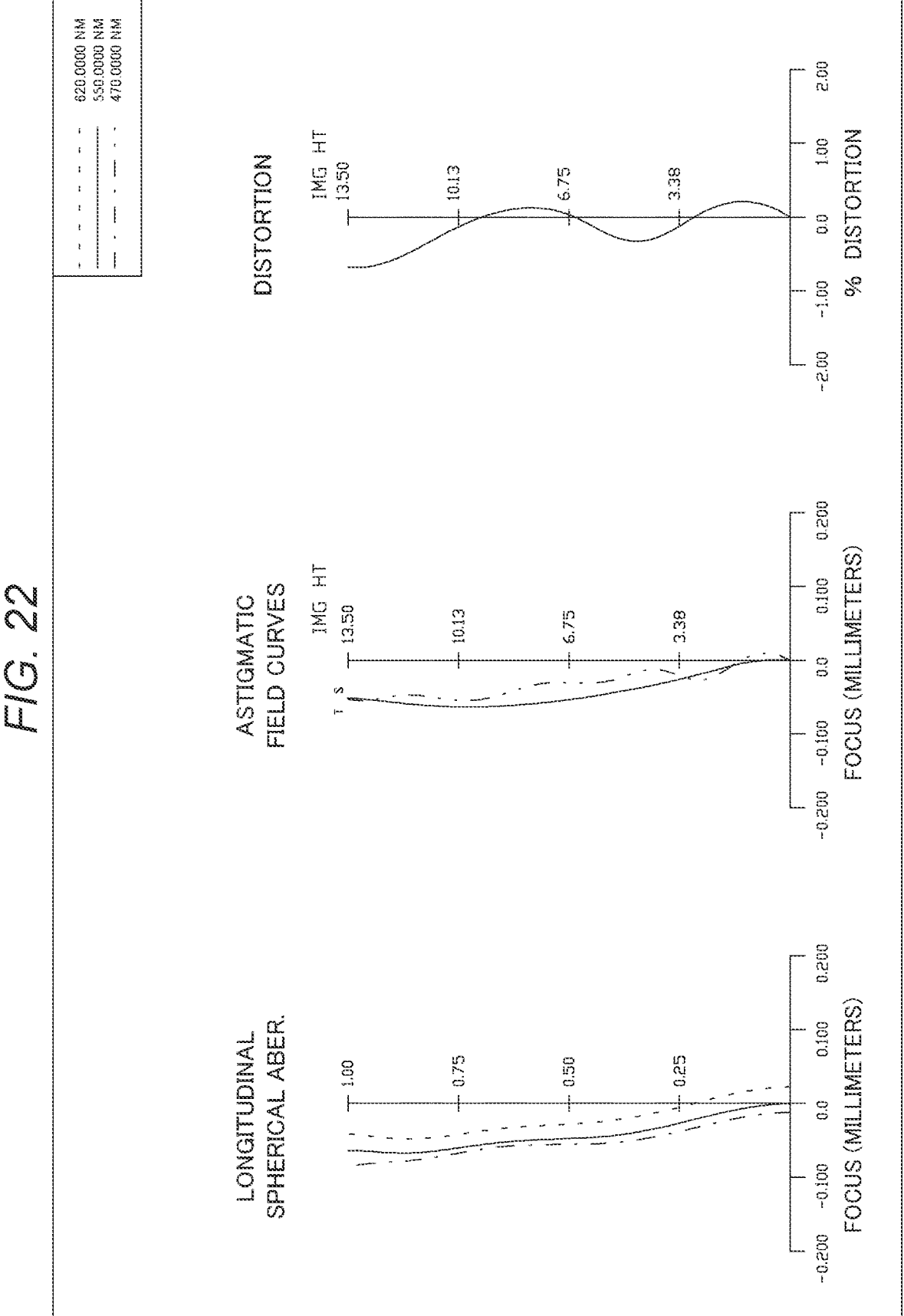
FIG. 22 shows the spherical aberration, astigmatism, and distortion produced by the projection system according to Example 3 at the telescopic end and the short distance.

FIG. 17 shows the spherical aberration, astigmatism, and distortion produced by the projection system 3C at the wide-angle end and the standard distance. FIG. 18 shows the spherical aberration, astigmatism, and distortion produced by the projection system 3C at the telescopic end and the standard distance. FIG. 19 shows the spherical aberration, astigmatism, and distortion produced by the projection system 3C at the wide-angle end and the long distance. FIG. 20 shows the spherical aberration, astigmatism, and distortion produced by the projection system 3C at the telescopic end and the long distance. FIG. 21 shows the spherical aberration, astigmatism, and distortion produced by the projection system 3C at the wide-angle end and the short distance. FIG. 22 shows the spherical aberration, astigmatism, and distortion produced by the projection system 3C at the telescopic end and the short distance. The projection system 3C according to the present example allows suppression of the aberrations that degrade an enlarged image, as shown in FIGS. 17 to 22.

Example 4

Figure 23:
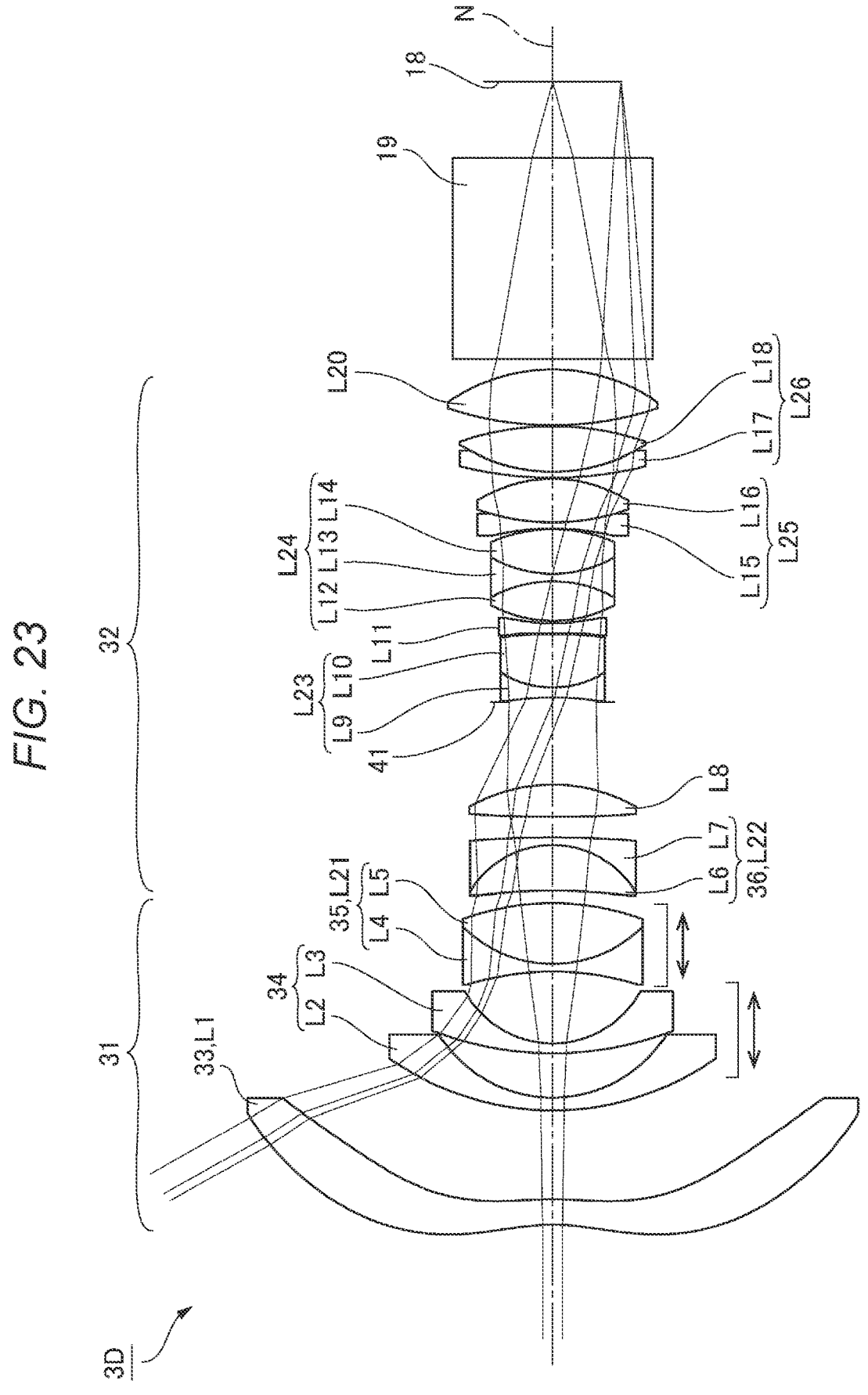
FIG. 23 is a beam diagram showing beams passing through the projection system according to Example 4.

FIG. 23 is a beam diagram showing beams passing through a projection system 3D according to Example 4. The projection system 3D includes a first lens group 31 having negative power and a second lens group 32 having positive power sequentially arranged from the enlargement side toward the reduction side, as shown in FIG. 23. The projection system 3D further includes a stop 41 disposed in the second lens group 32. The stop 41 is disposed in the second lens group 32 at the position where the chief ray having the largest angle of view intersects with the optical axis N.

The first lens group 31 includes a first-a lens group 33 having negative power, a first-b lens group 34 located at the reduction side of the first-a lens group 33 and having negative power, and a first-c lens group 35 located at the reduction side of the first-b lens group 34 and having positive power.

The first-a lens group 33 is formed of a first lens L1. The first lens L1 has negative power in the vicinity of the optical axis N. The enlargement-side surface of the first lens L1 has a concave shape in the vicinity of the optical axis N and a convex shape at the periphery. The reduction-side surface of the first lens L1 has a convex shape in the vicinity of the optical axis N and a concave shape at the periphery. The first lens L1 has aspheric surfaces at opposite sides.

The first-b lens group 34 is formed of a second lens L2 and a third lens L3. The second lens L2 and the third lens L3 are arranged in this order from the enlargement side toward the reduction side. The second lens L2 has negative power. The second lens L2 is a meniscus lens. The second lens L2 has a convex enlargement-side surface and a concave reduction-side surface. The third lens L3 has negative power. The third lens L3 is a meniscus lens. The third lens L3 has a convex enlargement-side surface and a concave reduction-side surface.

The first-c lens group 35 is formed of a fourth lens L4 and a fifth lens L5. The fourth lens L4 and the fifth lens L5 are arranged in this order from the enlargement side toward the reduction side. The fourth lens L4 and the fifth lens L5 are bonded to each other into a cemented doublet L21. The fourth lens L4 has negative power. The fourth lens L4 has concave surfaces both at the enlargement and reduction sides. The fifth lens L5 has positive power. The fifth lens L5 has convex surfaces both at the enlargement and reduction sides.

The second lens group 32 is formed of fourteen lenses, a sixth lens L6 to a nineteenth lens L19. The sixth lens L6 to the nineteenth lens L19 are arranged in this order from the enlargement side toward the reduction side. The second lens group 32 is fixed. The stop 41 is disposed between the eighth lens L8 and the ninth lens L9.

The sixth lens L6 has positive power. The sixth lens L6 is a meniscus lens. The sixth lens L6 has a concave enlargement-side surface and a convex reduction-side surface. The seventh lens L7 has negative power. The seventh lens L7 is a meniscus lens. The seventh lens L7 has a concave enlargement-side surface and a convex reduction-side surface. The sixth lens L6 and the seventh lens L7 are bonded to each other into a cemented doublet L22.

The eighth lens L8 has positive power. The eighth lens L8 has convex surfaces both at the enlargement and reduction sides.

The ninth lens L9 has negative power. The ninth lens L9 has concave surfaces both at the enlargement and reduction sides. The tenth lens L10 has positive power. The tenth lens L10 has convex surfaces both at the enlargement and reduction sides. The ninth lens L9 and the tenth lens L10 are bonded to each other into a cemented doublet L23.

The eleventh lens 11 has negative power. The eleventh lens L11 has concave surfaces both at the enlargement and reduction sides. The eleventh lens L11 has aspheric surfaces at opposite sides.

The twelfth lens L12 has positive power. The twelfth lens L12 has convex surfaces both at the enlargement and reduction sides. The thirteenth lens L13 has negative power. The thirteenth lens L13 has concave surfaces both at the enlargement and reduction sides. The fourteenth lens L14 has positive power. The fourteenth lens L14 has convex surfaces both at the enlargement and reduction sides. The twelfth lens L12, the thirteenth lens L13, and the fourteenth lens L14 are bonded to each other into a cemented triplet L24.

The fifteenth lens L15 has negative power. The fifteenth lens L15 has concave surfaces both at the enlargement and reduction sides. The sixteenth lens L16 has positive power. The sixteenth lens L16 has convex surfaces both at the enlargement and reduction sides. The fifteenth lens L15 and the sixteenth lens L16 are bonded to each other into a cemented doublet L25.

The seventeenth lens L17 has negative power. The seventeenth lens L17 is a meniscus lens. The seventeenth lens L17 has a convex enlargement-side surface and a concave reduction-side surface. The eighteenth lens L18 has positive power. The eighteenth lens L18 has convex surfaces both at the enlargement and reduction sides. The seventeenth lens L17 and the eighteenth lens L18 are bonded to each other into a cemented doublet L26.

The nineteenth lens L19 has positive power. The nineteenth lens L19 has convex surfaces both at the enlargement and reduction sides.

The first lens L1 is made of resin. The second lens L2 to the nineteenth lens L19 are made of glass.

In the projection system 3D, the optical components at the reduction side of the nineteenth lens L19 of the second lens group 32 form a telecentric system.

The projection system 3D has a changeable projection distance. To change the projection distance, the first-b lens group 34 and the first-c lens group 35 are each moved in the direction of the optical axis N for focusing.

Data on the projection system 3D are listed in a table below. In the table, FNo represents the f number of the projection system 3D, F represents the focal length of the overall projection system, ω represents half the angle of view, BF represents the back focal length in air, F1b represents the focal length of the first-b lens group 34, F1c represents the focal length of the first-c lens group 35, F1ab represents the combined focal length of the first-a lens group 33 and the first-b lens group 34, F1 represents the focal length of the first lens group 31, and F2 represents the focal length of the second lens group 32.

| | |
|---|---|
| FNo | 1.9 |
| F | 7.540 mm |
| ω | 60.7° |
| BF | 43.156 mm |
| F1b | −20.429 mm |
| F1c | 837.410 mm |
| F1ab | −14.785 mm |
| F1 | −17.355 mm |
| F2 | 40.190 mm |

Data on the lenses of the projection system 3D are listed below. The surfaces of the lenses are numbered sequentially from the enlargement side to the reduction side. Reference characters are given to the screen, the lenses, the stop, the dichroic prism, and the liquid crystal panels. Data labeled with a surface number that does not correspond to any of the screen, the lenses, the stop, the dichroic prism, or the liquid crystal panels is dummy data. An aspheric surface has a surface number followed by *. Reference character R represents the radius of curvature. Reference character D represents the axial inter-surface spacing. Reference character nd represents the refractive index at the d line. Reference character vd represents the Abbe number at the d line. Reference characters R and D are expressed in millimeters.

| Reference character | Surface number | R | D | nd | vd |
|---|---|---|---|---|---|
| S | 0 | Infinity | Variable spacing 1 | | |
| L1 | 1* | −34.584 | 5.000 | 1.53116 | 56.04 |
| | 2* | −68.772 | Variable spacing 2 | | |
| L2 | 3 | 55.271 | 2.500 | 1.83481 | 42.72 |
| | 4 | 26.388 | 8.742 | | |
| L3 | 5 | 64.368 | 2.000 | 1.83481 | 42.72 |
| | 6 | 19.757 | Variable spacing 3 | | |
| L4 | 7 | −56.430 | 1.500 | 1.72916 | 54.68 |
| L5 | 8 | 25.000 | 12.000 | 1.69895 | 30.05 |
| | 9 | −51.078 | Variable spacing 4 | | |
| L6 | 10 | −118.104 | 9.000 | 1.80809 | 22.76 |
| L7 | 11 | −19.044 | 1.500 | 1.98612 | 16.48 |
| | 12 | −203.334 | 4.044 | | |
| L8 | 13 | 243.448 | 6.345 | 1.69895 | 30.13 |
| | 14 | −33.370 | 16.326 | | |
| 41 | 15 | Infinity | 0.894 | | |
| L9 | 16 | −57.994 | 2.000 | 1.90043 | 37.37 |
| L10 | 17 | 19.841 | 10.464 | 1.86966 | 20.02 |
| | 18 | −75.115 | 0.100 | | |
| L11 | 19* | 330.026 | 2.000 | 1.58913 | 61.15 |
| | 20* | 29.237 | 0.500 | | |
| L12 | 21 | 25.613 | 7.782 | 1.72825 | 28.46 |
| L13 | 22 | −25.000 | 1.500 | 1.90043 | 37.37 |
| L14 | 23 | 24.710 | 8.825 | 1.48749 | 70.24 |
| | 24 | −29.949 | 0.100 | | |
| L15 | 25 | −52.380 | 1.200 | 2.00069 | 25.46 |

-continued

| Reference character | Surface number | R | D | nd | vd |
|---|---|---|---|---|---|
| L16 | 26 | 44.272 | 8.600 | 1.48749 | 70.24 |
| | 27 | −27.918 | 0.200 | | |
| L17 | 28 | 74.624 | 1.200 | 2.00100 | 29.13 |
| L18 | 29 | 34.572 | 8.901 | 1.49700 | 81.54 |
| | 30 | −56.314 | 0.200 | | |
| L19 | 31 | 66.262 | 11.000 | 1.49700 | 81.54 |
| | 32 | −36.354 | 2.000 | | |
| 19 | 33 | Infinity | 39.600 | 1.51680 | 64.20 |
| | 34 | Infinity | 15.084 | | |
| 18 | 35 | Infinity | | | |

The projection system 3D according to the present example has a changeable projection distance selected from the standard distance, the short distance shorter than the standard distance, and the long distance longer than the standard distance. To change the projection distance, the first-b lens group 34 and the first-c lens group 35 are each moved in the direction of the optical axis N for focusing.

The table below shows the variable spacings 1, 2, 3, and 4 at the projection distances where the focusing is performed. The variable spacing 1 is the projection distance. The variable spacing 2 is the axial inter-surface spacing between the first lens L1 and the second lens L2. The variable spacing 3 is the axial inter-surface spacing between the third lens L3 and the fourth lens L4. The variable spacing 4 is the axial inter-surface spacing between the fifth lens L5 and the sixth lens L6.

| | Long distance | Standard distance | Short distance |
|---|---|---|---|
| Variable spacing 1 | 10900.000 | 1450.000 | 1000.000 |
| Variable spacing 2 | 17.102 | 17.456 | 17.491 |
| Variable spacing 3 | 12.818 | 14.177 | 14.512 |
| Variable spacing 4 | 4.088 | 2.375 | 2.005 |

The long projection distance of the projection system 3D according to the present example is 10900.000 mm, and the short projection distance of the projection system 3D is 1000.000 mm. The projection distance ratio of the projection system 3D is therefore greater than or equal to 10.

The aspheric coefficients are listed below.

| Surface number | 1 | 2 |
|---|---|---|
| Radius of curvature (R) | −34.584 | −68.772 |
| Conic constant (K) | −11.401 | −100.000 |
| Third-order coefficient (A) | 2.34194E−04 | 1.30494E−04 |
| Fourth-order coefficient (A) | −1.13226E−06 | 7.91852E−06 |
| Fifth-order coefficient (A) | 8.87260E−08 | −5.09293E−08 |
| Sixth-order coefficient (A) | −4.09380E−09 | −2.35275E−09 |
| Seventh-order coefficient (A) | 6.74074E−11 | −7.44043E−11 |
| Eighth-order coefficient (A) | −1.32006E−12 | 4.30173E−12 |
| Ninth-order coefficient (A) | 3.85785E−14 | −1.56644E−13 |
| Tenth-order coefficient (A) | −1.78515E−16 | 4.09438E−15 |
| Eleventh-order coefficient (A) | −1.69184E−17 | −5.09345E−17 |

-continued

| Surface number | 1 | 2 |
|---|---|---|
| Twelfth-order coefficient (A) | 3.87634E−19 | 2.11593E−19 |
| Thirteenth-order coefficient (A) | −3.41106E−21 | 1.84565E−23 |
| Fourteenth-order coefficient (A) | 1.16140E−23 | 2.86559E−24 |

| Surface number | 19 | 20 |
|---|---|---|
| Radius of curvature (R) | 330.026 | 29.237 |
| Conic constant (K) | 0.000 | −11.363 |
| Fourth-order coefficient (A) | −1.01832E−04 | −4.16004E−05 |
| Sixth-order coefficient (A) | 4.15400E−07 | 2.54288E−07 |
| Eighth-order coefficient (A) | −1.02308E−09 | −6.07846E−10 |
| Tenth-order coefficient (A) | −1.11338E−12 | −9.40986E−14 |
| Twelfth-order coefficient (A) | 1.48744E−14 | 4.12170E−15 |
| Fourteenth-order coefficient (A) | 5.23764E−27 | −5.15036E−21 |
| Sixteenth-order coefficient (A) | 2.02623E−30 | 1.96665E−30 |

The projection system 3D according to the present example satisfies each of Conditional Expressions (1) and (2) below, $$BF/F>5.0 \tag{1}$$

$$0.3<|F/F1ab|<1.0 \tag{2}$$

where F represents the focal length of the overall projection system, BF represents the back focal length in air, and F1ab represents the combined focal length of the first-a lens group 33 and the first-b lens group 34.
In the present example,
F: 7.540 mm
BF: 43.156 mm
are satisfied. BF/F=5.724 is therefore satisfied, and Conditional Expression (1) is satisfied.
In the present example,
F: 7.540 mm
F1ab: −14.785 mm
are satisfied. |F/F1ab|=0.510 is therefore satisfied, and Conditional Expression (2) is satisfied.
The projection system 3D according to the present example does not include a moving group and satisfies Conditional Expression (4) below, $$0.1<|F1/F2|<0.5 \tag{4}$$

where F1 represents the focal length of the first lens group 31, and F2 represents the focal length of the second lens group 32.
In the present example,
F1: −17.355 mm
F2: 40.190 mm
are satisfied. |F1/F2|=0.432 is therefore satisfied, and Conditional Expression (4) is satisfied.
The projection system 3D according to the present example satisfies each of Conditional Expressions (5) and (6) below, $$0.2<|F/F1b|<0.6 \tag{5}$$

$$0.0<F/F1c<0.14 \tag{6}$$

where F represents the focal length of the entire projection system, F1b represents the focal length of the first-b lens group 34, and F1c represents the focal length of the first-c lens group 35.
In the present example,
F: 7.540 mm
F1b: −20.429 mm
are satisfied. |F/F1b|=0.369 is therefore satisfied, and Conditional Expression (5) is satisfied.
In the present example,
F: 7.540 mm
F1c: 837.410 mm
are satisfied. F/F1c=0.009 is therefore satisfied, and Conditional Expression (6) is satisfied.

Effects and Advantages

In the projection system 3D according to the present example, the sum of the number of lenses of the first-a lens group 33 and the number of lenses of the first-b lens group 34 is three. The weight of the enlargement-side end portion of the projection system 3D can therefore be readily suppressed.
In the present example, the first lens L1 of the first-a lens group 33 is made of resin and can therefore be lighter than in a case where the first lens L1 is made of glass. In the configuration in which the first lens L1 is made of resin, the first lens L1 has a larger refractive index-temperature coefficient in accordance with which the refractive index changes with temperature and a larger coefficient of linear expansion than in the case where the first lens L1 is made of glass. Heat therefore tends to cause a change in the refractive index of the first lens L1 and deformation of the shape thereof. An increase in the negative power of the first lens L1 therefore tends to cause the image quality of an enlarged image to be affected by the heat. In contrast, in the present example, the first-b lens group 34 is formed of two negative lenses, and compensates for the insufficient power of the first lens L1. The negative power of the first lens L1 therefore does not need to be increased to excess, whereby the situation in which the image quality of an enlarged image tends to be affected by heat can be suppressed. In the first-b lens group 34, the second lens L2 and the third lens L3 are each a negative meniscus lens, whereby astigmatism and other aberrations produced by focusing can be suppressed.
The projection system 3D according to the present example, in which the second lens group 32 is fixed in the direction of the optical axis N, satisfies Conditional Expression (4) below, $$0.1<|F1/F2|<0.5 \tag{4}$$

where F1 represents the focal length of the first lens group 31, and F2 represents the focal length of the second lens group 32.
The projection system 3D according to the present example, which satisfies Conditional Expression (4), can ensure a sufficient back focal length while suppressing occurrence of the aberrations. That is, when the value of Conditional Expression (4) is smaller than the lower limit, the focal length F1 of the first lens group 31 decreases, and the negative power of the first lens group 31 increases. In this case, the back focal length is readily ensured, but a decrease in the radius of curvature of each of the lenses that form the first lens group 31 tends to cause coma aberration, lateral chromatic aberration, and other aberrations to occur in a large image height area of each of the lenses. When the negative power of the first lens group 31 increases, it is conceivable to increase the number of lenses that form the first lens group 31 to reduce the power of each of the lenses for suppression of occurrence of the aberrations. In this case, however, the number of lenses increases, undesirably resulting in an extra cost. When the value of Conditional Expression (4) is greater than the upper limit, it is difficult to ensure a sufficient back focal length.

The projection system 3D according to the present example, which satisfies Conditional Expressions (1), (2), (5), and (6), can provide the same effects and advantages as those provided by the projection system 3A according to Example 1. In the present example, the second lens group 32 includes five cemented doublets and triplets in total. The chromatic aberrations can therefore be corrected well.

Figure 24:
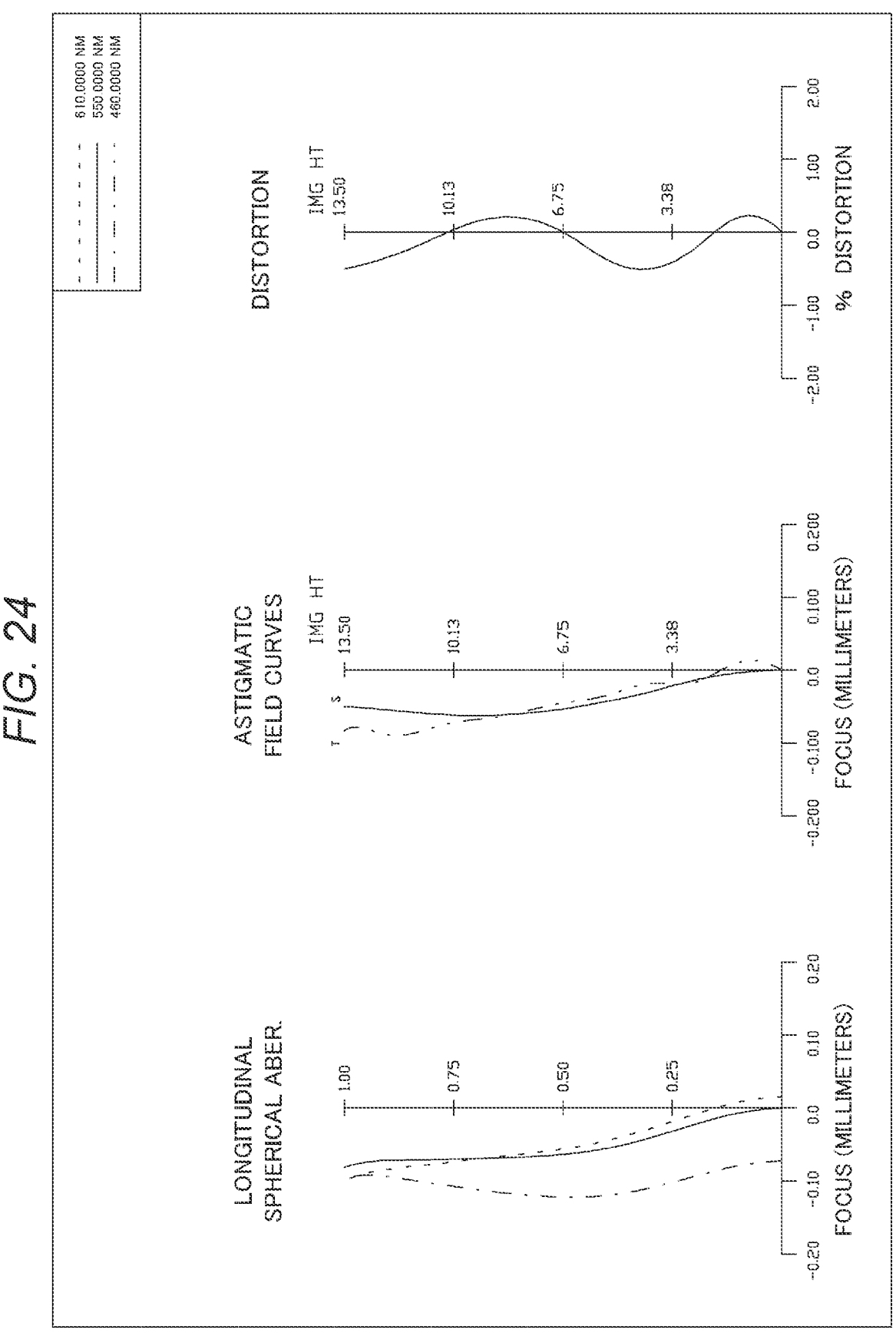
FIG. 24 shows the spherical aberration, astigmatism, and distortion produced by the projection system according to Example 4 at the standard distance.
Figure 25:
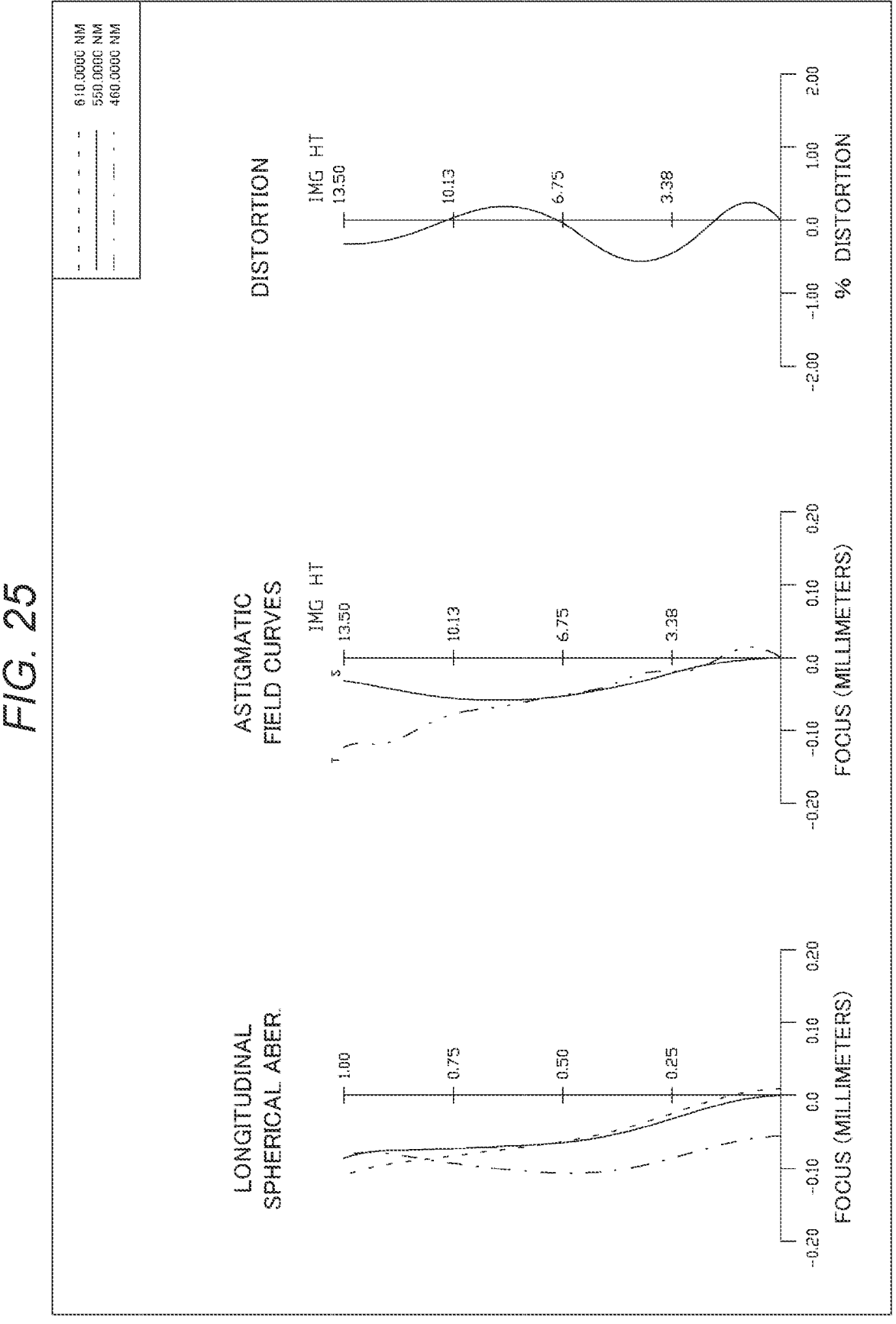
FIG. 25 shows the spherical aberration, astigmatism, and distortion produced by the projection system according to Example 4 at the long distance.
Figure 26:
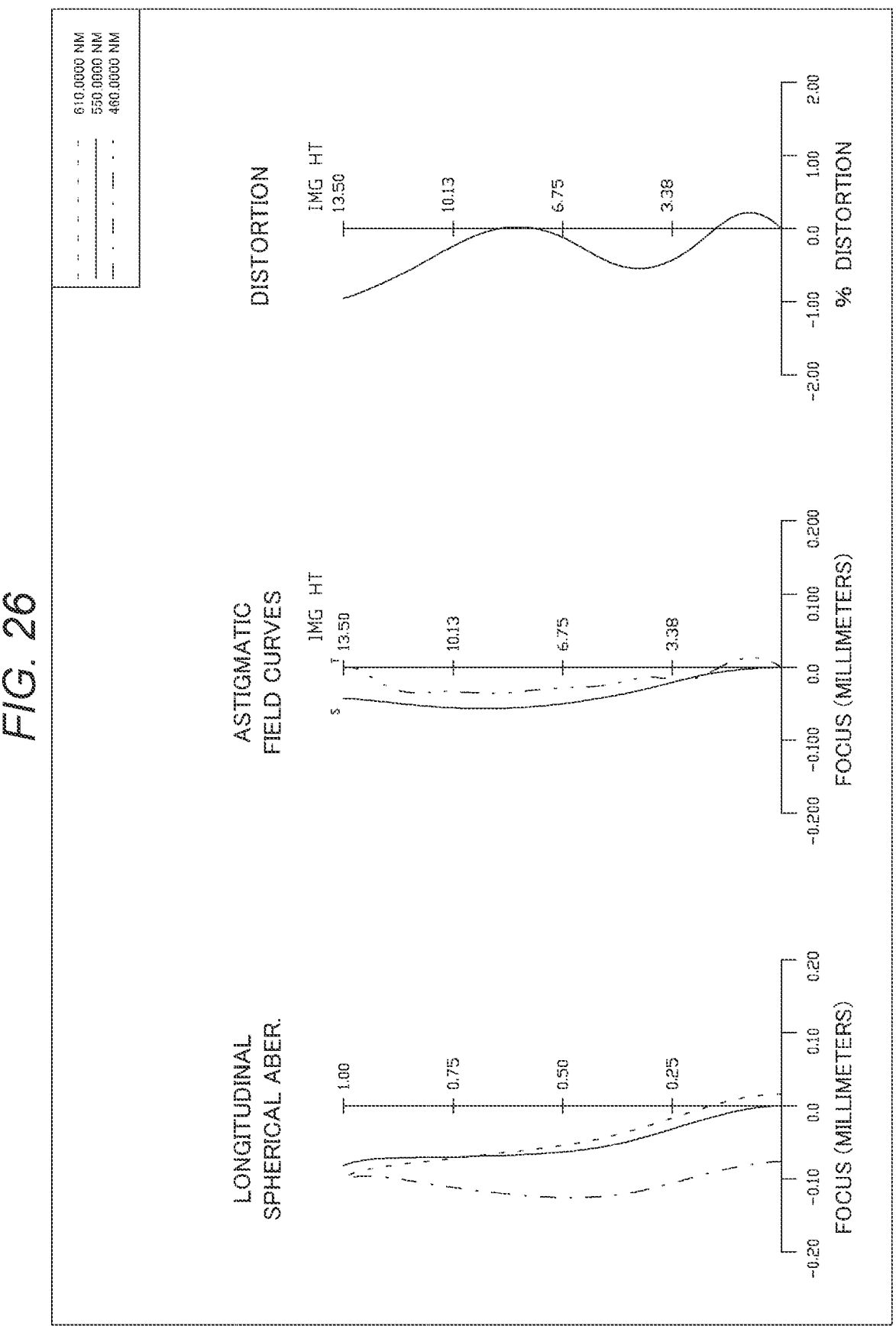
FIG. 26 shows the spherical aberration, astigmatism, and distortion produced by the projection system according to Example 4 at the short distance.

FIG. 24 shows the spherical aberration, astigmatism, and distortion produced by the projection system 3D at the standard distance. FIG. 25 shows the spherical aberration, astigmatism, and distortion produced by the projection system 3D at the long distance. FIG. 26 shows the spherical aberration, astigmatism, and distortion produced by the projection system 3D at the short distance. The projection system 3D according to the present example allows suppression of the aberrations that degrade an enlarged image, as shown in FIGS. 24 to 26.

Example 5

Figure 27:
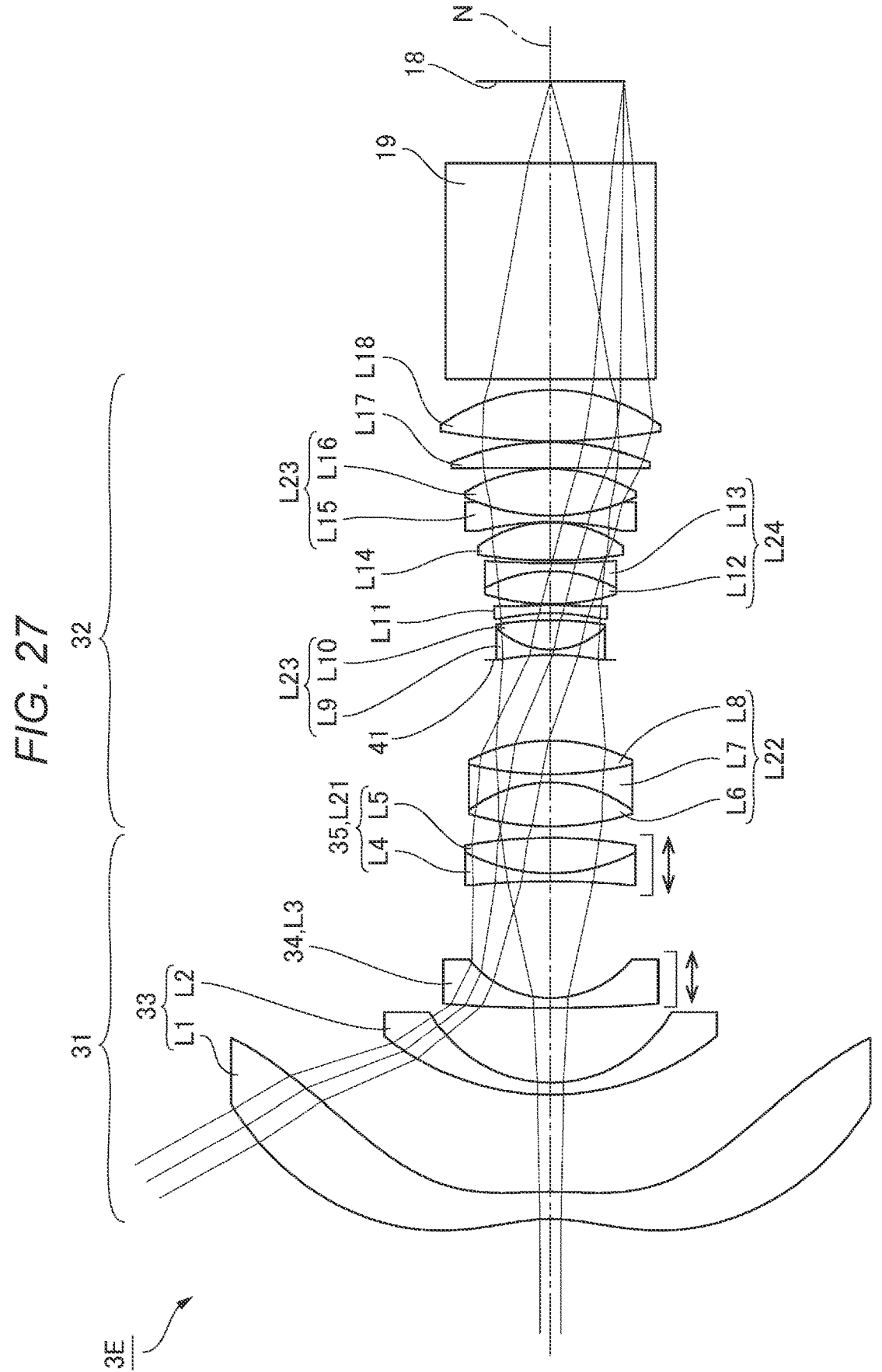
FIG. 27 is a beam diagram showing beams passing through the projection system according to Example 5.

FIG. 27 is a beam diagram showing beams passing through a projection system 3E according to Example 5. The projection system 3E includes a first lens group 31 having negative power and a second lens group 32 having positive power sequentially arranged from the enlargement side toward the reduction side, as shown in FIG. 27. The projection system 3E further includes a stop 41 disposed in the second lens group 32. The stop 41 is disposed in the second lens group 32 at the position where the chief ray having the largest angle of view intersects with the optical axis N.

The first lens group 31 includes a first-a lens group 33 having negative power, a first-b lens group 34 located at the reduction side of the first-a lens group 33 and having negative power, and a first-c lens group 35 located at the reduction side of the first-b lens group 34 and having positive power.

The first-a lens group 33 is formed of a first lens L1 and a second lens L2. The first lens L1 has negative power in the vicinity of the optical axis N. The enlargement-side surface of the first lens L1 has a concave shape in the vicinity of the optical axis N and a convex shape at the periphery. The reduction-side surface of the first lens L1 has a convex shape in the vicinity of the optical axis N and a concave shape at the periphery. The first lens L1 has aspheric surfaces at opposite sides. The second lens L2 has negative power. The second lens L2 is a meniscus lens. The second lens L2 has a convex enlargement-side surface and a concave reduction-side surface.

The first-b lens group 34 is formed of a third lens L3. The third lens L3 has negative power. The third lens L3 is a meniscus lens. The third lens L3 has a convex enlargement-side surface and a concave reduction-side surface. The enlargement-side surface of the third lens L3 has power smaller than that of the reduction-side surface of the third lens L3.

The first-c lens group 35 is formed of a fourth lens L4 and a fifth lens L5. The fourth lens L4 and the fifth lens L5 are arranged in this order from the enlargement side toward the reduction side. The fourth lens L4 and the fifth lens L5 are bonded to each other into a cemented doublet L21. The fourth lens L4 has negative power. The fourth lens L4 has concave surfaces both at the enlargement and reduction sides. The fifth lens L5 has positive power. The fifth lens L5 has convex surfaces both at the enlargement and reduction sides.

The second lens group 32 is formed of thirteen lenses, a sixth lens L6 to an eighteenth lens L18. The sixth lens L6 to the eighteenth lens L18 are arranged in this order from the enlargement side toward the reduction side. The second lens group 32 is fixed. The stop 41 is disposed between the eighth lens L8 and the ninth lens L9.

The sixth lens L6 has positive power. The sixth lens L6 has convex surfaces both at the enlargement and reduction sides. The seventh lens L7 has negative power. The seventh lens L7 has concave surfaces both at the enlargement and reduction sides. The eighth lens L8 has positive power. The eighth lens L8 has convex surfaces both at the enlargement and reduction sides. The sixth lens L6, the seventh lens L7, and the eighth lens L8 are bonded to each other into a cemented triplet L22.

The ninth lens L9 has negative power. The ninth lens L9 has concave surfaces both at the enlargement and reduction sides. The tenth lens L10 has positive power. The tenth lens L10 has convex surfaces both at the enlargement and reduction sides. The ninth lens L9 and the tenth lens L10 are bonded to each other into a cemented doublet L23.

The eleventh lens L11 has negative power. The eleventh lens L11 is a meniscus lens. The eleventh lens L11 has a concave enlargement-side surface and a convex reduction-side surface. The eleventh lens L11 has aspheric surfaces at opposite sides.

The twelfth lens L12 has positive power. The twelfth lens L12 has convex surfaces both at the enlargement and reduction sides. The thirteenth lens L13 has negative power. The thirteenth lens L13 has concave surfaces both at the enlargement and reduction sides. The fourteenth lens L14 has positive power. The fourteenth lens L14 has convex surfaces both at the enlargement and reduction sides. The twelfth lens L12 and the thirteenth lens L13 are bonded to each other into a cemented doublet L24.

The fifteenth lens L15 has negative power. The fifteenth lens L15 has concave surfaces both at the enlargement and reduction sides. The sixteenth lens L16 has positive power. The sixteenth lens L16 has convex surfaces both at the enlargement and reduction sides. The fifteenth lens L15 and the sixteenth lens L16 are bonded to each other into a cemented doublet L25.

The seventeenth lens L17 has positive power. The seventeenth lens L17 is a meniscus lens. The seventeenth lens L17 has a concave enlargement-side surface and a convex reduction-side surface. The eighteenth lens L18 has positive power. The eighteenth lens L18 has convex surfaces both at the enlargement and reduction sides.

The first lens L1 is made of resin. The second lens L2 to the eighteenth lens L18 are made of glass.

In the projection system 3E, the optical components at the reduction side of the eighteenth lens L18 of the second lens group 32 form a telecentric system.

The projection system 3E has a changeable projection distance. To change the projection distance, the first-b lens group 34 and the first-c lens group 35 are each moved in the direction of the optical axis N for focusing.

Data on the projection system 3E are listed in a table below. In the table, FNo represents the f number of the projection system 3E, F represents the focal length of the overall projection system, ω represents half the angle of view, BF represents the back focal length in air, F1b represents the focal length of the first-b lens group 34, F1c represents the focal length of the first-c lens group 35, F1ab represents the combined focal length of the first-a lens group 33 and the first-b lens group 34, F1 represents the focal length of the first lens group 31, and F2 represents the focal length of the second lens group 32.

| | |
|---|---|
| FNo | 1.9 |
| F | 7.540 mm |
| ω | 60.7° |
| BF | 43.201 mm |
| F1b | −20.960 mm |
| F1c | 198.610 mm |
| F1ab | −9.532 mm |
| F1 | −12.266 mm |
| F2 | 55.827 mm |

Data on the lenses of the projection system 3E are listed below. The surfaces of the lenses are numbered sequentially from the enlargement side to the reduction side. Reference characters are given to the screen, the lenses, the stop, the dichroic prism, and the liquid crystal panels. Data labeled with a surface number that does not correspond to any of the screen, the lenses, the stop, the dichroic prism, or the liquid crystal panels is dummy data. An aspheric surface has a surface number followed by *. Reference character R represents the radius of curvature. Reference character D represents the axial inter-surface spacing. Reference character nd represents the refractive index at the d line. Reference character vd represents the Abbe number at the d line. Reference characters R and D are expressed in millimeters.

| Reference character | Surface number | R | D | nd | vd |
|---|---|---|---|---|---|
| S | 0 | Infinity | Variable spacing 1 | | |
| L1 | 1* | −29.011 | 5.000 | 1.5312 | 56.04 |
| | 2* | −70.875 | 17.779 | | |
| L2 | 3 | 48.497 | 2.200 | 1.7292 | 54.68 |
| | 4 | 25.386 | Variable spacing 2 | | |
| L3 | 5 | 242.442 | 1.800 | 2.0010 | 29.13 |
| | 6 | 19.366 | Variable spacing 3 | | |
| L4 | 7 | −152.549 | 1.500 | 1.7292 | 54.68 |
| L5 | 8 | 33.587 | 6.500 | 1.7618 | 26.52 |
| | 9 | −89.211 | Variable spacing 4 | | |
| L6 | 10 | 49.655 | 8.081 | 1.7408 | 27.79 |
| L7 | 11 | −24.544 | 1.500 | 1.9229 | 20.88 |
| L8 | 12 | 62.765 | 6.200 | 1.6727 | 32.10 |
| | 13 | −32.915 | 14.770 | | |
| 41 | 14 | Infinity | 0.894 | | |
| L9 | 15 | −48.800 | 1.000 | 1.9004 | 37.37 |
| L10 | 16 | 14.440 | 5.384 | 1.8697 | 20.02 |
| | 17 | −64.985 | 1.300 | | |
| L11 | 18* | −30.756 | 1.500 | 1.9515 | 29.83 |
| | 19* | −60.415 | 0.200 | | |
| L12 | 20 | 42.102 | 6.000 | 1.5163 | 64.14 |
| L13 | 21 | −25.000 | 1.500 | 1.9004 | 37.37 |
| | 22 | 177.303 | 0.500 | | |
| L14 | 23 | 84.819 | 6.938 | 1.4875 | 70.24 |
| | 24 | −22.790 | 0.100 | | |
| L15 | 25 | −53.681 | 1.200 | 2.0007 | 25.46 |
| L16 | 26 | 38.030 | 8.600 | 1.4875 | 70.24 |
| | 27 | −31.043 | 0.200 | | |
| L17 | 28 | −1132.273 | 4.603 | 1.4970 | 81.54 |
| | 29 | −47.659 | 0.200 | | |
| L18 | 30 | 113.148 | 9.400 | 1.4970 | 81.54 |
| | 31 | −34.806 | 2.000 | | |

-continued

| Reference character | Surface number | R | D | nd | vd |
|---|---|---|---|---|---|
| 19 | 32 | Infinity | 39.600 | 1.5168 | 64.20 |
| | 33 | Infinity | 15.128 | | |
| 18 | 34 | Infinity | | | |

The projection system 3E according to the present example has a changeable projection distance selected from the standard distance, the short distance shorter than the standard distance, and the long distance longer than the standard distance. To change the projection distance, the first-b lens group 34 and the first-c lens group 35 are each moved in the direction of the optical axis N for focusing.

The table below shows the variable spacings 1, 2, 3, and 4 at the projection distances where the focusing is performed. The variable spacing 1 is the projection distance. The variable spacing 2 is the axial inter-surface spacing between the second lens L2 and the third lens L3. The variable spacing 3 is the axial inter-surface spacing between the third lens L3 and the fourth lens L4. The variable spacing 4 is the axial inter-surface spacing between the fifth lens L5 and the sixth lens L6.

| | Long distance | Standard distance | Short distance |
|---|---|---|---|
| Variable spacing 1 | 10900.000 | 1450.000 | 1000.000 |
| Variable spacing 2 | 13.521 | 13.775 | 13.789 |
| Variable spacing 3 | 20.844 | 21.359 | 21.005 |
| Variable spacing 4 | 2.847 | 2.112 | 2.000 |

The long projection distance of the projection system 3E according to the present example is 10900.000 mm, and the short projection distance of the projection system 3E is 1000.000 mm. The projection distance ratio of the projection system 3E is therefore greater than or equal to 10.

The aspheric coefficients are listed below.

| Surface number | 1 | 2 |
|---|---|---|
| Radius of curvature (R) | −29.011 | −70.875 |
| Conic constant (K) | −9.778 | −100.000 |
| Third-order coefficient (A) | 3.13999E−04 | 2.70566E−04 |
| Fourth-order coefficient (A) | −2.60295E−06 | 7.38868E−06 |
| Fifth-order coefficient (A) | 6.22622E−08 | −8.18659E−08 |
| Sixth-order coefficient (A) | −3.32841E−09 | −2.49448E−09 |
| Seventh-order coefficient (A) | 6.25208E−11 | −7.29705E−11 |
| Eighth-order coefficient (A) | −1.18690E−12 | 4.34518E−12 |
| Ninth-order coefficient (A) | 3.67034E−14 | −1.56396E−13 |
| Tenth-order coefficient (A) | −2.01958E−16 | 4.09740E−15 |
| Eleventh-order coefficient (A) | −1.67819E−17 | −5.09700E−17 |
| Twelfth-order coefficient (A) | 3.93865E−19 | 2.11578E−19 |
| Thirteenth-order coefficient (A) | −3.34928E−21 | 1.11805E−23 |
| Fourteenth-order coefficient (A) | 1.00736E−23 | 2.56762E−24 |

| Surface number | 18 | 19 |
|---|---|---|
| Radius of curvature (R) | −30.756 | −60.415 |
| Conic constant (K) | −16.228 | 0.000 |
| Fourth-order coefficient (A) | 4.67542E−05 | 1.19021E−04 |
| Sixth-order coefficient (A) | −5.58071E−07 | −7.83004E−07 |
| Eighth-order coefficient (A) | 1.42005E−09 | 1.86419E−09 |
| Tenth-order coefficient (A) | 1.86501E−12 | 5.52550E−12 |
| Twelfth-order coefficient (A) | −2.59878E−14 | −3.43530E−14 |
| Fourteenth-order coefficient (A) | 2.76945E−17 | −1.43094E−17 |
| Sixteenth-order coefficient (A) | 3.10888E−20 | −2.04785E−30 |

The projection system 3E according to the present example satisfies each of Conditional Expressions (1) and (2) below, $$BF/F>5.0 \qquad (1)$$

$$0.3<|F/F1ab|<1.0 \qquad (2)$$

where F represents the focal length of the overall projection system, BF represents the back focal length in air, and F1ab represents the combined focal length of the first-a lens group 33 and the first-b lens group 34.
In the present example,
F: 7.540 mm
BF: 43.201 mm
are satisfied. BF/F=5.730 is therefore satisfied, and Conditional Expression (1) is satisfied.
In the present example,
F: 7.540 mm
F1ab: −9.532 mm
are satisfied. |F/F1ab|=0.791 is therefore satisfied, and Conditional Expression (2) is satisfied.
The projection system 3E according to the present example satisfies Conditional Expression (4) below, $$0.1<|F1/F2|<0.5 \qquad (4)$$

where F1 represents the focal length of the first lens group 31, and F2 represents the focal length of the second lens group 32.
In the present example,
F1: −12.266 mm
F2: 55.827 mm
are satisfied. |F1/F2|=0.220 is therefore satisfied, and Conditional Expression (4) is satisfied.
The projection system 3E according to the present example satisfies each of Conditional Expressions (5) and (6) below, $$0.2<|F/F1b|<0.6 \qquad (5)$$

$$0.0<F/F1c<0.14 \qquad (6)$$

where F represents the focal length of the entire projection system, F1b represents the focal length of the first-b lens group 34, and F1c represents the focal length of the first-c lens group 35.
In the present example,
F: 7.540 mm
F1b: −20.960 mm
are satisfied. |F/F1b|=0.360 is therefore satisfied, and Conditional Expression (5) is satisfied.

In the present example,
F: 7.540 mm
F1c: 198.610 mm
are satisfied. F/F1c=0.038 is therefore satisfied, and Conditional Expression (6) is satisfied.

Effects and Advantages

Figure 28:
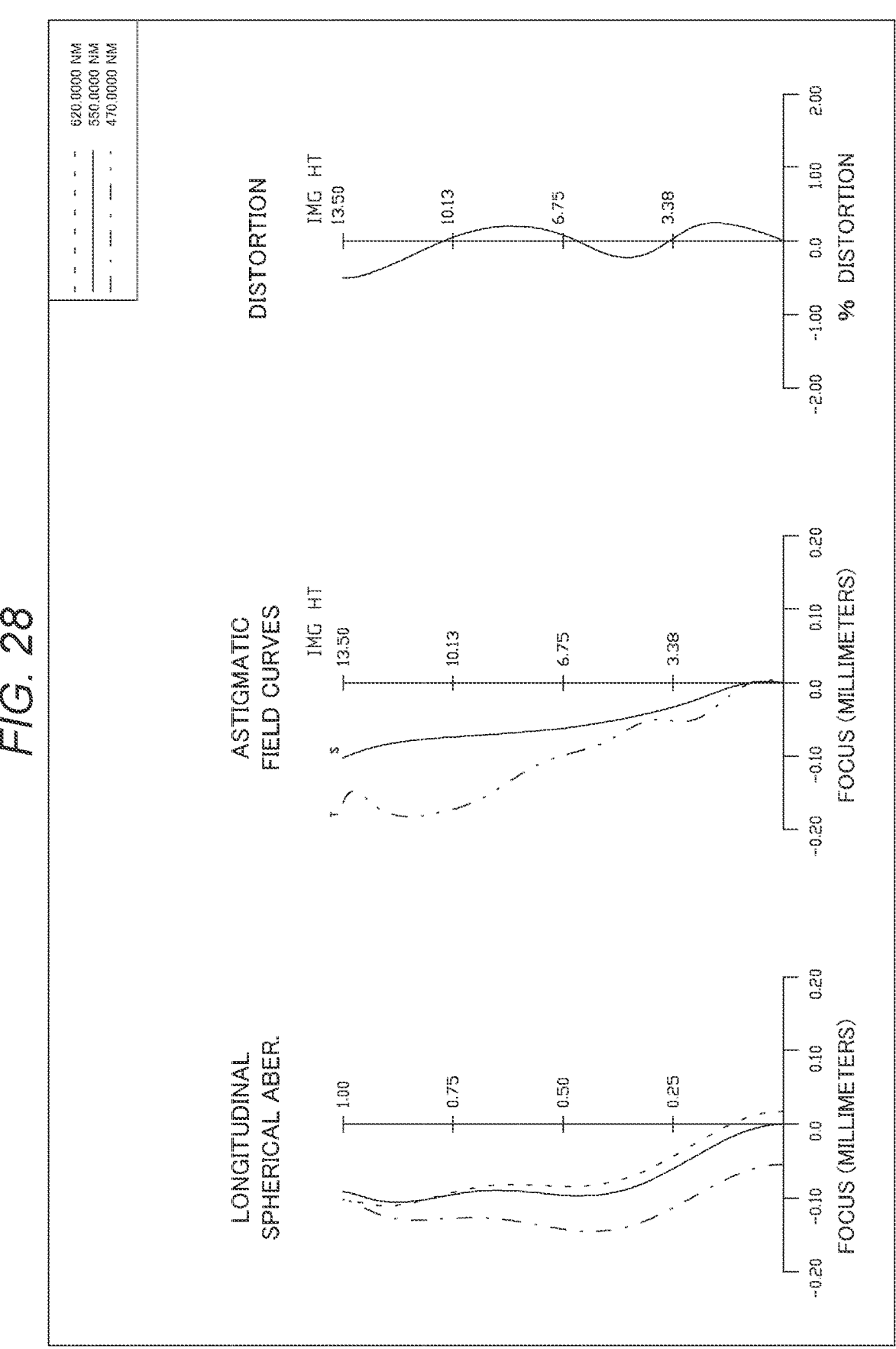
FIG. 28 shows the spherical aberration, astigmatism, and distortion produced by the projection system according to Example 5 at the standard distance.
Figure 29:
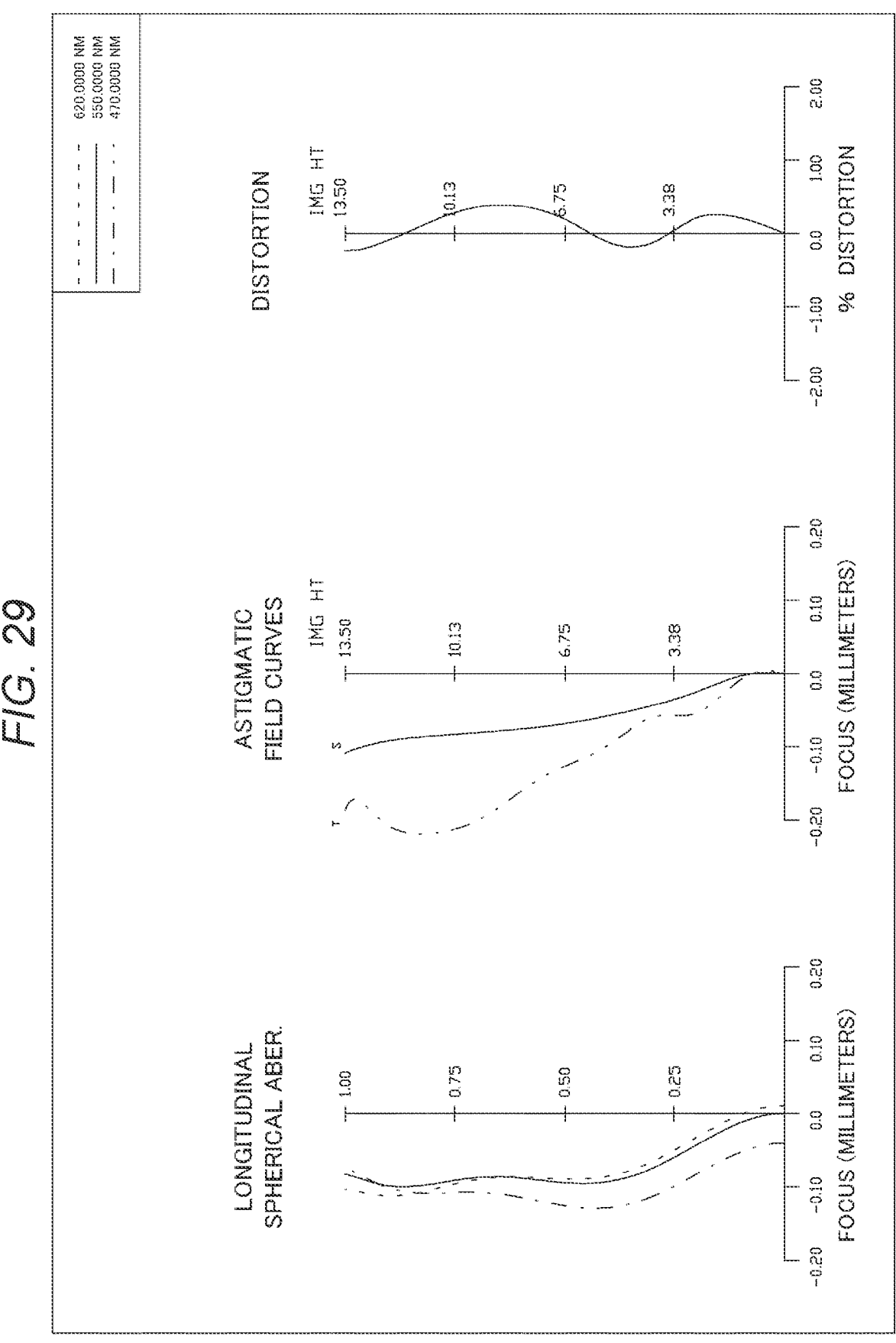
FIG. 29 shows the spherical aberration, astigmatism, and distortion produced by the projection system according to Example 5 at the long distance.
Figure 30:
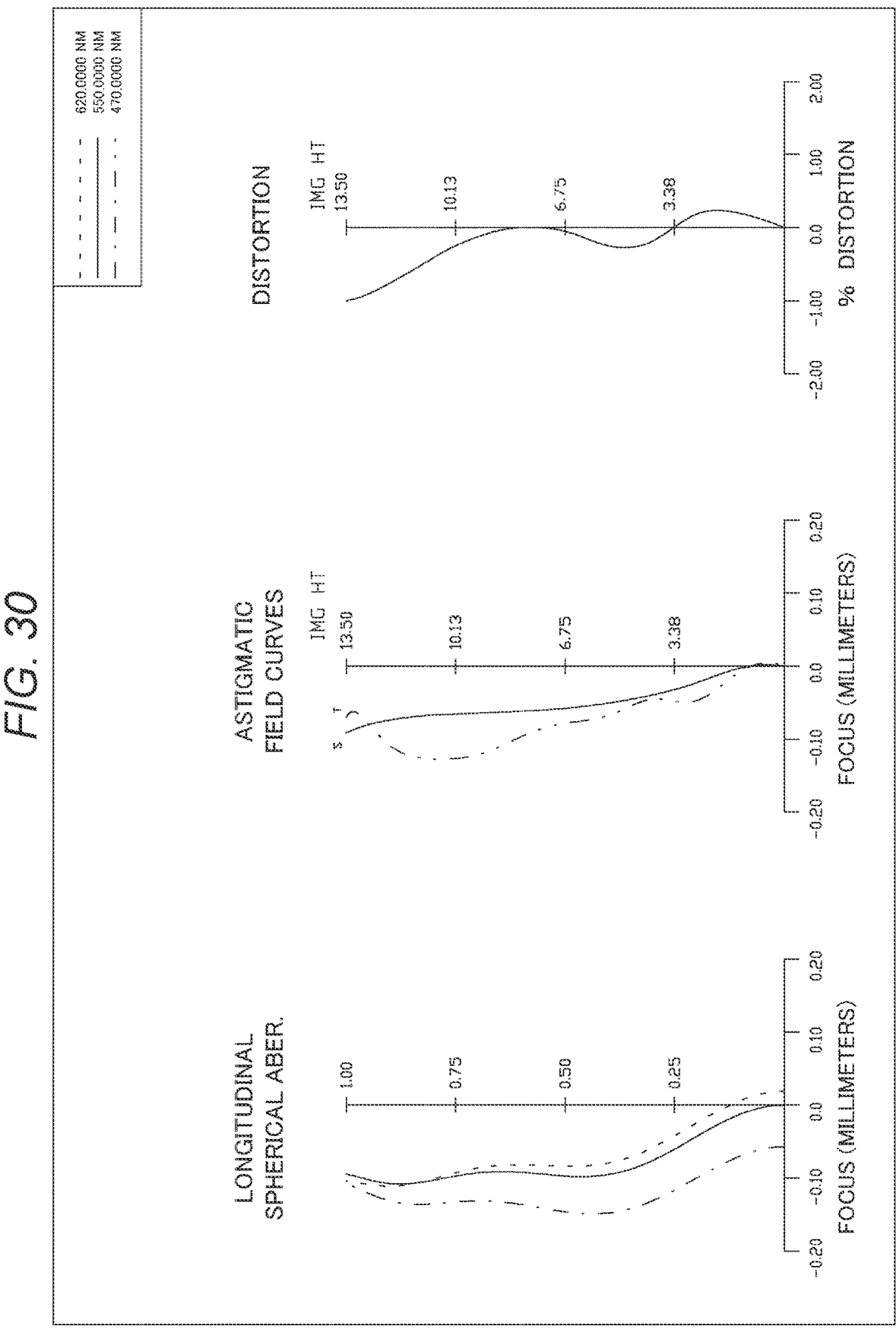
FIG. 30 shows the spherical aberration, astigmatism, and distortion produced by the projection system according to Example 5 at the short distance.

In the projection system 3E according to the present example, the sum of the number of lenses of the first-a lens group 33 and the number of lenses of the first-b lens group 34 is three. The weight of the enlargement-side end portion of the projection system 3E can therefore be readily suppressed.
In the present example, the first lens L1 of the first-a lens group 33 is made of resin and can therefore be lighter than in a case where the first lens L1 is made of glass. In the configuration in which the first lens L1 is made of resin, the first lens L1 has a larger refractive index-temperature coefficient in accordance with which the refractive index changes with temperature and a larger coefficient of linear expansion than in the case where the first lens L1 is made of glass. Heat therefore tends to cause a change in the refractive index of the first lens L1 and deformation of the shape thereof. An increase in the negative power of the first lens L1 therefore tends to cause the image quality of an enlarged image to be affected by the heat. In contrast, in the present example, the first-a lens group 33 is formed of two lenses, the first lens L1 and the second lens L2. The two lenses, the first lens L1 and the second lens L2, can therefore be responsible for the power of the first-a lens group 33. The negative power of the first-a lens group 33 can therefore be increased with an increase in the negative power of the first lens L1 suppressed, whereby the situation in which heat tends to affect the image quality of an enlarged image can be suppressed.
Since the negative power of the first-a lens group 33 can be increased, the first-b lens group 34 can be formed of a single lens. The first-b lens group 34 is therefore lighter and more readily moved during focusing. The enlargement-side surface of the third lens L3 has power smaller than that of the reduction-side surface of the third lens L3. The third lens L3 can therefore suppress aberrations that occur at the enlargement-side surface. As a result, astigmatism and other aberrations produced during focusing can be suppressed.
The projection system 3E according to the present example, which satisfies Conditional Expressions (1), (2), (5), and (6), can provide the same effects and advantages as those provided by the projection system 3A according to Example 1. The projection system 3E according to the present example, which satisfies Conditional Expression (4), can provide the same effects and advantages as those provided by the projection system 3D according to Example 4. In the present example, the second lens group 32 includes four cemented lenses. In the present example, the second lens group 32 includes four cemented doublets and triplets in total. The chromatic aberrations can therefore be corrected well.
FIG. 28 shows the spherical aberration, astigmatism, and distortion produced by the projection system 3E at the standard distance. FIG. 29 shows the spherical aberration, astigmatism, and distortion produced by the projection system 3E at the long distance. FIG. 30 shows the spherical aberration, astigmatism, and distortion produced by the projection system 3E at the short distance. The projection system 3E according to the present example allows suppression of the aberrations that degrade an enlarged image, as shown in FIGS. 28 to 30.

What is claimed is:

1. A projection system comprising:

a first lens group having negative power and a second lens group having positive power sequentially arranged from an enlargement side toward a reduction side, wherein optical components at a reduction side of the second lens group form a telecentric system, the first lens group includes a first-a lens group having negative power, a first-b lens group located at a reduction side of the first-a lens group and having negative power, and a first-c lens group located at a reduction side of the first-b lens group and having positive power, the first-a lens group is formed only of a lens having negative power, the first-b lens group is formed only of a lens having negative power, a first lens located at a position closest to the enlargement side in the first-a lens group has aspheric surfaces at opposite sides, a sum of a number of lenses of the first-a lens group and a number of lenses of the first-b lens group is smaller than or equal to three, the first-b lens group and the first-c lens group each moves along an optical axis during focusing, and the projection system satisfies each of Conditional Expressions (1) and (2) below, $$BF/F > 5.0 \tag{1}$$

$$0.3 < |F/F1ab| < 1.0 \tag{2}$$

where F represents a focal length of the projection system, BF represents a back focal length in air, and F1ab represents a combined focal length of the first-a lens group and the first-b lens group.

2. The projection system according to claim 1, wherein the first-a lens group is formed of the first lens, the first-b lens group is formed of a second lens and a third lens located at a reduction side of the second lens, the first lens is made of resin, the second lens is a meniscus lens having negative power and a convex enlargement-side surface, and the third lens has negative power and a concave reduction-side surface.

3. The projection system according to claim 1, wherein the first-a lens group is formed of the first lens and a second lens located at a reduction side of the first lens, the first lens is made of resin, the second lens is a meniscus lens having negative power and a convex enlargement-side surface, the first-b lens group is formed of a third lens, the third lens has negative power and a concave reduction-side surface, and an enlargement-side surface of the third lens has power smaller than power of a reduction-side surface of the third lens.

4. The projection system according to claim 1, wherein a stop is disposed in the second lens group at a position where a chief ray having a largest angle of view intersects with the optical axis, the second lens group includes a second-a lens group and a second-b lens group located at an enlargement side of the stop, the second-a lens group is located at an enlargement side of the second-b lens group, and the second-a lens group and the second-b lens group each moves along of the optical axis during zooming.

5. The projection system according to claim 4, wherein the second-a lens group has negative power and is located at a position closest to the enlargement side in the second lens group, and the second-b lens group has positive power.

6. The projection system according to claim 5, wherein the projection system satisfies Conditional Expression (3) below, $$1.0 < |F2a/F2b| < 4.0 \tag{3}$$

where F2a represents a focal length of the second-a lens group and F2b represents a focal length of the second-b lens group.

7. The projection system according to claim 1, wherein the second lens group does not include a moving group but is fixed, wherein the projection system satisfies Conditional Expression (4) below, $$0.1 < |F1/F2| < 0.5 \tag{4}$$

where F1 represents a focal length of the first lens group and F2 represents a focal length of the second lens group.

8. The projection system according to claim 1, wherein the second lens group includes four cemented lenses.

9. A projector comprising:

a light modulator that modulates light outputted from a light source; and the projection system according to claim 1, which projects the light modulated by the light modulator.

* * * * *